(12) United States Patent
Nakata et al.

(10) Patent No.: US 8,827,379 B2
(45) Date of Patent: Sep. 9, 2014

(54) HYDRAULIC BRAKE UNIT AND CONTROL METHOD FOR SUCH A HYDRAULIC BRAKE UNIT

(75) Inventors: Daisuke Nakata, Seto (JP); Takahiro Okano, Toyota (JP); Eiji Nakamura, Miyoshi (JP); Tsukasa Fukasawa, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 631 days.

(21) Appl. No.: 13/061,733

(22) PCT Filed: Sep. 2, 2009

(86) PCT No.: PCT/IB2009/006724
§ 371 (c)(1),
(2), (4) Date: Mar. 2, 2011

(87) PCT Pub. No.: WO2010/026465
PCT Pub. Date: Mar. 11, 2010

(65) Prior Publication Data
US 2011/0175436 A1    Jul. 21, 2011

(30) Foreign Application Priority Data

Sep. 3, 2008  (JP) ................................. 2008-226462

(51) Int. Cl.
*B60T 8/88*    (2006.01)
*B60T 8/40*    (2006.01)
*B60T 17/22*    (2006.01)
*B60T 13/66*    (2006.01)

(52) U.S. Cl.
CPC .............. *B60T 8/4081* (2013.01); *B60T 17/225* (2013.01); *B60T 13/662* (2013.01)
USPC .................................................... 303/122.09

(58) Field of Classification Search
USPC .............................. 303/122, 122.09, 191, 20
See application file for complete search history.

(56) References Cited

U.S. PATENT DOCUMENTS

| 6,450,591 | B1 | 9/2002 | Kawahata et al. |
| 2007/0108837 | A1 | 5/2007 | Ohkubo et al. |

FOREIGN PATENT DOCUMENTS

| CN | 1962330 A | 5/2007 |
| EP | 1 795 416 | 6/2007 |

(Continued)

OTHER PUBLICATIONS

English machine translation of JP 2008-189244.*

(Continued)

*Primary Examiner* — Robert A Siconolfi
*Assistant Examiner* — Vu Q Nguyen
(74) *Attorney, Agent, or Firm* — Oblon, Spivak, McClelland, Maier & Neustadt, L.L.P.

(57) ABSTRACT

A hydraulic brake unit is provided. The hydraulic brake unit includes a manual hydraulic pressure supply unit that pressurizes a hydraulic medium supplied from a reservoir and generates a hydraulic pressure corresponding to a brake operation amount; first and second hydraulic systems in which the manual hydraulic pressure supply unit communicates with first and second wheel cylinders; a separation valve provided between the first hydraulic system and the second hydraulic system; and a brake ECU having a separation valve control unit and a hydraulic medium amount detection unit. The separation valve control unit executes control to close the separation valve when the hydraulic medium amount detection unit detects that the hydraulic medium stored in the reservoir has decreased below a predetermined amount.

11 Claims, 25 Drawing Sheets

(56) References Cited

FOREIGN PATENT DOCUMENTS

| | | |
|---|---|---|
| JP | 64-22667 | 1/1989 |
| JP | 01 106758 | 4/1989 |
| JP | 10 016750 | 1/1998 |
| JP | 10 315954 | 12/1998 |
| JP | 2000 272497 | 10/2000 |
| JP | 2004 210060 | 7/2004 |
| JP | 2004-276773 | 10/2004 |
| JP | 2006 264475 | 10/2006 |
| JP | 2006 264675 | 10/2006 |
| JP | 2007 131247 | 5/2007 |
| JP | 2007203859 | 8/2007 |
| JP | 2008 049898 | 3/2008 |
| JP | 2008 087723 | 4/2008 |
| JP | 2008 179228 | 8/2008 |
| JP | 2008 189244 | 8/2008 |

OTHER PUBLICATIONS

Office Action issued May 10, 2011, in Japan Patent Application No. 2008-226462 (with Enlgish translation).

Combined Office Action and Search Report issued Feb. 28, 2013 in Chinese Patent Application No. 200980134514.3 with English translation of categories of cited documents.

International Search Report issued Dec. 30, 2009 in PCT/IB09/006724 filed Sep. 2, 2009.

Office Action issued Sep. 2, 2010 in Japanese Patent Application No. 2008-226462 filed Sep. 3, 2010 (with partial English language translation).

\* cited by examiner

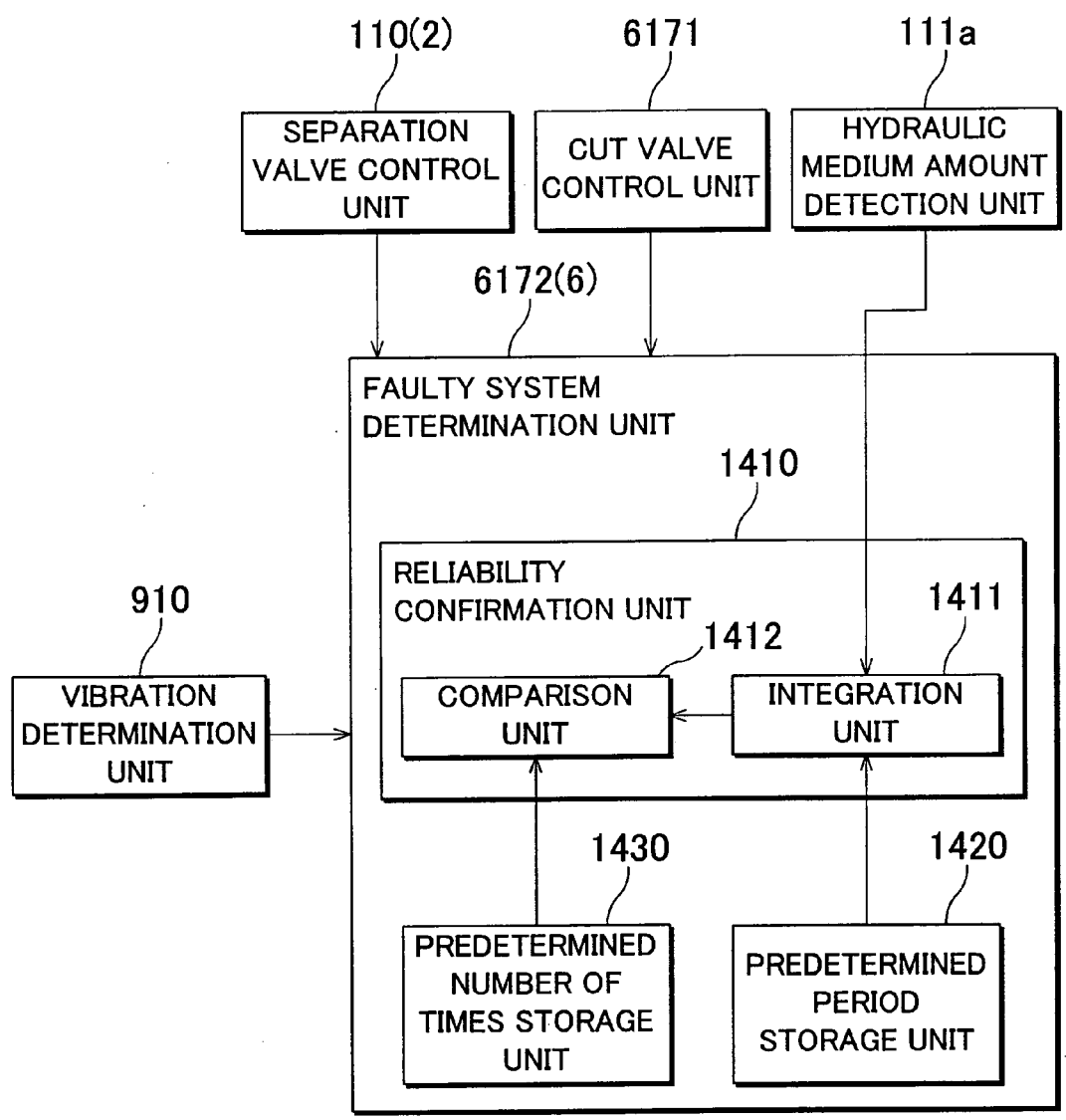

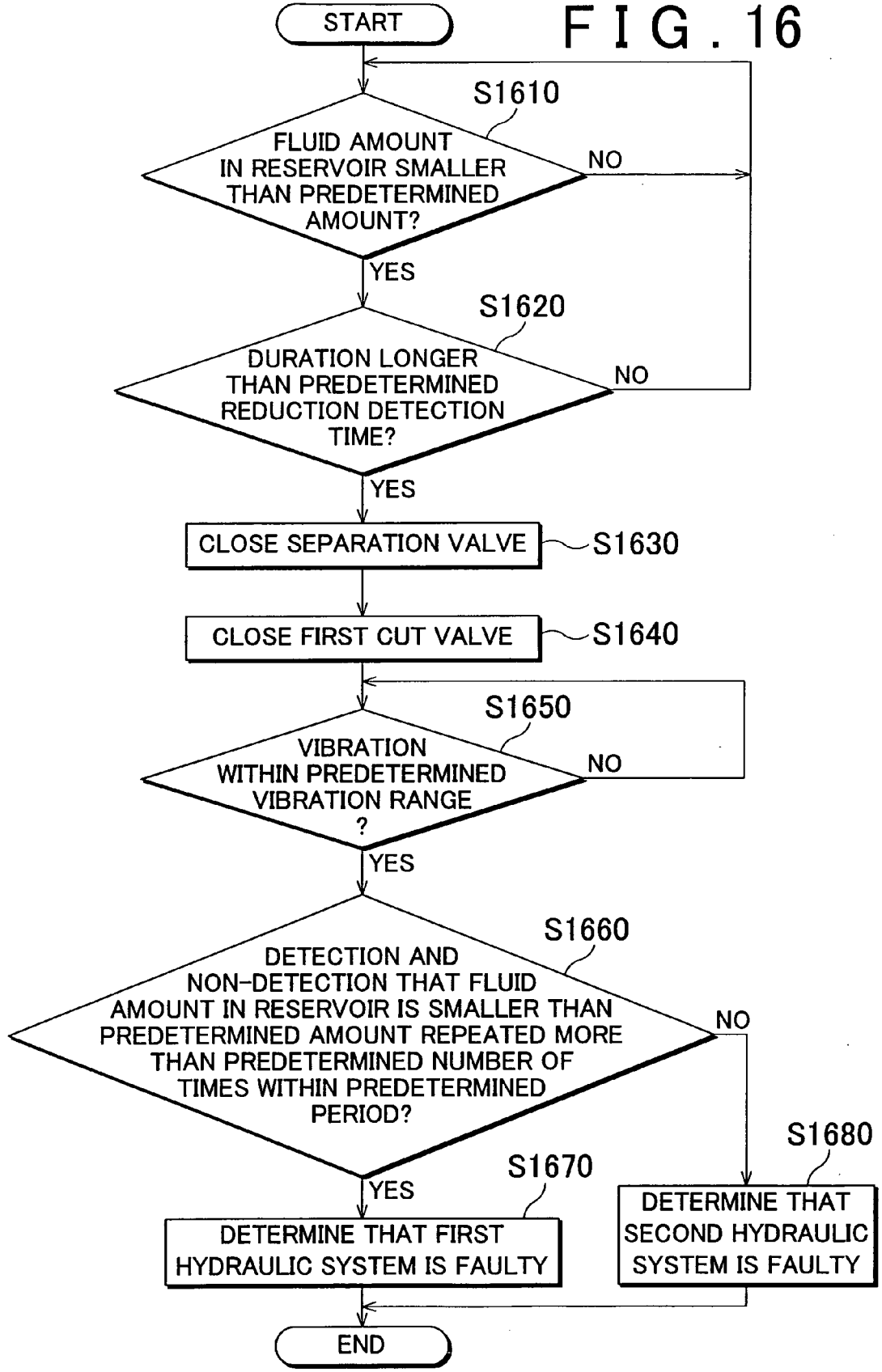

HYDRAULIC BRAKE UNIT AND CONTROL METHOD FOR SUCH A HYDRAULIC BRAKE UNIT

BACKGROUND OF THE INVENTION

1. Field of the Invention

The invention relates to a hydraulic brake unit and a control method for the hydraulic brake unit.

2. Description of the Related Art

Typically, a conventional brake control apparatus electronically controls the supply and stoppage of oil pressure in a hydraulic system using an actuator to regulate oil pressure to be supplied to respective wheel cylinders. This type of brake control apparatus may include an accumulator serving as a power hydraulic pressure source, whereby the accumulator serves as a power source that operates the wheel cylinders together with oil pressure from a master cylinder unit corresponding to an operation of a brake pedal.

The brake control apparatus further includes a plurality of oil pressure sensors for performing appropriate control of the hydraulic system. By opening and closing a control valve provided in the hydraulic system on the basis of the oil pressure detected by the oil pressure sensors, thereby setting the hydraulic system in a communicative state or a blocked state, transmission supply and blocking of the oil pressure are controlled, and as a result, the oil pressure is supplied after being regulated to a desired value.

When a fault occurs in the hydraulic system such that brake fluid leaks out from the location of the fault, it may be difficult to maintain and generate the desired oil pressure. To avoid such faulty states to the greatest extent possible, thereby preventing the occurrence of a situation in which the hydraulic system cannot generate the desired oil pressure such that a braking operation is greatly impaired, various proposals have been made.

For example, in Japanese Patent Application Publication No. 2007-131247 (JP-A-2007-131247), a hydrobooster mode is used as a preliminary control mode employed when brake regeneration cooperative control is not performed due to a fault or the like. In the hydrobooster mode, a separation valve is closed such that a first system is separated from a second system. Hence, even when fluid leaks from a pipe, a braking force can be applied by the system in which the fluid leakage has not occurred.

Further, in Japanese Patent Application Publication No. 2006-264675 (JP-A-2006-264675), a part of a plurality of solenoid pressure reducing control valves provided between a plurality of brake cylinders and a low pressure source is used as a solenoid linear valve such that hydraulic pressures of the plurality of brake cylinders are controlled in common by controlling the pressure reducing solenoid linear valve. Then, on the basis of a relationship between hydraulic pressures detected by oil pressure sensors, a determination is made as to whether or not a leak has occurred.

However, in cases of hydraulic medium leakage, there remains room for improvement in terms of suppressing excessive decrease of the hydraulic medium due to the leak rapidly and reducing the effects thereof on a braking operation.

SUMMARY OF THE INVENTION

The invention provides a hydraulic brake unit and a control method for the hydraulic brake unit with which the presence of a fault is determined quickly and easily, thereby suppressing excessive decrease of a hydraulic medium due to leakage.

A hydraulic brake unit according to a first aspect of the invention includes: a manual hydraulic pressure supply unit that pressurizes a hydraulic medium supplied from a reservoir storing the hydraulic medium and generates a hydraulic pressure corresponding to a brake operation amount generated by a driver; a first hydraulic system in which the manual hydraulic pressure supply unit communicates with a first wheel cylinder so that the hydraulic pressure generated by the manual hydraulic pressure supply unit is transmitted to the first wheel cylinder; a second hydraulic system in which the manual hydraulic pressure supply unit communicates with a second wheel cylinder so that the hydraulic pressure generated by the manual hydraulic pressure supply unit is transmitted to the second wheel cylinder; a separation valve that is provided in a main flow passage connecting the first hydraulic system to the second hydraulic system; and a brake ECU that includes a separation valve control unit that open/close controls the separation valve, and a hydraulic medium amount detection unit that detects whether or not the hydraulic medium stored in the reservoir has decreased below a predetermined amount, wherein the separation valve control unit closes the separation valve when the hydraulic medium amount detection unit detects that the hydraulic medium has decreased below the predetermined amount.

In the hydraulic brake unit according to the above aspect, the separation valve control unit may close the separation valve when a state in which the hydraulic medium amount detection unit detects that the hydraulic medium has decreased below the predetermined amount continues for a predetermined reduction detection time.

Further, in the hydraulic brake unit according to the above aspect, the first hydraulic system may include a first cut valve that opens and blocks a flow of the hydraulic medium, the second hydraulic system may include a second cut valve that opens and blocks the flow of the hydraulic medium, the hydraulic medium amount detection unit may detect a reduction in the hydraulic medium stored in the reservoir, and the brake ECU may include: a cut valve control unit that blocks the hydraulic medium by closing either the first cut valve or the second cut valve when the separation valve is closed; and a faulty system determination unit that determines, when the cut valve control unit closes either the first cut valve or the second cut valve, whether a fault has occurred in the first hydraulic system or the second hydraulic system by determining whether or not the reduction in the hydraulic medium stored in the reservoir, detected by the hydraulic medium amount detection unit, is greater than a predetermined reduction.

Further, in the hydraulic brake unit according to the above aspect, the first hydraulic system may include a first cut valve that opens and blocks a flow of the hydraulic medium, the second hydraulic system may include a second cut valve that opens and blocks the flow of the hydraulic medium, and the brake ECU may include: a cut valve control unit that blocks the hydraulic medium by closing either the first cut valve or the second cut valve when the separation valve is closed; a vibration determination unit that determines whether or not vibration of the reservoir is within a predetermined vibration range; and a faulty system determination unit that determines, when the cut valve control unit closes either the first cut valve or the second cut valve and the vibration determination unit determines that the vibration of the reservoir is within the predetermined vibration range, whether a fault has occurred in the first hydraulic system or the second hydraulic system by determining whether or not the hydraulic medium amount detection unit has detected that the hydraulic medium has decreased below the predetermined amount.

Further, in the hydraulic brake unit according to the above aspect, the reservoir may include a first reservoir portion that stores hydraulic medium to be supplied to the first hydraulic system and a second reservoir portion that stores hydraulic medium to be supplied to the second hydraulic system and has a greater capacity than the first reservoir portion, and the cut valve control unit may block the hydraulic medium by closing the first cut valve provided in the first hydraulic system when the separation valve is closed.

Further, in the hydraulic brake unit according to the above aspect, the faulty system determination unit may include a reliability confirmation unit that determines whether or not the hydraulic medium amount detection unit has repeated detection and non-detection of the state, in which the hydraulic medium has decreased below the predetermined amount, more than a predetermined number of times within a predetermined period, and when the cut valve control unit closes either the first cut valve or the second cut valve, and when the vibration determination unit determines that the vibration of the reservoir is within the predetermined vibration range, and the reliability confirmation unit determines that the hydraulic medium amount detection unit has repeated detection and non-detection of the state, in which the hydraulic medium has decreased below the predetermined amount, more than the predetermined number of times within the predetermined period, a fault may be determined to have occurred in whichever of the first hydraulic system and the second hydraulic system is closed.

Further, in the hydraulic brake unit according to the above aspect, after the faulty system determination unit has determined that a fault has occurred in either the first hydraulic system or the second hydraulic system, the cut valve control unit may control the first cut valve and the second cut valve such that the system, determined by the faulty system determination unit to be faulty, is set in a blocked state and the system, determined by the faulty system determination unit to be non-faulty, is set in a communicating state.

Further, in the hydraulic brake unit according to the above aspect, the first hydraulic system or the second hydraulic system may include a stroke simulator that is provided between the manual hydraulic pressure supply unit and either the first cut valve or the second cut valve provided in the respective systems, and creates a reaction force that corresponds to a brake depression force generated by the driver via a simulator cut valve; the brake ECU may include a simulator cut valve control unit that open/close controls the simulator cut valve; after the faulty system determination unit has determined that a fault has occurred in either the first hydraulic system or the second hydraulic system, the cut valve control unit may control the first cut valve and the second cut valve such that the system, determined by the faulty system determination unit to be faulty, is set in the blocked state and the system determined by the faulty system, determination unit to be non-faulty, is set in the communicating state; and when the system determined by the faulty system determination unit to be faulty includes the simulator cut valve, the simulator cut valve control unit may open the simulator cut valve, and when the system determined by the faulty system determination unit to be non-faulty includes the simulator cut valve, the simulator cut valve control unit may close the simulator cut valve.

Further, in the hydraulic brake unit according to the above aspect, when the state in which the hydraulic medium amount detection unit detects that the hydraulic medium has decreased below the predetermined amount continues for the predetermined reduction detection time, the separation valve control unit may close the separation valve, and when the state in which the hydraulic medium amount detection unit detects that the hydraulic medium has decreased below the predetermined amount continues for a predetermined backup mode shift determination time, which is longer than the predetermined reduction detection time, the brake ECU may shift to a backup mode, in which the hydraulic pressure of the manual hydraulic pressure supply unit is transmitted to the first wheel cylinder and the second wheel cylinder regardless of whether or not the driver has performed a brake operation, and notify the driver of the vehicle that a fault has occurred.

The hydraulic brake unit according to the above aspect may further include an automatic braking control unit that controls a hydraulic pressure transmitted to at least one of the first wheel cylinder and the second wheel cylinder independently of a brake operation performed by the driver, wherein, when a braking instruction is issued in accordance with a brake operation by the driver or through automatic braking control after the separation valve control unit has closed the separation valve, the separation valve control unit may open the separation valve and the brake ECU may switch to a linear control mode in which hydraulic pressure is transmitted to the first wheel cylinder and the second wheel cylinder from a power hydraulic pressure source that pressurizes the hydraulic medium dynamically.

Further, in the hydraulic brake unit according to the above aspect, the first wheel cylinder may be a wheel cylinder on a front wheel side of the vehicle, and the second wheel cylinder may be a wheel cylinder on a rear wheel side of the vehicle.

A control method for a hydraulic brake unit according to a second aspect of the invention is a control method for a hydraulic brake unit including: a manual hydraulic pressure supply unit that pressurizes a hydraulic medium supplied from a reservoir storing the hydraulic medium and generates a hydraulic pressure corresponding to a brake operation amount generated by a driver; a first hydraulic system in which the manual hydraulic pressure supply unit communicates with a first wheel cylinder so that the hydraulic pressure generated by the manual hydraulic pressure supply unit is transmitted to the first wheel cylinder; a second hydraulic system in which the manual hydraulic pressure supply unit communicates with a second wheel cylinder so that the hydraulic pressure generated by the manual hydraulic pressure supply unit is transmitted to the second wheel cylinder; a separation valve that is provided in a main flow passage connecting the first hydraulic system to the second hydraulic system; and a brake ECU that includes a separation valve control unit that open/close controls the separation valve, and a hydraulic medium amount detection unit that detects whether or not the hydraulic medium stored in the reservoir has decreased below a predetermined amount, the control method including: a detection process in which the hydraulic medium amount detection unit detects that the hydraulic medium has decreased below the predetermined amount; and a valve-close process in which the separation valve control unit closes the separation valve when the hydraulic medium is detected to have decreased below the predetermined amount in the detection process.

Hence, the invention can provide a hydraulic brake unit and a control method for a hydraulic brake unit with which the presence of a fault is determined quickly and easily such that excessive decrease of a hydraulic medium due to leakage is suppressed.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein:

FIG. 15 is a schematic block diagram showing an example of the constitution of a faulty system determination unit according to a sixth embodiment of the invention;

FIG. 16 is a schematic flowchart illustrating an example of operation processing executed by the faulty system determination unit according to the sixth embodiment of the invention;

DETAILED DESCRIPTION OF EMBODIMENTS

A hydraulic brake unit according to a first embodiment of the invention normally detects a reduction in a brake fluid stored in a reservoir tank. The hydraulic brake unit then shuts off a main flow passage that connects a brake fluid supply passage extending to a front wheel side wheel cylinder and a brake fluid supply passage extending to a rear wheel side wheel cylinder.

Hence, even when an outflow of brake fluid caused by a fault on the periphery of the front wheel side wheel cylinder reaches a maximum, only the brake fluid to be supplied to the front wheel side is required, and therefore excessive decrease of the brake fluid in the reservoir tank can be suppressed. Conversely, even when an outflow of brake fluid caused by a fault on the periphery of the rear wheel side wheel cylinder reaches a maximum, only the brake fluid to be supplied to the rear wheel side is required, and therefore excessive decrease of the brake fluid in the reservoir tank can be suppressed.

Accordingly, an outflow of brake fluid caused by a fault on either the front wheel side or the rear wheel side does not lead to out flow of the brake fluid on the non-faulty side, and therefore a braking effect on the non-faulty side is not impaired.

Figure 1:
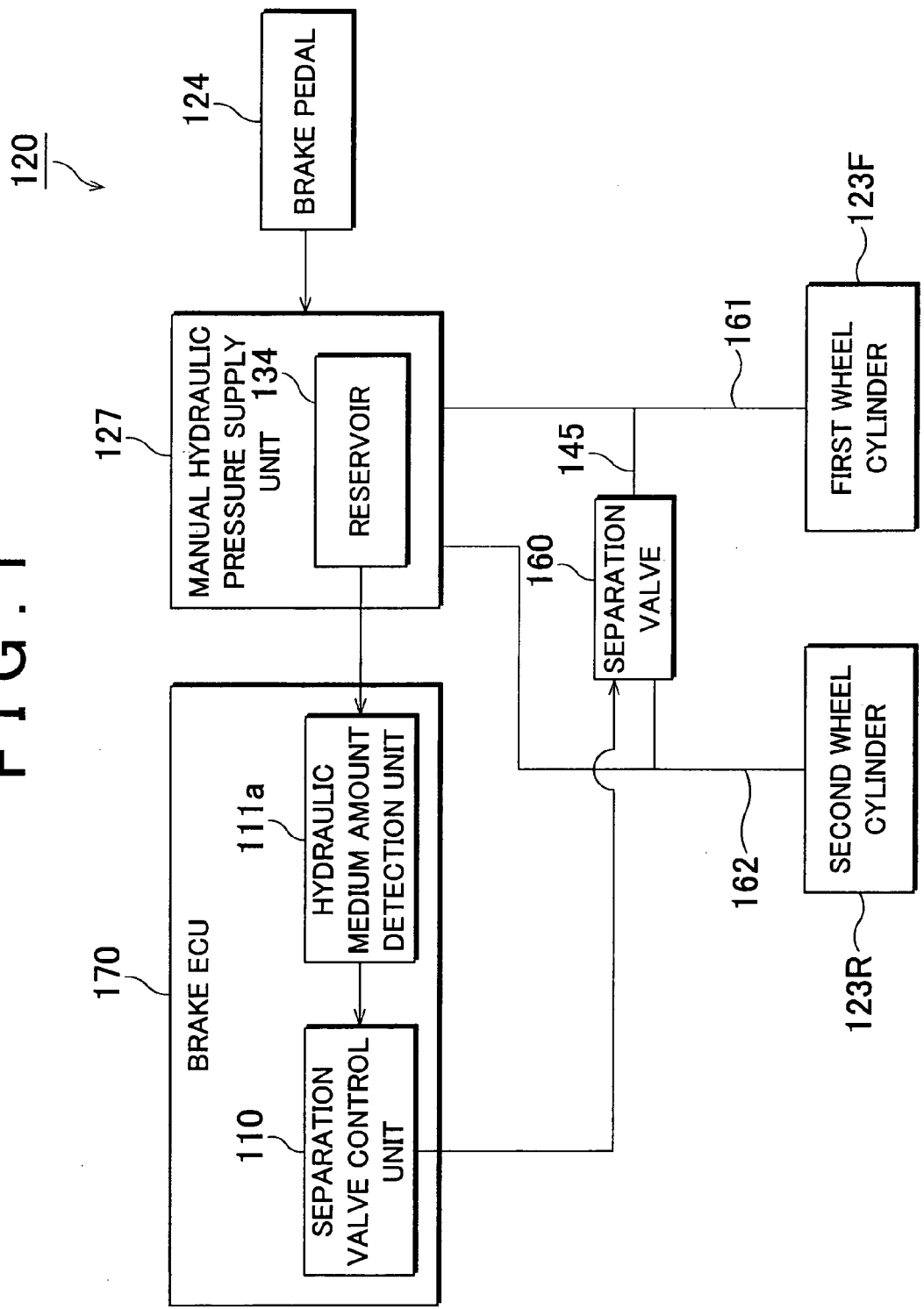
FIG. 1 is a schematic block diagram showing the constitution of a hydraulic brake unit according to a first embodiment of the invention.

The hydraulic brake unit according to the first embodiment will be described in detail below on the basis of the drawings. FIG. 1 is a schematic block diagram showing the constitution of a hydraulic brake unit 120 according to the first embodiment. The hydraulic brake unit 120 is configured, for example, by the Electronically Controlled Brake system (ECB).

As shown in FIG. 1, the hydraulic brake unit 120 includes a manual hydraulic pressure supply unit 127 that discharges brake fluid stored in a reservoir 134 to a first hydraulic system 161 and/or a second hydraulic system 162 in accordance with a depression operation amount of a brake pedal 124 by a driver of a vehicle.

The first hydraulic system 161 connects the manual hydraulic pressure supply unit 127 to a first wheel cylinder 123F so that the brake fluid is supplied from the manual hydraulic pressure supply unit 127 to the first wheel cylinder 123F. The second hydraulic system 162 connects the manual hydraulic pressure supply unit 127 to a second wheel cylinder 123R so that the brake fluid is supplied from the manual hydraulic pressure supply unit 127 to the second wheel cylinder 123R.

The hydraulic brake unit 120 also includes a main flow passage 145 that connects the first hydraulic system 161 to the second hydraulic system 162 so that the brake fluid can be supplied thereto. The main flow passage 145 includes a separation valve 160 that connects and shuts off the main flow passage 145 in accordance with an opening/closing operation.

Further, the hydraulic brake unit 120 is controlled by a brake ECU 170, and the separation valve 160 is open/close controlled by a separation valve control unit 110 provided in the brake ECU 170. The brake ECU 170 includes a hydraulic medium amount detection unit 111a for determining that a remaining amount of the brake fluid stored in the reservoir 134 has fallen below a predetermined amount.

Figure 2:
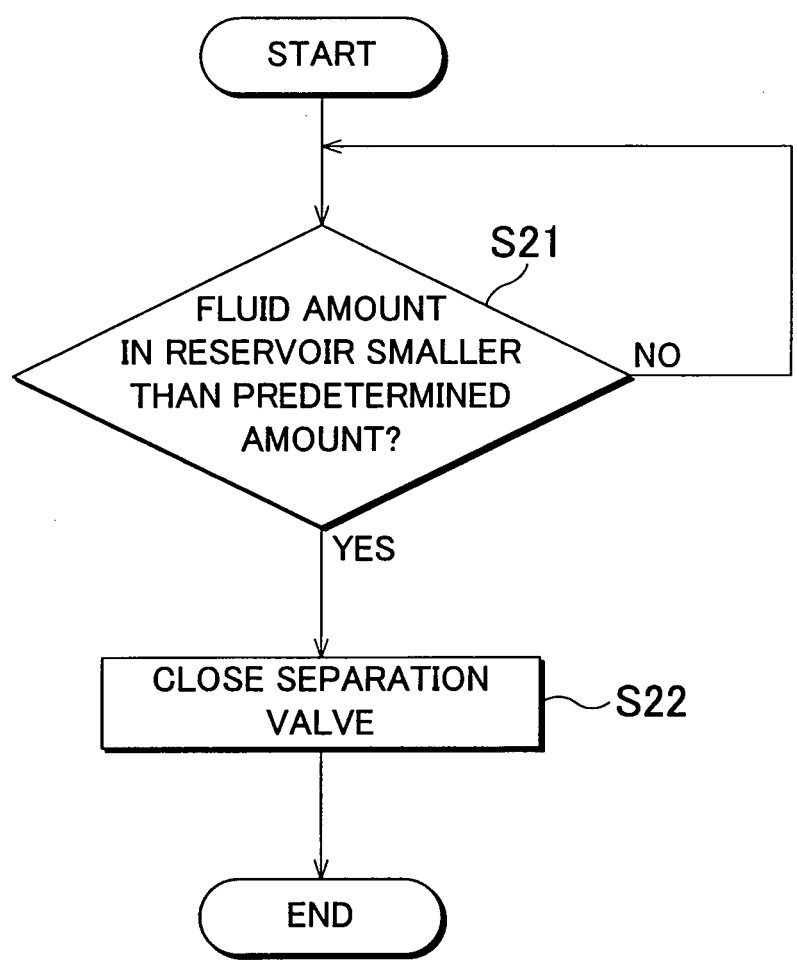
FIG. 2 is a schematic flowchart illustrating operation processing of the hydraulic brake unit according to the first embodiment of the invention.

Next, an outline of operation processing executed by the hydraulic brake unit 120 will be described using FIG. 2. FIG. 2 is a schematic flowchart illustrating the operation processing executed by the hydraulic brake unit 120. Accordingly, the steps shown in FIG. 2 will be described in sequence.

First, step S21 will be described. The hydraulic medium amount detection unit 111a of the hydraulic brake unit 120 determines whether or not the amount of brake fluid stored in the reservoir 134 is smaller than a predetermined amount. When the hydraulic medium amount detection unit 111a determines that the amount of brake fluid stored in the reservoir 134 is smaller than the predetermined amount, the routine advances to step S22 (YES in step S21). When the hydraulic medium amount detection unit 111a determines that the amount of brake fluid stored in the reservoir 134 is not smaller than the predetermined amount, the routine enters standby in step S21 (NO in step S21).

Note that a state in which the amount of brake fluid stored in the reservoir 134 is smaller than the predetermined amount corresponds to a determination that a brake fluid leak has occurred due to a fault in the hydraulic brake unit 120.

Next, step S22 will be described. The separation valve control unit 110 of the brake ECU 170 closes the separation valve 160. As a result of this operation of the separation valve control unit 110 in step S22, the first hydraulic system 161 is shut off from the second hydraulic system 162, and therefore excessive decrease of the brake fluid can be suppressed.

More specifically, when it is determined in step S21 that a brake fluid leak has occurred and it is assumed that the leak has been caused by a fault on the periphery of the second wheel cylinder 123R, a situation in which the brake fluid in the reservoir 134 flows through the main flow passage 145 from the first hydraulic system 161 via the separation valve 160 and flows out from the site of the fault can be avoided.

Hence, depletion of the brake fluid can be delayed and a braking force can be secured. Further, when the tank interior of the reservoir 134 is divided into a supply side for the first hydraulic system 161 and a supply side for the second hydraulic system 162, the brake fluid on the non-faulty side can be prevented from flowing out through the main flow passage 145.

Figure 3:
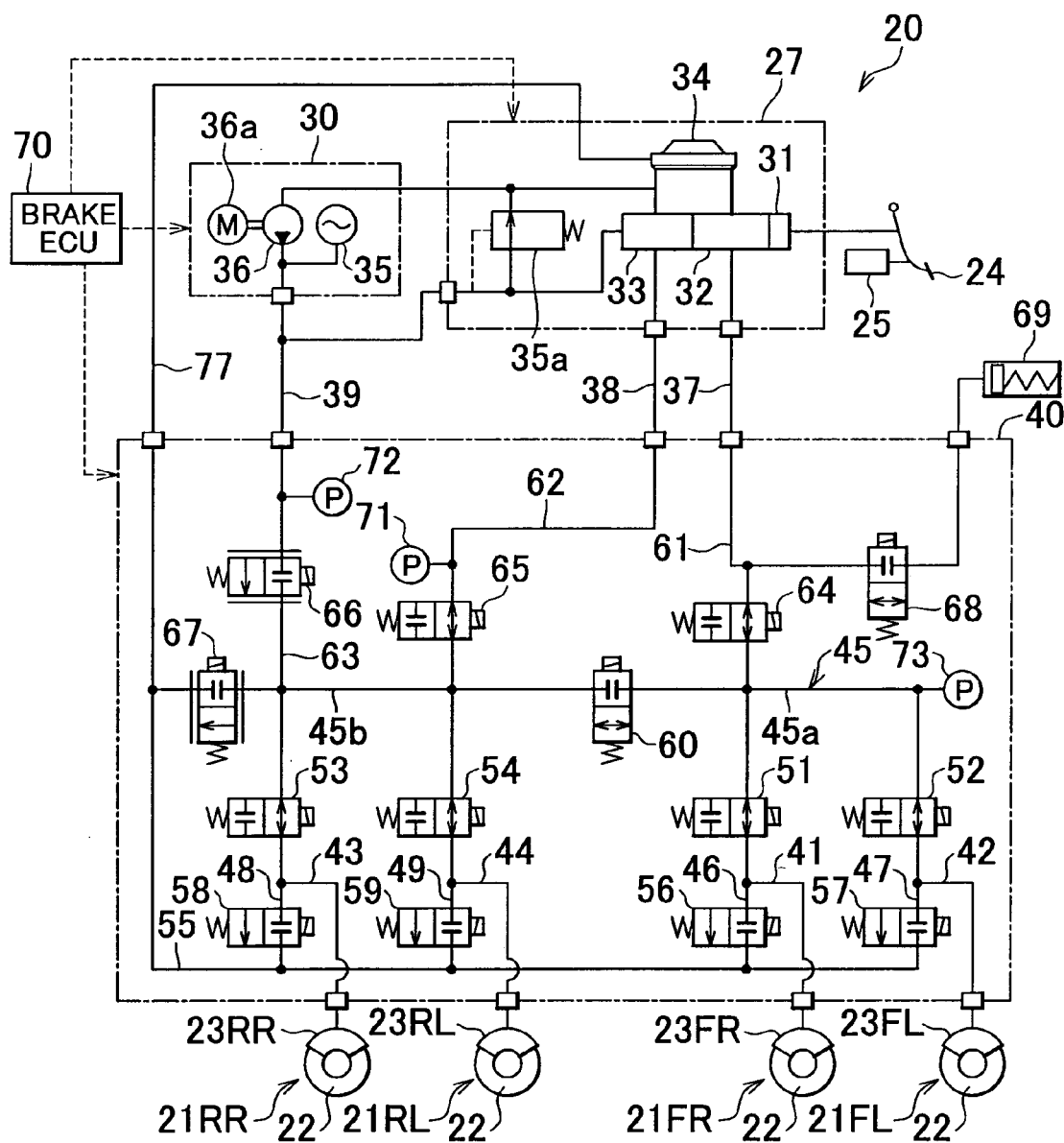
FIG. 3 is a system diagram showing a representative example of a hydraulic brake unit including the constitutions of each embodiment of the invention.

Here, representative examples of the hydraulic systems and so on of the hydraulic brake unit 120 will be described in further detail using FIG. 3. FIG. 3 is a system diagram showing a hydraulic brake unit 20 according to an embodiment of the invention. The hydraulic brake unit 20 illustrated in FIG. 3 corresponds to the hydraulic brake unit 120 illustrated in FIG. 1. Note, however, that the hydraulic brake unit 20 shown in FIG. 3 serves as a representative example including constitutions of hydraulic brake units according to other embodiments, and is therefore illustrated in more detail than the hydraulic brake unit 120 shown in FIG. 1.

As shown in FIG. 3, the hydraulic brake unit 20 includes disc brake units 21FR, 21FL, 21RR, 21RL provided in accordance with respective vehicle wheels, a master cylinder unit 27, a power hydraulic pressure source 30, and a hydraulic actuator 40. The constitution of the hydraulic brake unit 20 will now be described in detail using FIG. 3. Note that the master cylinder unit 27 corresponds to the manual hydraulic pressure supply unit 127.

The disc brake units 21FR, 21FL, 21RR and 21RL apply a braking force to a right front wheel, a left front wheel, a right rear wheel, and a left rear wheel of the vehicle, respectively. The master cylinder unit 27 serving as a manual hydraulic pressure source is capable of discharging brake fluid pressurized in accordance with an operation amount of a brake pedal 24, which serves as a brake operating member, by a driver to the disc brake units 21FR to 21RL.

The power hydraulic pressure source 30 is capable of discharging brake fluid pressurized by a power supply to the disc brake units 21FR to 21RL independently of an operation of the brake pedal 24 by the driver.

Further, the hydraulic actuator 40 appropriately regulates the hydraulic pressure of the brake fluid supplied from the power hydraulic pressure source 30 or the master cylinder unit 27, and then transmits the brake fluid to the disc brake units 21FR to 21RL.

Next, the disc brake units 21FR to 21RL, master cylinder unit 27, power hydraulic pressure source 30, and hydraulic actuator 40 will be respectively described in further detail.

The disc brake units 21FR to 21RL respectively include a brake disc 22 and a wheel cylinder 23FR, 23FL, 23RR, 23RL built into a brake caliper, not shown in the drawings. The wheel cylinders 23FR, 23FL typically correspond to the first wheel cylinder 123F. The wheel cylinders 23RR, 23RL typically correspond to the second wheel cylinder 123R.

Each of the wheel cylinders 23FR, 23FL, 23RR, 23RL is connected to the hydraulic actuator 40 via different fluid passages. Where appropriate, the wheel cylinders 23FR, 23FL, 23RR, 23RL will be referred to collectively hereafter as a "wheel cylinder 23".

In the disc brake units 21FR to 21RL, when brake fluid is supplied to the wheel cylinder 23 from the hydraulic actuator 40, a brake pad serving as a frictional member is pressed against the brake disc 22, which rotates together with the vehicle wheel.

As a result, a braking force is applied to each vehicle wheel. Note that although the disc brake units 21FR to 21RL are used in this embodiment, another braking force application mechanism including the wheel cylinder 23, such as a drum brake, for example, may be used instead.

The master cylinder unit 27 is constituted by a master cylinder having a hydraulic booster in this embodiment, and includes a hydraulic booster 31, a master cylinder 32, a regulator 33, and a reservoir 34. The hydraulic booster 31 amplifies a pedal depression force applied to the brake pedal 24 and transmits the amplified force to the master cylinder 32.

The pedal depression force is amplified by supplying brake fluid from the power hydraulic pressure source 30 to the hydraulic booster 31 via the regulator 33. The master cylinder 32 then generates a master cylinder pressure having a predetermined boost ratio relative to the pedal depression force.

The reservoir 34 storing the brake fluid is disposed above the master cylinder 32 and the regulator 33. The master cylinder 32 communicates with the reservoir 34 when depression of the brake pedal 24 is released.

Meanwhile, the regulator 33 communicates with both the reservoir 34 and an accumulator 35 of the power hydraulic pressure source 30, and generates a substantially equal hydraulic pressure to the master cylinder pressure using the reservoir 34 as a low pressure source and the accumulator 35 as a high pressure source. Where appropriate, the hydraulic pressure in the regulator 33 will be referred to hereafter as a "regulator pressure".

The power hydraulic pressure source 30 includes the accumulator 35 and a pump 36. The accumulator 35 converts a pressure energy of brake fluid that has been boosted by the pump 36 into a pressure energy of a filler gas such as nitrogen, for example to approximately 14 to 22 MPa, and stores the converted pressure energy. The pump 36 includes a motor 36a serving as a drive source, a suction port of which is connected to the reservoir 34 and a discharge port of which is connected to the accumulator 35.

Further, the accumulator 35 is connected to a relief valve 35a provided in the master cylinder unit 27. When the pressure of the brake fluid in the accumulator 35 rises abnormally to approximately 25 MPa, for example, the relief valve 35a opens such that the high-pressure brake fluid is returned to the reservoir 34.

As described above, the hydraulic brake unit 20 includes the master cylinder 32, regulator 33, and accumulator 35 as a brake fluid supply source for the wheel cylinder 23. A master pipe 37 is connected to the master cylinder 32, a regulator pipe 38 is connected to the regulator 33, and an accumulator pipe 39 is connected to the accumulator 35.

The master pipe 37, regulator pipe 38, and accumulator pipe 39 are respectively connected to the hydraulic actuator 40. More specifically, the master cylinder 32, regulator 33, and accumulator 35 are connected in series to the hydraulic actuator 40 as a hydraulic pressure source for the wheel cylinder 23.

The hydraulic actuator 40, which serves as a working fluid supply system according to this embodiment, includes an actuator block formed with a plurality of flow passages, and a plurality of solenoid control valves. The flow passages formed in the actuator block include individual flow passages 41, 42, 43 and 44, and a main flow passage 45.

The individual flow passages 41 to 44 respectively bifurcate from the main flow passage 45 and are connected to the wheel cylinders 23FR, 23FL, 23RR, 23RL of the corresponding disc brake units 21FR, 21FL, 21RR, 21RL. Thus, each wheel cylinder 23 is capable of communicating with the main flow passage 45 independently.

Further, Anti-lock Brake System (ABS) holding valves 51, 52, 53 and 54 are provided at respective midway points in the individual flow passages 41, 42, 43 and 44. The ABS holding valves 51 to 54 are constituted by normally open solenoid control valves which respectively include ON/OFF-controlled solenoids and springs and open when all of the solenoids are in a non-electrified state.

Further, when open, the ABS holding valves 51 to 54 allow the brake fluid to flow bidirectionally. Normally, hydraulic pressure can be supplied by supplying the brake fluid from the main flow passage 45 to the wheel cylinder 23.

The brake fluid can also flow in the opposite direction from the wheel cylinder 23 to the main flow passage 45. When the solenoids are electrified such that the ABS holding valves 51 to 54 are closed, the flow of brake fluid through the individual flow passages 41 to 44 is blocked such that normally, the hydraulic pressure supply is blocked.

Further, the wheel cylinder 23 is connected to a reservoir flow passage 55 via pressure reducing flow passages 46, 47, 48 and 49 connected respectively to the individual flow passages 41 to 44. ABS pressure reducing valves 56, 57, 58 and 59 are provided respectively at midway points in the pressure reducing flow passages 46, 47, 48 and 49.

The ABS pressure reducing valves 56 to 59 are constituted by normally closed solenoid control valves which respectively include ON/OFF-controlled solenoids and springs and close when all of the solenoids are in a non-electrified state. When the ABS pressure reducing valves 56 to 59 are closed, the flow of brake fluid through the pressure reducing flow passages 46 to 49 is blocked.

When the solenoids are electrified such that the ABS pressure reducing valves 56 to 59 open, the brake fluid is allowed to flow through the pressure reducing flow passages 46 to 49, whereby the brake fluid is circulated from the wheel cylinder 23 to the reservoir 34 via the pressure reducing flow passages 46 to 49 and the reservoir flow passage 55. As a result, the hydraulic pressure of the wheel cylinder 23 is normally reduced from an increased pressure state to a reduced pressure state. Note that the reservoir flow passage 55 is connected to the reservoir 34 of the master cylinder unit 27 via a reservoir pipe 77.

The main flow passage 45 includes a separation valve 60 provided midway (note that the separation valve is also referred to as a communicating valve, but will be referred to in this embodiment as a separation valve). The main flow passage 45 is separated into a first flow passage 45a connecting the individual flow passages 41 and 42 and a second flow passage 45b connecting the individual flow passages 43 and 44 by the separation valve 60.

The first flow passage 45a is connected to the front wheel side wheel cylinders 23FR and 23FL via the individual flow passages 41 and 42, and the second flow passage 45b is connected to the rear wheel side wheel cylinders 23RR and 23RL via the individual flow passages 43 and 44.

The separation valve 60 is constituted by a normally closed solenoid control valve which includes an ON/OFF-controlled solenoid and a spring, and closes when the solenoid is in a non-electrified state. When the separation valve 60 is closed, the flow of brake fluid through the main flow passage 45 is blocked. When the solenoid is electrified such that the separation valve 60 opens, the brake fluid is allowed to flow bidirectionally between the first flow passage 45a and the second flow passage 45b.

Further, a master flow passage 61 and a regulator flow passage 62 are formed in the hydraulic actuator 40 to communicate with the main flow passage 45. More specifically, the master flow passage 61 is connected to the first flow passage 45a of the main flow passage 45, and the regulator flow passage 62 is connected to the second flow passage 45b of the main flow passage 45. The master flow passage 61 is also connected to the master pipe 37 communicating with the master cylinder 32, while the regulator flow passage 62 is connected to the regulator pipe 38 communicating with the regulator 33.

The master pipe 37 and the master flow passage 61 normally correspond to the first hydraulic system 161. The regulator pipe 38 and the regulator flow passage 62 normally correspond to the second hydraulic system 162.

The master flow passage 61 includes a master cut valve 64 provided midway. The master cut valve 64 is constituted by a normally open solenoid control valve which includes an ON/OFF-controlled solenoid and a spring, and opens when the solenoid is in a non-electrified state.

When open, the master cut valve 64 allows the brake fluid to flow bidirectionally between the master cylinder 32 and the first flow passage 45a of the main flow passage 45. When the solenoid is electrified such that the master cut valve 64 closes, the flow of brake fluid through the master flow passage 61 is blocked such that normally, a hydraulic pressure supply through the first flow passage 45a from the master cylinder 32 is blocked.

Further, a stroke simulator 69 is connected to the master flow passage 61 via a simulator cut valve 68 on an upstream side of the master cut valve 64. In other words, the simulator cut valve 68 is provided in a flow passage connecting the master cylinder 32 and the stroke simulator 69. The simulator cut valve 68 is a normally closed solenoid control valve which includes an ON/OFF-controlled solenoid and a spring, and closes when the solenoid is in a non-electrified state.

When the simulator cut valve 68 is closed, the flow of brake fluid between the master flow passage 61 and the stroke simulator 69 is blocked. When the solenoid is electrified such that the simulator cut valve 68 opens, the brake fluid is allowed to flow bidirectionally between the master cylinder 32 and the stroke simulator 69.

Further, the stroke simulator 69 includes a plurality of pistons and springs, and when the simulator cut valve 68 is open, the stroke simulator 69 creates a reaction force corresponding to a depression force generated by the driver in relation to the brake pedal 24. A stroke simulator having a multistage spring characteristic is preferably employed as the stroke simulator 69 to improve the feeling of the brake operations performed by the driver, and it is therefore assumed that in this embodiment, the stroke simulator 69 has a multistage spring characteristic.

Further, the regulator flow passage 62 includes a regulator cut valve 65 provided midway. The regulator cut valve 65 is also constituted by a normally open solenoid control valve which includes an ON/OFF-controlled solenoid and a spring and opens when the solenoid is in a non-electrified state.

When open, the regulator cut valve 65 allows the brake fluid to flow bidirectionally between the regulator 33 and the second flow passage 45b of the main flow passage 45. When the solenoid is electrified such that the regulator cut valve 65 closes, the flow of brake fluid through the regulator flow passage 62 is blocked such that normally, a hydraulic pressure supply to the second flow passage 45b from the regulator 33 is blocked.

In addition to the master flow passage 61 and the regulator flow passage 62, an accumulator flow passage 63 is formed in the hydraulic actuator 40. One end of the accumulator flow passage 63 is connected to the second flow passage 45b of the main flow passage 45, and the other end is connected to the accumulator pipe 39 communicating with the accumulator 35.

The accumulator flow passage 63 includes a pressure increasing linear control valve 66 provided midway. Further, the accumulator flow passage 63 and the second flow passage 45b of the main flow passage 45 are connected to the reservoir flow passage 55 via a pressure reducing linear control valve 67. The pressure increasing linear control valve 66 and the pressure reducing linear control valve 67 are respectively constituted by normally closed solenoid control valves which include linear solenoids and springs and close when the solenoids are in a non-electrified state. Respective openings of the pressure increasing linear control valve 66 and the pressure reducing linear control valve 67 are adjusted in proportion to currents supplied to the respective solenoids thereof.

The pressure increasing linear control valve 66 is provided as a shared pressure increasing control valve shared by the wheel cylinders 23 provided in a plurality in relation to the respective vehicle wheels. Similarly, the pressure reducing linear control valve 67 is provided as a shared pressure reducing control valve shared by the respective wheel cylinders 23.

Hence, in this embodiment, the pressure increasing linear control valve 66 and the pressure reducing linear control valve 67 are provided as a pair of shared control valves for controlling supply and discharge of the working fluid discharged from the power hydraulic pressure source 30 to and from the respective wheel cylinders 23. Normally, when the pressure increasing linear control valve 66 is open, hydraulic pressure from the accumulator 35 can be supplied to the second flow passage 45b, and when the pressure reducing linear control valve 67 is open, brake fluid in the second flow passage 45b can be discharged, leading to a reduction in hydraulic pressure.

Note that a differential pressure between an outlet and an inlet of the pressure increasing linear control valve 66 corresponds to a differential pressure between the pressure of the brake fluid in the accumulator 35 and the pressure of the brake fluid in the main flow passage 45. Further, a differential pressure between an outlet and an inlet of the pressure reducing linear control valve 67 corresponds to a differential pressure between the pressure of the brake fluid in the main flow passage 45 and the pressure of the brake fluid in the reservoir 34.

Further, assuming that an electromagnetic drive force corresponding to a power supply to the linear solenoids of the pressure increasing linear control valve 66 and pressure reducing linear control valve 67 is $F1$, a biasing force of the springs is $F2$, and a differential pressure acting force corresponding to the differential pressures between the outlets and inlets of the pressure increasing linear control valve 66 and pressure reducing linear control valve 67 is $F3$, a relationship of $F1+F3=F2$ is established.

Hence, by controlling the power supply to the linear solenoids of the pressure increasing linear control valve 66 and pressure reducing linear control valve 67 continuously, the differential pressures between the outlets and inlets of the pressure increasing linear control valve 66 and pressure reducing linear control valve 67 can be controlled.

In the hydraulic brake unit 20, the power hydraulic pressure source 30 and the hydraulic actuator 40 are controlled by a brake ECU 70 serving as a control unit according to this embodiment. The brake ECU 70 is constituted by a microprocessor having a Central Processing Unit (CPU), and in addition to the CPU includes a Read-Only Memory (ROM) that stores various programs, a Random Access Memory (RAM) that stores data temporarily, an input/output port, a communication port, and so on.

Further, the brake ECU 70 is capable of communicating with an upper order hybrid ECU or the like. Moreover, by controlling the pump 36 of the power hydraulic pressure source 30 and the solenoid control valves (the ABS holding valves 51 to 54, ABS pressure reducing valves 56 to 59, separation valve 60, master cut valve 64, regulator cut valve 65, pressure increasing linear control valve 66, pressure reducing linear control valve 67, and simulator cut valve 68) constituting the hydraulic actuator 40 on the basis of control signals from the hybrid ECU and signals from various sensors, the brake ECU 70 can control a hydraulic braking force.

A regulator pressure sensor 71, an accumulator pressure sensor 72, and a control pressure sensor 73 are connected to the brake ECU 70. The regulator pressure sensor 71 detects the pressure of the brake fluid in the regulator flow passage 62 on the upstream side of the regulator cut valve 65, or in other words the regulator pressure, and transmits a signal indicating the detected value to the brake ECU 70.

The accumulator pressure sensor 72 detects the pressure of the brake fluid in the accumulator flow passage 63 on the upstream side of the pressure increasing linear control valve

66, or in other words the accumulator pressure, and transmits a signal indicating the detected value to the brake ECU 70.

Further, the control pressure sensor 73 detects the pressure of the brake fluid in the first flow passage 45*a* of the main flow passage 45, and transmits a signal indicating the detected value to the brake ECU 70. Further, when the separation valve 60 is open such that the first flow passage 45*a* communicates with the second flow passage 45*b*, the control pressure sensor 73 detects the pressure of the brake fluid in the main flow passage 45. The detection values of the respective pressure sensors 71 to 73 are applied to the brake ECU 70 successively at predetermined time intervals, and stored in predetermined amounts in a predetermined storage area of the brake ECU 70.

Hence, when the separation valve 60 is open such that the first flow passage 45*a* and the second flow passage 45*b* of the main flow passage 45 communicate with each other, an output value of the control pressure sensor 73 indicates the hydraulic pressure on a low pressure side of the pressure increasing linear control valve 66 and the hydraulic pressure on a high pressure side of the pressure reducing linear control valve 67. Therefore, this output value of the control pressure sensor 73 can be used to control the pressure increasing linear control valve 66 and the pressure reducing linear control valve 67.

Further, when the pressure increasing linear control valve 66 and the pressure reducing linear control valve 67 are closed and the master cut valve 64 is open, the output value of the control pressure sensor 73 indicates the master cylinder pressure. Furthermore, when the separation valve 60 is open such that the first flow passage 45*a* and second flow passage 45*b* of the main flow passage 45 communicate with each other and the respective ABS holding valves 51 to 54 are open but the respective ABS pressure reducing valves 56 to 59 are closed, the output value of the control pressure sensor 73 indicates a brake hydraulic pressure acting on the respective wheel cylinders 23, or in other words a wheel cylinder pressure.

Moreover, when the regulator cut valve 65 is opened while the separation valve 60 is open such that the first flow passage 45*a* and second flow passage 45*b* of the main flow passage 45 communicate with each other, the output value of the control pressure sensor 73 normally becomes equal to the output value of the regulator pressure sensor 71.

Normally, when the vehicle is stationary, the pressure increasing linear control valve 66 and pressure reducing linear control valve 67 are both closed, the separation valve 60 is opened, and the regulator cut valve 65 is opened such that the depression force of the brake pedal 24 is transmitted to the wheel cylinder 23. This state corresponds to a stationary regulator pressure increasing mode, to be described in detail below.

The sensors connected to the brake ECU 70 further include a stroke sensor 25 provided in the brake pedal 24. The stroke sensor 25 detects a pedal stroke, i.e. the operation amount of the brake pedal 24, and transmits a signal indicating the detected value to the brake ECU 70. The output value of the stroke sensor 25 is also applied successively to the brake ECU 70 at predetermined time intervals and stored in predetermined amounts in a predetermined storage area of the brake ECU 70.

Note that a brake operation condition detecting means other than the stroke sensor 25 may be provided in addition to or instead of the stroke sensor 25 and connected to the brake ECU 70. For example, the brake operation condition detecting means may be a pedal depression force sensor that detects an operating force of the brake pedal 24, a brake switch that detects that the brake pedal 24 has been depressed, and so on. Further, a vehicle wheel speed sensor and so on, not shown in the drawings, are connected to the brake ECU 70, and detection signals from these sensors are applied to the brake ECU 70 at predetermined time intervals and held in a predetermined storage area thereof.

Further, a brake operation input means is not limited to the brake pedal 24 serving as the brake operating member, and may be constituted by a push button, for example. When the brake operation input means is constituted by a push button, a pressing force sensor that detects an operating force of the push button, a push button switch that detects that the push button has been pressed, and so on are provided in addition to a stroke sensor that detects the stroke of the push button.

The hydraulic brake unit 20 constituted as described above is capable of taking three control modes, for example, i.e. a linear control mode, a travel regulator pressure increasing mode, and the stationary regulator pressure increasing mode. In all of the control modes, the hydraulic brake unit 20 is controlled by the brake ECU 70. Hereafter, the travel regulator pressure increasing mode will be referred to as a travel Reg increasing mode and the stationary regulator pressure increasing mode will be referred to as a stationary Reg increasing mode.

Further, when rapid braking is applied during travel, the hydraulic brake unit 20 may take a linear REG assist mode in which braking is performed by adding an oil pressure supply passing through the regulator pipe 38 to an oil pressure supply passing through the accumulator pipe 39. Note that when normal braking is applied during travel, the hydraulic brake unit 20 takes the linear control mode in which oil pressure is supplied via the accumulator pipe 39. Furthermore, when an abnormality is detected in the pipe system or the like, the hydraulic brake unit 20 may take a backup mode in which the brake ECU 70 abandons electrification control of all valves and supplies the pressure of the regulator 33 and the master cylinder 32 to the wheel cylinder 23.

In the linear control mode, each wheel cylinder 23 is blocked from the master cylinder unit 27. More specifically, the brake ECU 70 closes the regulator cut valve 65 such that the brake fluid discharged from the regulator 33 is not supplied to the main flow passage 45.

Further, the brake ECU 70 closes the master cut valve 64 and opens the simulator cut valve 68 so that when the driver operates the brake pedal 24, the brake fluid discharged from the master cylinder 32 is supplied to the stroke simulator 69. The brake ECU 70 also opens the separation valve 60.

Furthermore, in the linear control mode, the brake ECU 70 calculates a hydraulic braking force to be generated by the hydraulic brake unit 20 by subtracting a regenerative braking force from a required braking force. Here, the value of the regenerative braking force is supplied to the brake ECU 70 from the hybrid ECU.

On the basis of the calculated hydraulic braking force, the brake ECU 70 then calculates a target hydraulic pressure of each wheel cylinder 23FR to 23RL. The brake ECU 70 then determines the values of the currents to be supplied to the pressure increasing linear control valve 66 and the pressure reducing linear control valve 67 using feedback control so that the wheel cylinder pressure corresponds to the target hydraulic pressure.

As a result, in the hydraulic brake unit 20, brake fluid is supplied to each wheel cylinder 23 from the power hydraulic pressure source 30 via the pressure increasing linear control valve 66 such that a predetermined target braking force is applied to the vehicle wheels. Further, brake fluid is discharged from each wheel cylinder 23 via the pressure reducing linear control valve 67 as necessary such that the braking force applied to the vehicle wheels is adjusted appropriately.

Hence, in the linear control mode, brake regeneration cooperative control for generating the required braking force is executed using hydraulic braking and regenerative braking in conjunction.

Further, during automatic braking control such as so-called Auto Cruise Control (ACC) and Vehicle Stability Control (VSC), a braking operation is executed using similar hydraulic control to that performed in the linear control mode described above.

In the travel Reg increasing mode, the brake ECU 70 halts the supply of the control current to the pressure increasing linear control valve 66 to close the pressure increasing linear control valve 66, whereby the power hydraulic pressure source 30 is shut off from the respective wheel cylinders 23. Further, the brake ECU 70 opens the regulator cut valve 65, the master cut valve 64, and the simulator cut valve 68. The brake ECU 70 also opens the separation valve 60.

In the stationary Reg increasing mode, the open/closed state of the regulator cut valve 65 differs from that of the travel Reg increasing mode, but the open/closed states of the other solenoid control valves are identical. In other words, the stationary Reg increasing mode differs from the travel Reg increasing mode in that the regulator cut valve 65 is closed.

As a result, in the stationary Reg increasing mode, the regulator pressure is transmitted as is to the wheel cylinder 23, and therefore a hydraulic braking force corresponding to the operation amount of the brake pedal 24 by the driver can be generated.

The brake ECU 70 selects one of the linear control mode, the travel Reg increasing mode, the stationary Reg increasing mode, and so on in accordance with the traveling speed of the vehicle, vehicle conditions such as the value of the regenerative braking force, or an instruction from the driver.

Next, a second embodiment in which the separation valve control unit 110 described in the first embodiment closes the separation valve 160 when the brake fluid stored in the reservoir 134 remains in a reduced state for a fixed duration. In the example to be described in the second embodiment, the duration of the reduced brake fluid state in the reservoir 134 is integrated, and when the duration exceeds a predetermined reduction detection time, the separation valve 160 is closed, assuming that a fault has occurred.

In so doing, the occurrence of a fault can be determined with greater reliability. Note that the representative example to be described in the second embodiment is constituted identically to the hydraulic brake unit 120 described in the first embodiment with the exception of the separation valve control unit 110, and therefore description of identical parts has been omitted. Further, identical numerals have been allocated to parts that are identical to the hydraulic brake unit 120, and description thereof has been omitted.

Figure 4:
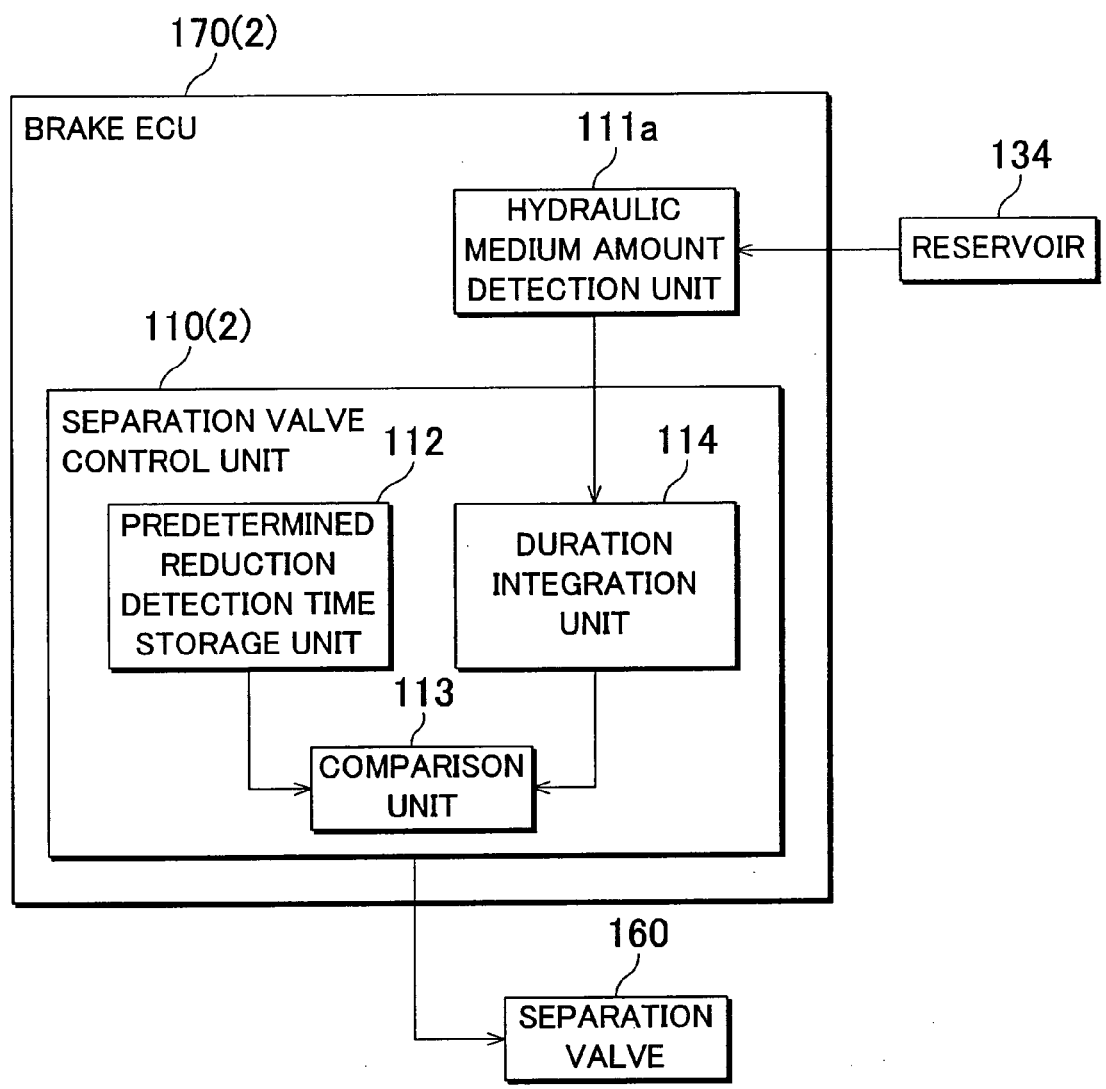
FIG. 4 is a schematic block diagram showing an example of the constitution of a brake electronic control unit (ECU) according to a second embodiment of the invention.

FIG. 4 is a schematic block diagram showing an example of the constitution of a brake ECU 170 (2) according to the second embodiment. As shown in FIG. 4, the brake ECU 170 (2) includes the hydraulic medium amount detection unit 111a that detects a reduction in the amount of brake fluid stored in the reservoir 134.

Further, a separation valve control unit 110 (2) includes a duration integration unit 114 that calculates the duration of a state in which a reduction in the brake fluid stored in the reservoir 134 is detected. The separation valve control unit 110 (2) also includes a predetermined reduction detection time storage unit 112 that stores a threshold of the reduction detection time relating to the amount of brake fluid stored in the reservoir 134. The separation valve control unit 110 (2) also includes a comparison unit 113 that compares the duration integrated by the duration integration unit 114 and the threshold time stored in advance in the predetermined reduction detection time storage unit 112.

Figure 5:
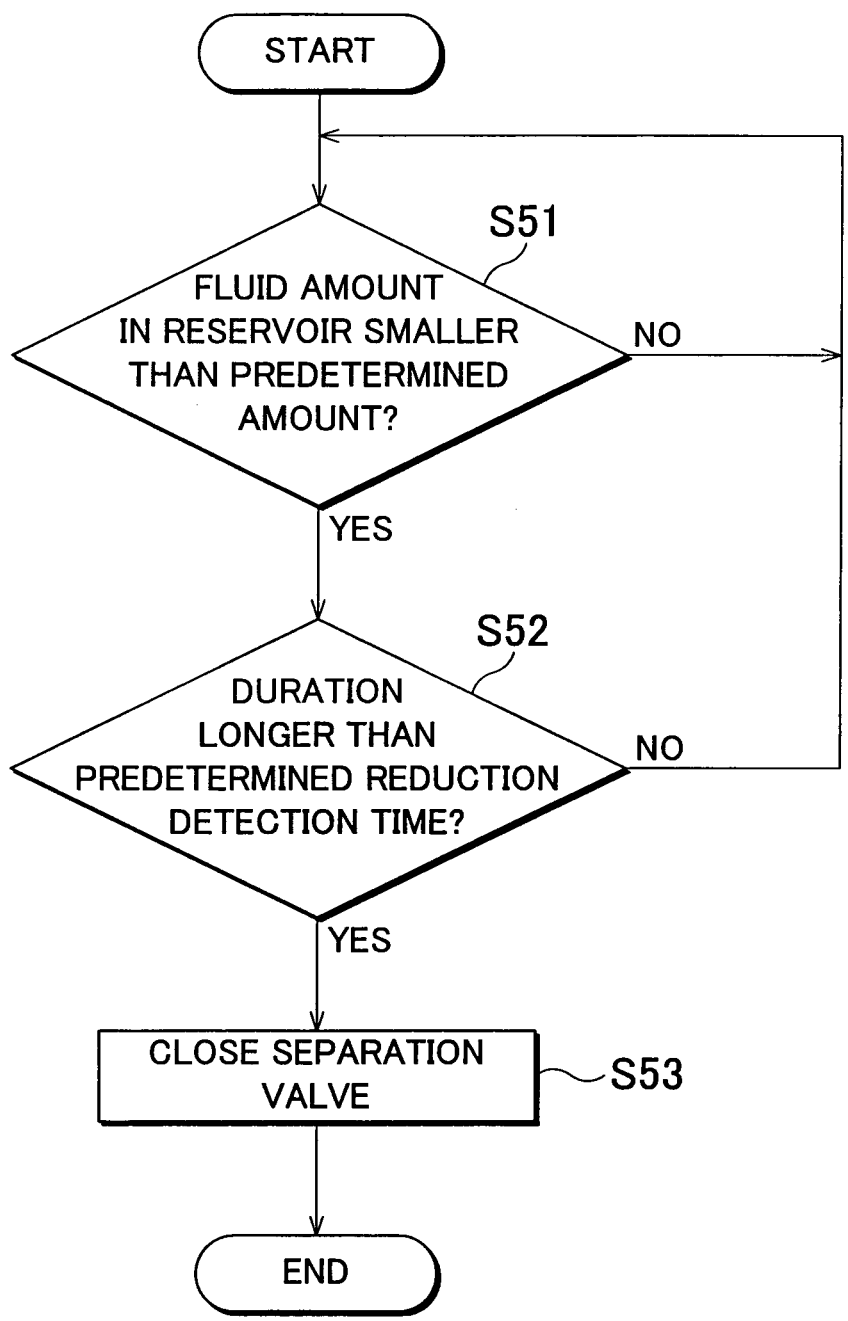
FIG. 5 is a schematic flowchart showing processing executed by the brake ECU according to the second embodiment of the invention.

Next, an outline of operation processing executed by the brake ECU 170 (2) will be described using FIG. 5. FIG. 5 is a schematic flowchart showing processing executed mainly by the brake ECU 170 (2). The steps shown in FIG. 5 will now be described in sequence.

First, in step S51, the hydraulic medium amount detection unit 111a determines whether or not the amount of brake fluid stored in the reservoir 134 has decreased below a predetermined amount. When the hydraulic medium amount detection unit 111a determines that the amount of brake fluid stored in the reservoir 134 has decreased below the predetermined amount (YES in step S51), the routine advances to step S52.

When the hydraulic medium amount detection unit 111a determines that the amount of brake fluid stored in the reservoir 134 has not decreased below the predetermined amount, the routine enters standby in step S51 (NO in step S51).

Next, in step S52, the separation valve control unit 110 (2) determines whether or not a detection period of step S51 is longer than the predetermined reduction detection time. More specifically, the duration integration unit 114 receives a detection signal from the hydraulic medium amount detection unit 111a and integrates the duration of the detection signal.

Further, the comparison unit 113 compares the threshold time stored in advance in the predetermined reduction detection time storage unit 112 with the duration integrated by the duration integration unit 114. When the duration is longer than the threshold time, the routine advances to step S53 (YES in step S52), and when the duration is not longer than the threshold time, the routine returns to step S51 (NO in step S52).

It is assumed that integration of the duration by the duration integration unit 114 and the comparison determination made by the comparison unit 113 can be performed simultaneously and in parallel in real time. In other words, it is assumed that the comparison unit 113 performs the comparison processing as needed at very short period intervals simultaneously and in parallel with the duration integration performed by the duration integration unit 114. It may therefore be said that the comparison unit 113 monitors the duration constantly to determine whether or not the duration has exceeded the threshold time. Then, when the integrated duration exceeds the threshold time, the routine advances to step S53 without delay.

Next, in step S53, the separation valve control unit 110 (2) closes the separation valve 160. In other words, through the processing of step S51 and step S52, the brake ECU 170 (2) determines whether or not a fault has occurred. When it is determined that a fault has occurred, the separation valve control unit 110 (2) closes the separation valve 160 to block the flow path of the brake fluid in the main flow passage 145, and as a result, excessive decrease of the brake fluid can be suppressed.

In the second embodiment, it is possible to determine with improved speed and accuracy whether a reduction in the amount of brake fluid stored in the reservoir 134 is a temporary reduction not caused by a fault or a reduction caused by a fault. Therefore, excessive safety measures corresponding to an erroneous determination are not taken when a sudden reduction in the brake fluid not caused by a fault occurs, and as a result, an appropriate braking function and brake feeling can be maintained.

Next, a case in which the brake ECU detects a faulty system will be described as a third embodiment. In the third embodiment, the brake ECU includes a faulty system determination unit which detects a faulty system through control of desired valves of the hydraulic brake unit and from the brake fluid reduction state of the reservoir 134.

Note that in the following description, a representative example of the hydraulic brake unit will be described, and therefore the hydraulic brake unit has an identical constitution to the hydraulic brake unit 120 described in the first embodiment. Accordingly, redundant description thereof has been omitted. Further, identical numerals have been allocated to parts that are identical to the hydraulic brake unit 120, and description thereof has been omitted.

Figure 6:
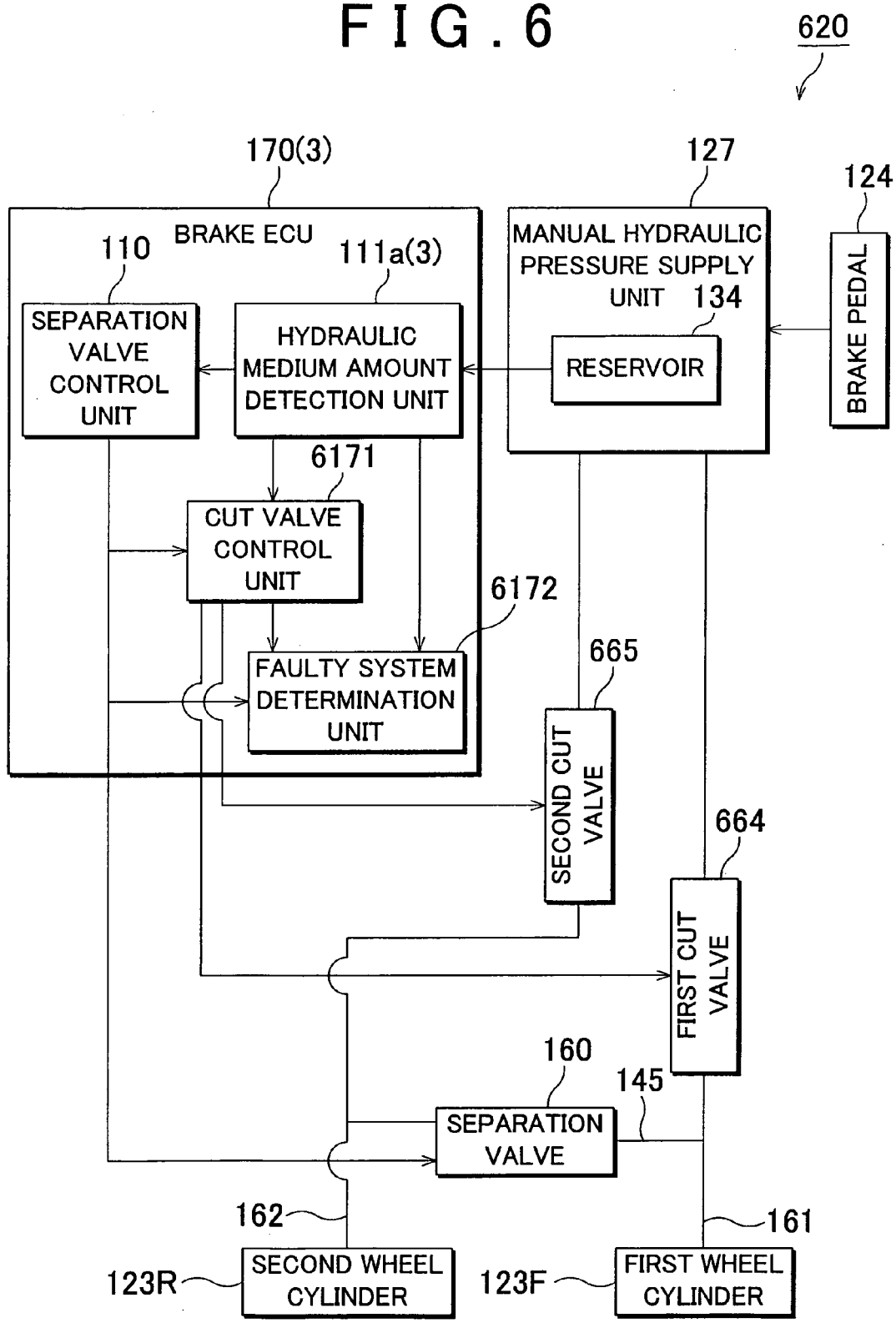
FIG. 6 is a schematic block diagram showing the constitution of a hydraulic brake unit according to a third embodiment of the invention.

FIG. 6 is a schematic block diagram showing the constitution of a hydraulic brake unit 620 according to the third embodiment. As shown in FIG. 6, in the hydraulic brake unit 620, a first cut valve 664 is provided in the first hydraulic system 161. Further, in the hydraulic brake unit 620, a second cut valve 665 is provided in the second hydraulic system 162. The first cut valve 664 typically corresponds to the master cut valve 64 shown in FIG. 3 and the second cut valve 665 typically corresponds to the regulator cut valve 65 shown in FIG. 3.

A brake ECU 170 (3) of the hydraulic brake unit 620 includes a cut valve control unit 6171 that controls opening/closing of the first cut valve 664 and second cut valve 665. The brake ECU 170 (3) also includes a faulty system determination unit 6172 that determines whether a faulty system is the first hydraulic system 161 or the second hydraulic system 162.

Further, a hydraulic medium amount detection unit 111a (3) of the hydraulic brake unit 620 detects the brake fluid reduction in real time as well as determining whether or not the brake fluid stored in the reservoir 134 has decreased below the predetermined amount.

When the hydraulic medium amount detection unit 111a (3) determines that the brake fluid stored in the reservoir 134 has decreased below the predetermined amount, the separation valve control unit 110 closes the separation valve 160 and the cut valve control unit 6171 closes one of the first cut valve 664 and the second cut valve 665.

The hydraulic medium amount detection unit 111a (3) then detects the reduction state of the brake fluid stored in the reservoir 134 in real time. The detected value of the reduction state detected by the hydraulic medium amount detection unit 111a (3) is input into the faulty system determination unit 6172, and when the stored brake fluid amount continues to decrease, the faulty system determination unit 6172 determines that a fault has occurred in a different system to the system closed by the cut valve control unit 6171.

When the stored brake fluid amount stops decreasing, on the other hand, the faulty system determination unit 6172 determines that a fault has occurred in the system closed by the cut valve control unit 6171. In other words, valve control information is input into the faulty system determination unit 6172 from the separation valve control unit 110 and the cut valve control unit 6171, and the fluid reduction state is input into the faulty system determination unit 6172 from the hydraulic medium amount detection unit 111a (3) in real time.

From the input information, the faulty system determination unit 6172 determines the faulty system. For example, when the brake fluid continues to decrease even though the cut valve control unit 6171 has closed the second cut valve 665, the faulty system determination unit 6172 determines that a fault has occurred in the first cut valve 664.

When the second cut valve 665 is closed while the separation valve 160 is closed, it is assumed that brake fluid leakage from the second hydraulic system 162 and the second wheel cylinder 123R stops. When a reduction in brake fluid is detected in this case, it is assumed that a fault has occurred in the first hydraulic system 161 and that brake fluid is leaking due to this fault.

Figure 7:
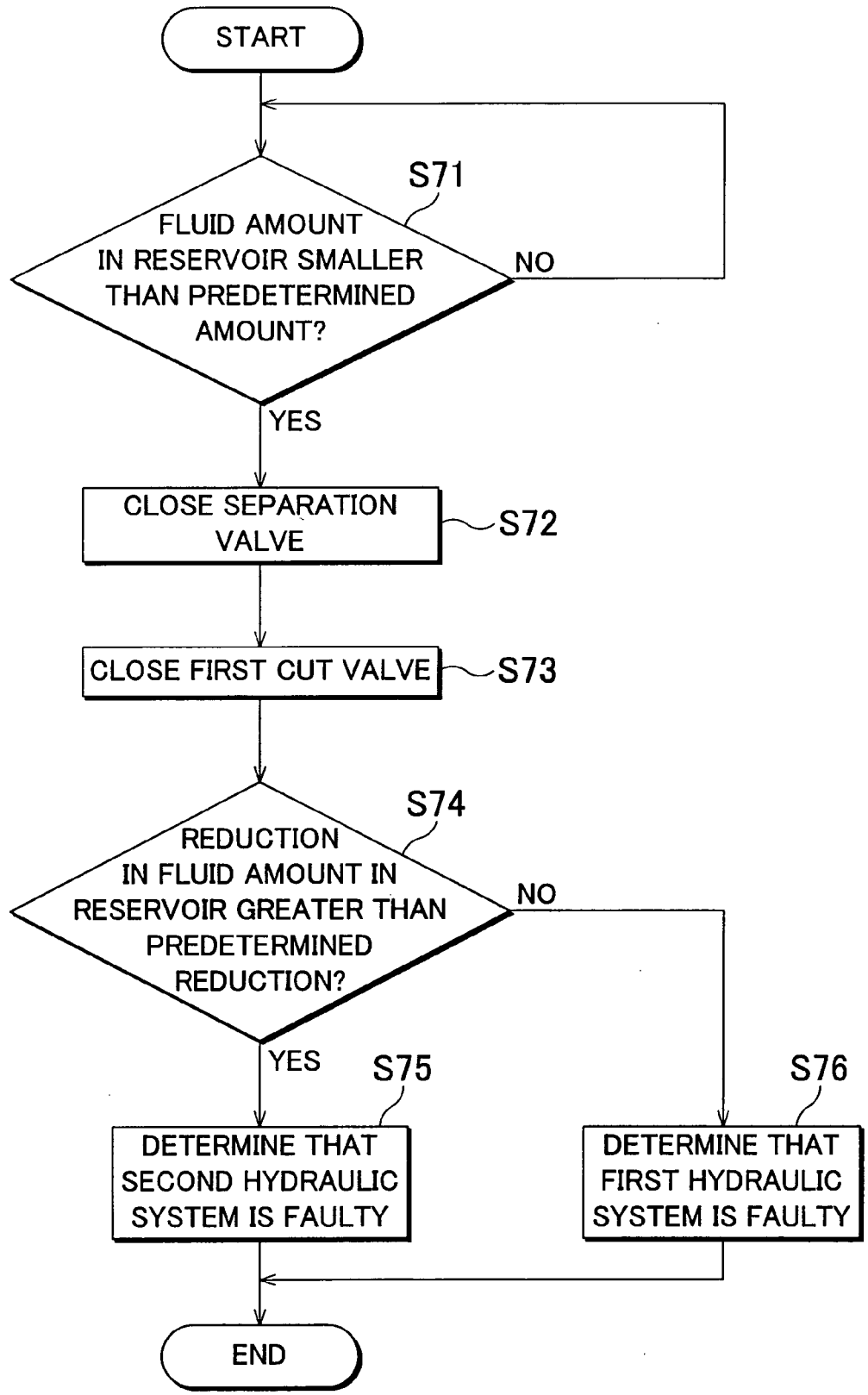
FIG. 7 is a schematic flowchart illustrating operation processing executed by the hydraulic brake unit according to the third embodiment of the invention.

Next, an operation processing flow of the hydraulic brake unit 620 will be described using FIG. 7. FIG. 7 is a schematic flowchart illustrating an outline of the operation processing executed by the hydraulic brake unit 620. Here, the steps of the operation processing executed by the hydraulic brake unit 620, shown in FIG. 7, will be described in sequence.

First, in step S71, the hydraulic medium amount detection unit 111a (3) determines whether or not the amount of brake fluid stored in the reservoir 134 has decreased below the predetermined amount. When the hydraulic medium amount detection unit 111a (3) determines that the amount of brake fluid stored in the reservoir 134 has decreased below the predetermined amount, a corresponding detection signal is transmitted to the separation valve control unit 110 and the cut valve control unit 6171.

When the hydraulic medium amount detection unit 111a (3) determines that the amount of brake fluid stored in the reservoir 134 has decreased below the predetermined amount, the routine advances to step S72 (YES in step S71). When the hydraulic medium amount detection unit 111a (3) determines that the amount of brake fluid stored in the reservoir 134 has not decreased below the predetermined amount, the routine enters standby in step S71 (NO in step S71).

Next, in step S72, the separation valve control unit 110 closes the separation valve 160. Through the operation processing of step S72, the flow of brake fluid between the first hydraulic system 161 and the second hydraulic system 162 via the main flow passage 145 can be blocked.

Next, in step S73, the cut valve control unit 6171 closes the first cut valve 664. Through the operation processing of step S73, the supply of brake fluid to the downstream side of the first cut valve 664 in the first hydraulic system 161 can be suppressed. Hence, when a fault has occurred on the periphery of the first wheel cylinder 123F, further leakage of the brake fluid can be stopped by the processing of step S73.

Next, in step S74, the hydraulic medium amount detection unit 111a (3) determines whether or not the reduction in the brake fluid stored in the reservoir 134 is larger than a predetermined reduction. When the hydraulic medium amount detection unit 111a (3) determines that the reduction in the brake fluid stored in the reservoir 134 is larger than the predetermined reduction, the routine advances to step S75 (YES in step S74). When the hydraulic medium amount detection unit 111a (3) determines that the reduction in the brake fluid stored in the reservoir 134 is not larger than the predetermined reduction, the routine advances to step S76 (NO in step S74).

Further, the hydraulic medium amount detection unit 111a (3) transmits the detection result indicating whether or not the reduction in the brake fluid stored in the reservoir 134 is larger than the predetermined reduction to the faulty system determination unit 6172. Further, it is assumed that a remaining amount of fluid corresponding to the predetermined reduction of step S74 is smaller than the predetermined amount of step S71. In other words, the hydraulic medium amount detection unit 111a (3) determines whether or not the brake fluid is continuing to decrease regardless of the processing of step S72 and step S73.

Next, in step S75, the faulty system determination unit 6172 determines that a fault has occurred in the second hydraulic system 162. In other words, when the stored fluid amount in the reservoir 134 continues to decrease even though the first cut valve 664 was closed in step S73, it may be determined that fluid leakage is occurring due to a fault in the second hydraulic system 162, and more particularly on the periphery of the second wheel cylinder 123R.

Next, in step S76, the faulty system determination unit 6172 determines that a fault has occurred in the first hydraulic system 161. In other words, when the stored fluid amount in the reservoir 134 stops decreasing after the first cut valve 664 is closed in step S73, it may be determined that fluid leakage is occurring due to a fault in the first hydraulic system 161, and more particularly on the periphery of the first wheel cylinder 123F.

Note that the hydraulic medium amount detection unit 111a (3) is preferably capable of detecting the fluid amount in the reservoir 134 in real time. Further, as well as being able to detect the fluid amount in the reservoir 134 in real time, it is preferably possible to set the predetermined reduction used in the processing of step S74 in advance or to modify the predetermined reduction at the time of vehicle maintenance or the like. By modifying the predetermined reduction used in step S74 appropriately in accordance with vehicle conditions and so on, the faulty system can be determined more accurately.

Further, it is preferably possible to set the predetermined amount used in step S71 in advance or modify it at the time of vehicle maintenance or the like. In so doing, the determination reference for closing the separation valve 160 can be adjusted appropriately in accordance with the vehicle conditions and so on. Moreover, in so doing it is possible not only to avoid erroneous determinations, but also to avoid situations in which a normal brake mode is interrupted and the separation valve 160 closed due to an erroneous determination, whereby an unnecessary safety operation is executed and the brake feeling is modified.

Figure 8:
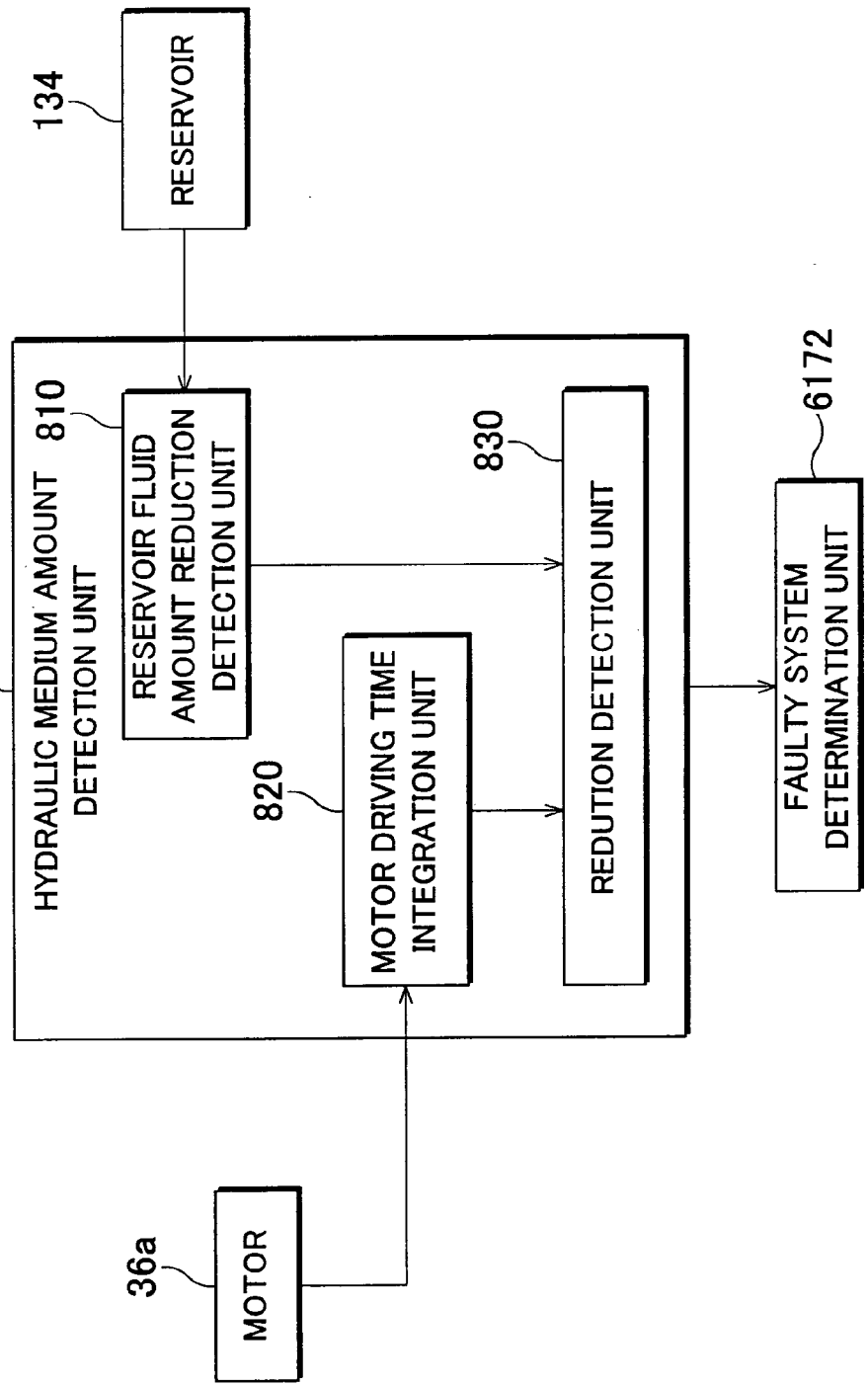
FIG. 8 is a schematic block diagram showing a modified example of a hydraulic medium amount detection unit according to the third embodiment of the invention.

The hydraulic medium amount detection unit 111a (3) according to the third embodiment of the invention may be constituted as shown by a modified example in FIG. 8. FIG. 8 is a schematic block diagram showing a modified example of the hydraulic medium amount detection unit 111a (3). In this modified example, erroneous determinations of a reduction in the fluid amount can be reduced.

As shown in FIG. 8, a hydraulic medium amount detection unit 111a (3b) includes a reservoir fluid amount reduction detection unit 810 that determines whether the amount of brake fluid stored in the reservoir 134 is smaller than a predetermined amount. The hydraulic medium amount detection unit 111a (3b) also includes a motor driving time integration unit 820 that integrates a driving time of the motor 36a in the power hydraulic pressure source 30.

Outputs from the reservoir fluid amount reduction detection unit 810 and the motor driving time integration unit 820 are input into a reduction detection unit 830. When the output of the reservoir fluid amount reduction detection unit 810 indicates that the fluid amount in the reservoir 134 is smaller than the predetermined amount and the output of the motor driving time integration unit 820 indicates that the integrated driving time is 10 seconds, for example, the reduction detection unit 830 determines that the fluid amount in the reservoir 134 has decreased due to a fault.

The motor 36a is driven in accordance with a braking instruction corresponding to depression of the brake pedal 124 or a braking instruction corresponding to automatic braking control, for example. Hence, the hydraulic medium amount detection unit 111a (3b) can avoid erroneous determinations caused by a temporary reduction in the fluid amount in the reservoir 134 and detect a state of reduction in the fluid amount based on a fault with a high degree of reliability.

Next, a hydraulic brake unit according to a fourth embodiment, which is capable of recognizing a brake fluid reduction state accurately using vibration of the reservoir 134 and suppressing erroneous determinations of a system fault thereby, will be described using FIG. 9.

Figure 9:
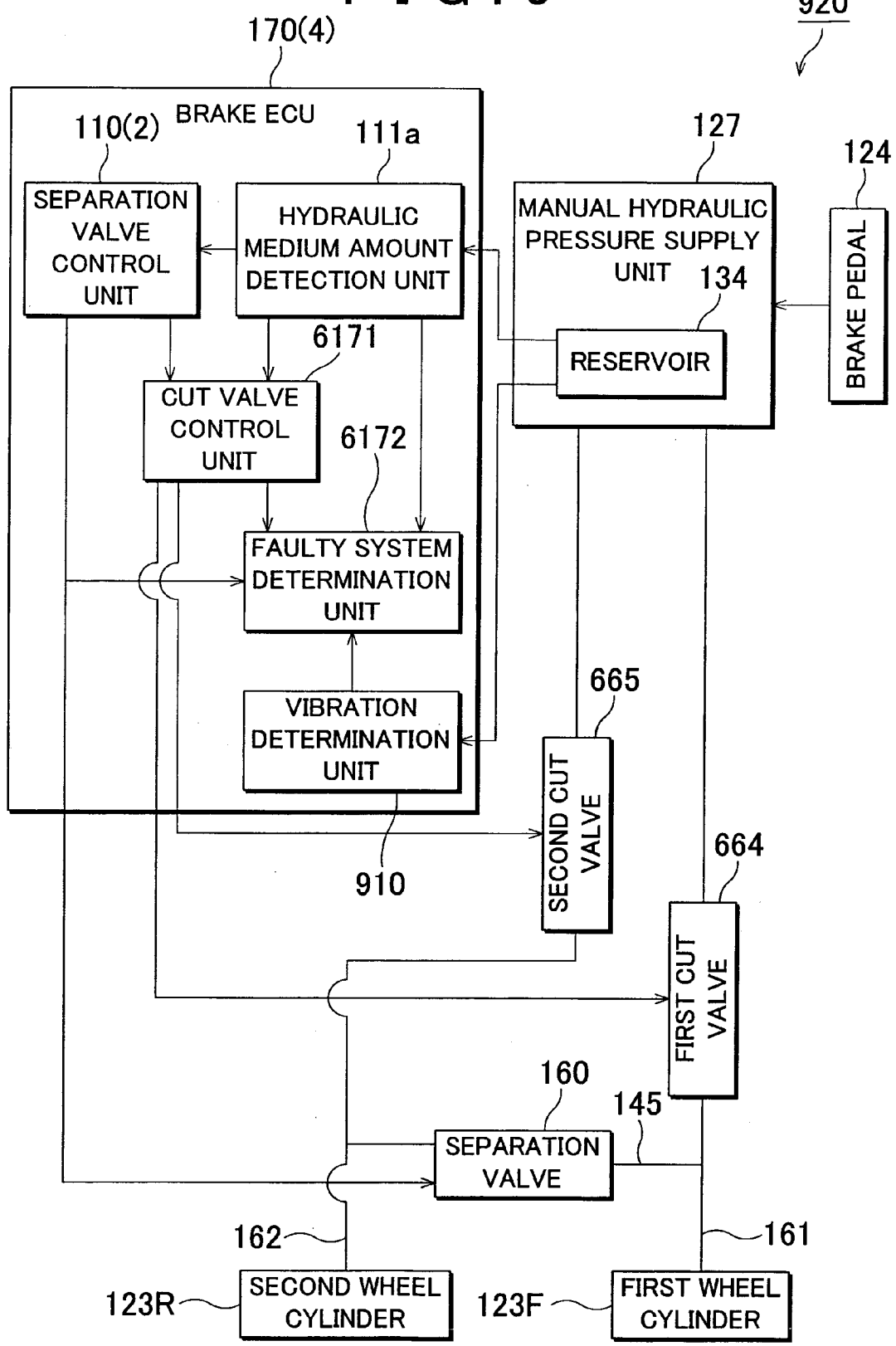
FIG. 9 is a schematic block diagram showing an example of the constitution of a hydraulic brake unit according to a fourth embodiment of the invention.

FIG. 9 is a schematic block diagram showing an example of the constitution of a hydraulic brake unit 920 according to the fourth embodiment. Note that in the following description, the hydraulic brake unit 920 corresponds to the representative example, and therefore has an identical constitution to the hydraulic brake unit 120 and so on described in the first to third embodiments. Accordingly, redundant description has been omitted. Further, identical numerals have been allocated to parts that are identical to the hydraulic brake unit 120 and so on, and description thereof has been omitted.

As shown in FIG. 9, a brake ECU 170 (4) of the hydraulic brake unit 920 includes a vibration determination unit 910 that determines whether or not the reservoir 134 is vibrating within a predetermined vibration range. The vibration determination unit 910 may detect and use the output of a yaw rate sensor or a gravity (G) sensor provided in the vehicle, for example.

When the reservoir 134 is vibrating, i.e. when the vehicle is vibrating, for example, the brake fluid stored in the reservoir 134 receives the effect of the vibration. When the reservoir 134 vibrates, the brake fluid undulates, causing rippling on the fluid surface. Hence, when the fluid surface of the brake fluid is slightly lower than the predetermined detection amount, the fluid surface of the brake fluid fluctuates about a fluid surface level of the predetermined detection amount, and as a result, the hydraulic medium amount detection unit 111a detects that the amount of stored brake fluid is smaller than and then greater than the predetermined amount repeatedly such that a corresponding detection signal is switched ON and OFF repeatedly, for example.

The faulty system determination unit 6172 of the hydraulic brake unit 920 can detect the amount of brake fluid in the reservoir 134 with a high degree of accuracy using the aforementioned ON/OFF state when the reservoir 134 vibrates. When the reservoir 134 vibrates with considerable intensity, the vibration causes the fluid surface to fluctuate violently, and therefore the detection signal is switched ON and OFF repeatedly even in a case where the amount of brake fluid in the reservoir 134 is considerably smaller (i.e. the fluid surface is considerably lower) than the predetermined detection amount.

Conversely, when the reservoir 134 does not vibrate at all, the fluid surface of the brake fluid in the reservoir 134 does not fluctuate, and therefore information indicating the degree to which the amount of brake fluid is smaller than the predetermined detection amount cannot be obtained.

Therefore, the vibration determination unit 910 determines whether or not vibration of the vehicle, or typically vibration of the reservoir 134, is within a predetermined range in which the fluid surface of the brake fluid in the reservoir 134 fluctuates to an appropriate degree, and outputs a detection signal to the faulty system determination unit 6172. Having received a detection signal indicating that the vibration is within the predetermined range from the vibration determination unit 910, the faulty system determination unit 6172 determines the faulty system on the basis of the detection signal from the hydraulic medium amount detection unit 111a.

Hence, even when the hydraulic medium amount detection unit 111a is not able to detect the amount of brake fluid in real time, the faulty system determination unit 6172 can estimate the brake fluid amount relating to the degree to which the brake fluid amount is smaller than the predetermined amount and determine the faulty system accurately on the basis of the estimated brake fluid amount.

Figure 10:
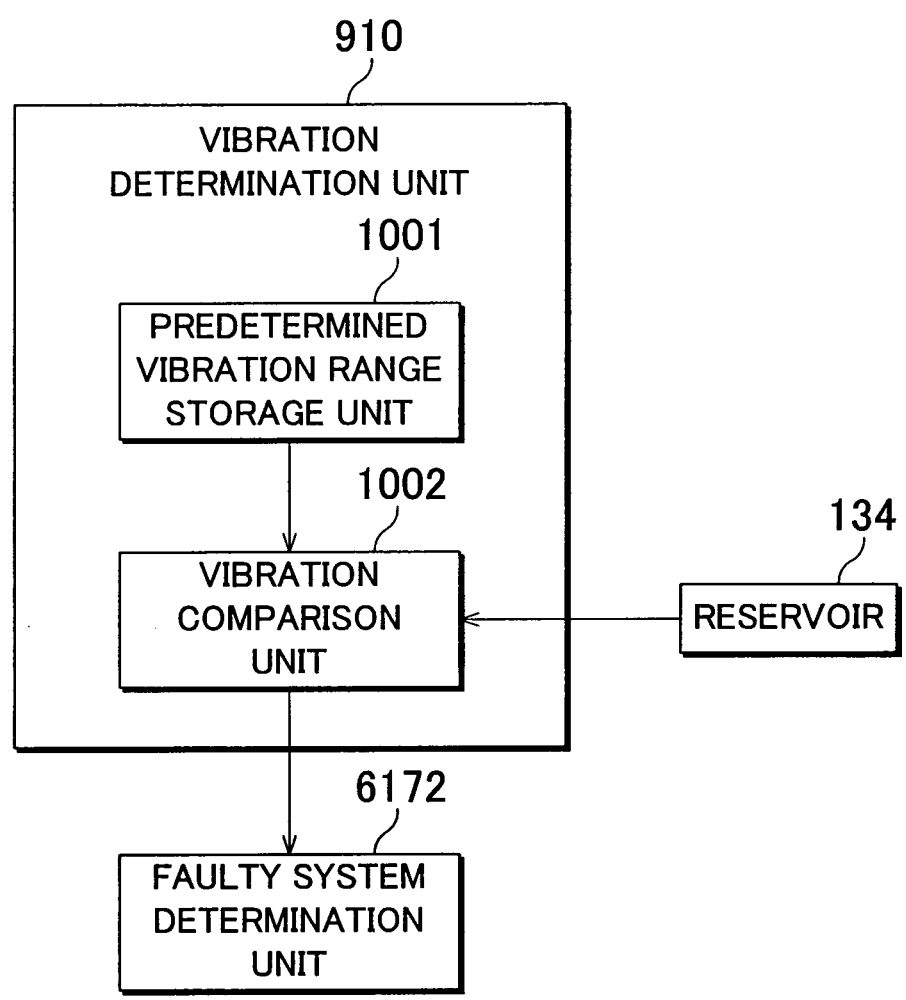
FIG. 10 is a schematic block diagram showing an example of the constitution of a vibration determination unit according to the fourth embodiment of the invention.

Note that the vibration determination unit 910 may have a block constitution such as that shown in FIG. 10, for example. FIG. 10 is a schematic block diagram showing an example of the constitution of the vibration determination unit 910. As shown in FIG. 10, the vibration determination unit 910 includes a predetermined vibration range storage unit 1001 storing a preset predetermined vibration range.

The vibration determination unit 910 also includes a vibration comparison unit 1002 that compares a vibration detection value relating to the reservoir 134 or the vehicle with the predetermined vibration range stored in the predetermined vibration range storage unit 1001. Further, when the vibration detection value is within the predetermined vibration range, the vibration comparison unit 1002 outputs a determination signal indicating that the vibration detection value is within the predetermined vibration range to the faulty system determination unit 6172.

Figure 11:
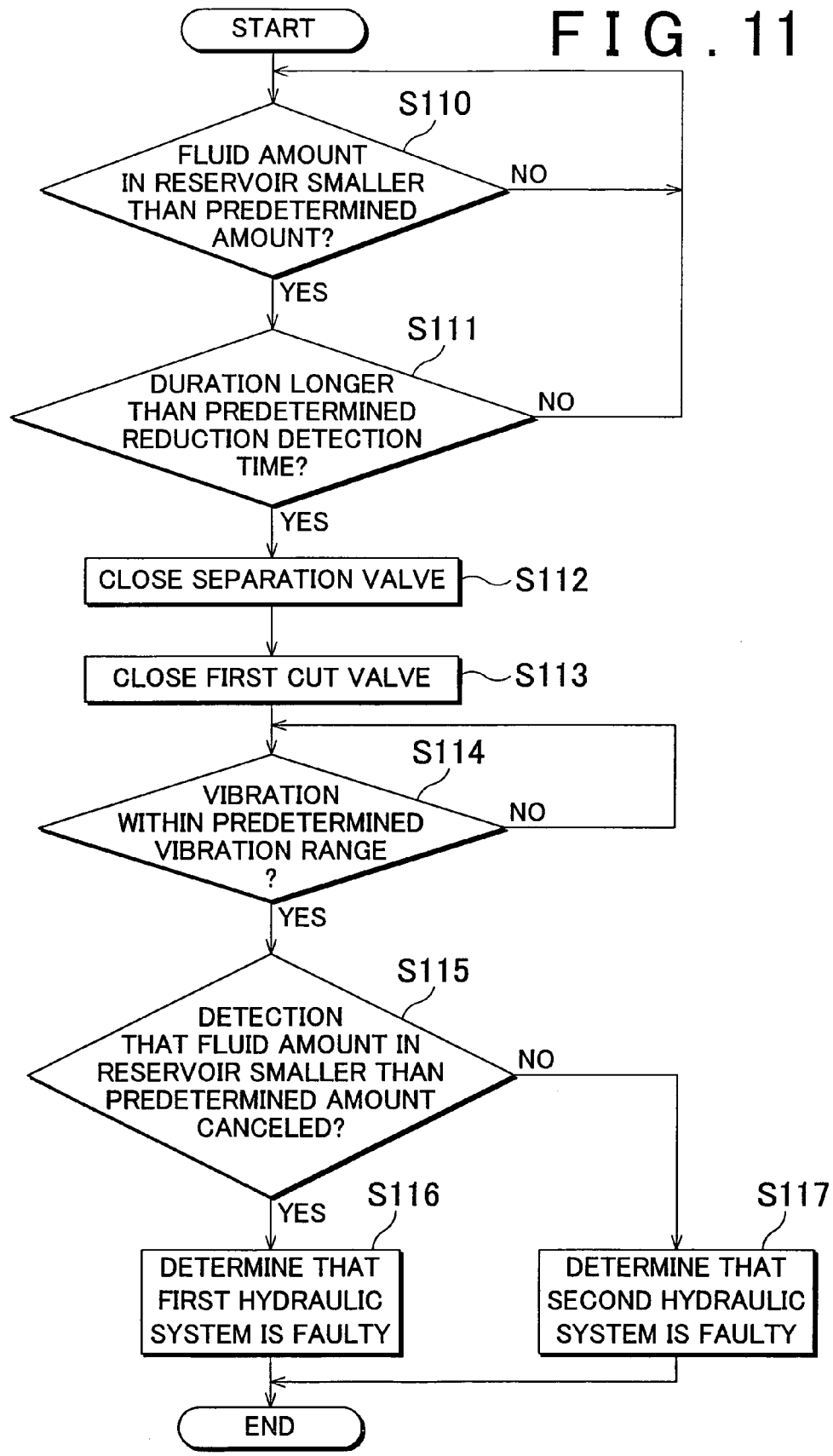
FIG. 11 is a schematic flowchart illustrating operation processing executed by the hydraulic brake unit according to the fourth embodiment of the invention.

Next, operation processing executed by the hydraulic brake unit 920 will be described using FIG. 11. FIG. 11 is a schematic flowchart illustrating the operation processing executed by the hydraulic brake unit 920. This operation processing will be described in sequence on the basis of the steps shown in FIG. 11.

First, in step S110, the hydraulic medium amount detection unit 111a determines whether or not the amount of brake fluid stored in the reservoir 134 is smaller than the predetermined amount. When the hydraulic medium amount detection unit 111a determines that the amount of brake fluid stored in the reservoir 134 is smaller than the predetermined amount, a corresponding detection signal is transmitted to the separation valve control unit 110 (2) and the cut valve control unit 6171.

When the hydraulic medium amount detection unit 111a determines that the amount of brake fluid stored in the reservoir 134 is smaller than the predetermined amount, the routine advances to step S111 (YES in step S110). When the hydraulic medium amount detection unit 111a determines that the amount of brake fluid stored in the reservoir 134 is not smaller than the predetermined amount, the routine enters standby in step S110 (NO in step S110).

Next, in step S111, the separation valve control unit 110 (2) determines whether or not a detection time of step S110 is longer than the predetermined reduction detection time. More specifically, the duration integration unit 114 receives a detection signal from the hydraulic medium amount detection unit 111a and integrates the duration of the detection signal.

Further, the comparison unit 113 compares the threshold time stored in advance in the predetermined reduction detection time storage unit 112 with the duration integrated by the duration integration unit 114. When the duration is longer than the threshold time, the routine advances to step S112 (YES in step S111), and when the duration is not longer than the threshold time, the routine returns to step S110 (NO in step S111).

It is assumed that integration of the duration by the duration integration unit 114 and the comparison determination made by the comparison unit 113 can be performed simultaneously and in parallel in real time. In other words, it is assumed that the comparison unit 113 performs the comparison processing as needed at very short period intervals simultaneously and in parallel with the duration integration performed by the duration integration unit 114. It may therefore be said that the comparison unit 113 monitors the duration constantly to determine whether or not the duration has exceeded the threshold time. Then, when the integrated duration exceeds the threshold time, the routine advances to step S112 without delay.

Next, in step S112, the separation valve control unit 110 (2) closes the separation valve 160. In other words, through the processing of step S110 and step S111, the brake ECU 170 (4) determines that a fault has occurred in a hydraulic system or the like and that fluid is leaking. When it is determined that a fault has occurred, the separation valve control unit 110 (2) closes the separation valve 160 to block the flow path of the brake fluid between the first hydraulic system 161 and the second hydraulic system 162 through the main flow passage 145, and as a result, excessive decrease of the brake fluid is suppressed.

Note that in this flow, the separation valve 160 remains closed at all times throughout the steps to be described below.

Next, in step S113, the cut valve control unit 6171 normally closes the first cut valve 664. Through the processing up to step S113, the separation valve 160 and first cut valve 664 are closed in preparation for processing to determine the site of the faulty system, which is executed from a following step S114 onward.

Next, in step S114, the vibration determination unit 910 determines whether or not vibration of the vehicle, or typically vibration of the reservoir 134, is within the predetermined range. When the vibration determination unit 910 determines that vibration of the reservoir 134 is within the predetermined range, the routine advances to step S115 (YES in step S114). When the vibration determination unit 910 determines that vibration of the reservoir 134 is not within the predetermined range, the routine enters standby in step S114 (NO in step S114).

More specifically, the vibration comparison unit 1002 provided in the vibration determination unit 910 compares the vibration detected in the reservoir 134 with the predetermined vibration range stored in advance in the predetermined vibration range storage unit 1001. The vibration comparison unit 1002 then outputs a comparison result to the faulty system determination unit 6172. For example, when the vibration of the reservoir 134 is within the predetermined vibration range, the vibration comparison unit 1002 may output a notification signal "1" indicating that the vibration is within the predetermined vibration range to the faulty system determination unit 6172.

Next, in step S115, the hydraulic medium amount detection unit 111a outputs information indicating whether or not the signal indicating that the amount of brake fluid stored in the reservoir 134 has fallen below the predetermined amount has been canceled to the faulty system determination unit 6172. In this case, it may be assumed that the fluid surface of the brake fluid in the reservoir 134 is undulating to a certain extent due to the vibration, causing the detection signal indicating that the brake fluid amount is smaller than the predetermined amount, output by the hydraulic medium amount detection unit 111a, to be switched ON and OFF repeatedly.

Hence, when the detection signal of step S110 is canceled even once in step S115, the routine advances to step S116 (YES in step S115). When the detection signal of step S110 is never canceled in step S115, the routine advances to step S117 (NO in step S115).

When the signal indicating that the fluid amount in the reservoir 134 has fallen below the predetermined amount is canceled while the separation valve 160 and first cut valve 664 are closed and the vibration is within the predetermined vibration range, the faulty system determination unit 6172 determines in step S116 that a fault has occurred in the first hydraulic system 161 or the first wheel cylinder 123F.

More specifically, since the separation valve 160 and the first cut valve 664 are closed, fluid does not leak from the first hydraulic system 161 and the first wheel cylinder 123F even if a fault has occurred in the first hydraulic system 161 or the first wheel cylinder 123F. In this state, when the signal indicating that the fluid amount in the reservoir 134 has fallen below the predetermined amount is canceled and the vibration is within the predetermined vibration range, it is assumed that fluid reduction in the reservoir 134 due to the fault has stopped upon closure of the separation valve 160 and the first cut valve 664. Accordingly, the faulty system determination unit 6172 determines that a fault has occurred in the first hydraulic system 161 or the first wheel cylinder 123F.

Although omitted from the description of this flow, following the faulty system determination of step S116, the hydraulic brake unit 920 performs appropriate necessary backup processing and safety procedures on the faulty system.

Next, in step S117, when the signal indicating that the fluid amount in the reservoir 134 has fallen below the predetermined amount is not canceled while the separation valve 160 and first cut valve 664 are closed and the vibration is within the predetermined vibration range, the faulty system determination unit 6172 determines that a fault has occurred in the second hydraulic system 162 or the second wheel cylinder 123R.

More specifically, since the separation valve 160 and the first cut valve 664 are closed, it is assumed that fluid will not leak from the first hydraulic system 161 and the first wheel cylinder 123F even though a fault has occurred in the first hydraulic system 161 or the first wheel cylinder 123F. It may also be assumed that if a fault has occurred in the second hydraulic system 162 or the second wheel cylinder 123R, fluid will continue to leak from the second hydraulic system 162 or the second wheel cylinder 123R after the separation valve 160 and the first cut valve 664 are closed.

In other words, when the signal indicating that the fluid amount in the reservoir 134 is smaller than the predetermined amount is not canceled and the vibration is within the predetermined vibration range, it may be assumed that fluid reduction in the reservoir 134 due to the fault has not stopped upon closure of the separation valve 160 and the first cut valve 664. Hence, in this case, the faulty system determination unit 6172 determines that a fault has occurred in the second hydraulic system 162 or the second wheel cylinder 123R.

Although omitted from the description of this flow, following the faulty system determination of step S117, the hydraulic brake unit 920 performs appropriate necessary backup processing and safety procedures on the faulty system.

Through the operation processing described above, the hydraulic brake unit 920 can detect a faulty system more accurately.

Figure 12:
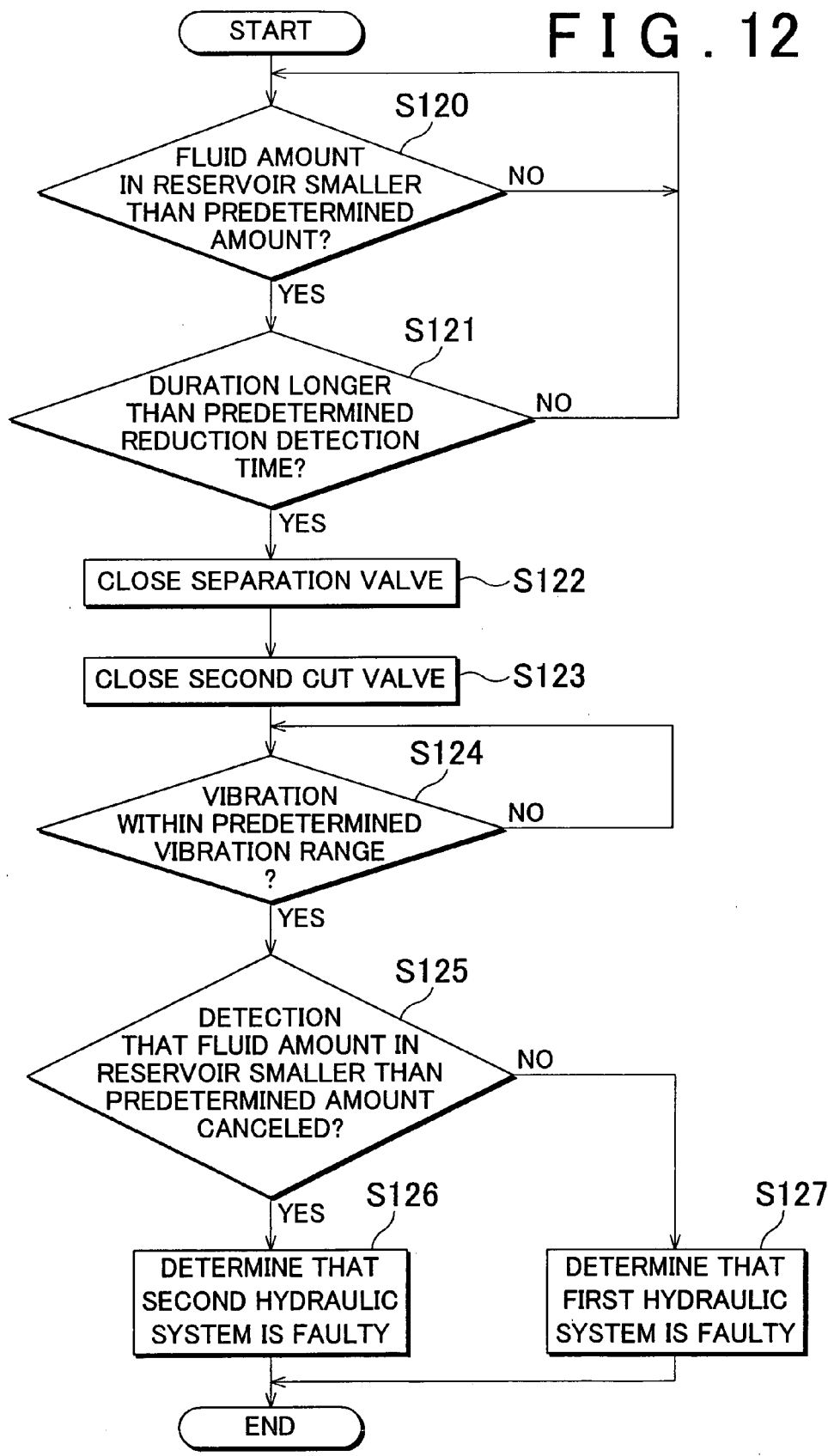
FIG. 12 is a flowchart showing a modified example of the operation processing executed by the hydraulic brake unit according to the fourth embodiment of the invention.

Next, operation processing performed when the second cut valve 665 is closed instead of the first cut valve 664 in step S113 will be described briefly using FIG. 12. FIG. 12 is a flowchart showing a modified example of the operation processing executed by the hydraulic brake unit 920. Note that in FIG. 12 and the following description, description of identical steps to the steps shown in FIG. 11 will be omitted or simplified.

A step S120 corresponds to step S110, and therefore description thereof has been omitted.

A step S121 corresponds to step S111, and therefore description thereof has been omitted.

A step S122 corresponds to step S112, and therefore description thereof has been omitted.

In step S123, the cut valve control unit 6171 closes the second cut valve 665. Through the processing up to step S123, the separation valve 160 and second cut valve 665 are closed in preparation for processing to determine the site of the faulty system, which is executed from a following step S124 onward.

Further, the second cut valve 665 normally corresponds to the regulator cut valve 65, and therefore, a state in which a braking instruction has not been issued by the driver of the vehicle or through automatic braking control is preferably established as a prerequisite for the processing of step S123 onward. When a braking instruction is issued by the driver of the vehicle or through automatic braking control, it is preferable to shift to the so-called linear control mode in order to stop the vehicle quickly while maintaining the braking force.

A step S124 corresponds to step S114, and therefore description thereof has been omitted.

A step S125 corresponds to step S115, and therefore description thereof has been omitted.

In step S126, when the signal indicating that the fluid amount in the reservoir 134 is smaller than the predetermined amount is canceled while the separation valve 160 and second cut valve 665 are closed and the vibration is within the predetermined vibration range, the faulty system determination unit 6172 determines that a fault has occurred in the second hydraulic system 162 or the second wheel cylinder 123R.

More specifically, since the separation valve 160 and the second cut valve 665 are closed, fluid does not leak from the second hydraulic system 162 and the second wheel cylinder 123R even if a fault occurs in the second hydraulic system 162 or the second wheel cylinder 123R. In this state, when the signal indicating that the fluid amount in the reservoir 134 is smaller than the predetermined amount is canceled while the vibration is within the predetermined vibration range, it may be assumed that fluid reduction in the reservoir 134 due to the fault has stopped upon closure of the separation valve 160 and the second cut valve 665. Accordingly, the faulty system determination unit 6172 determines that a fault has occurred in the second hydraulic system 162 or the second wheel cylinder 123R.

Although omitted from the description of this flow, following the faulty system determination of step S126, the hydraulic brake unit 920 performs appropriate necessary backup processing and safety procedures on the faulty system.

Next, in step S127, when the signal indicating that the fluid amount in the reservoir 134 is smaller than the predetermined amount is not canceled while the separation valve 160 and second cut valve 665 are closed and the vibration is within the predetermined vibration range, the faulty system determination unit 6172 determines that a fault has occurred in the first hydraulic system 161 or the first wheel cylinder 123F.

More specifically, since the separation valve 160 and the second cut valve 665 are closed, it is assumed that fluid will not leak from the second hydraulic system 162 and the second wheel cylinder 123R even if a fault occurs in the second hydraulic system 162 or the second wheel cylinder 123R. It may also be assumed that if a fault has occurred in the first hydraulic system 161 or the first wheel cylinder 123F, fluid will continue to leak from the first hydraulic system 161 and the first wheel cylinder 123F even though the separation valve 160 and the second cut valve 665 are closed.

In other words, when the signal indicating that the fluid amount in the reservoir 134 is smaller than the predetermined amount is not canceled while the vibration is within the predetermined vibration range, it may be assumed that fluid reduction in the reservoir 134 due to the fault has not stopped upon closure of the separation valve 160 and the second cut valve 665. Accordingly, the faulty system determination unit 6172 determines that a fault has occurred in the first hydraulic system 161 or the first wheel cylinder 123F.

Although omitted from the description of this flow, following the faulty system determination of step S127, the hydraulic brake unit 920 performs appropriate necessary backup processing and safety procedures on the faulty system.

Through the operation processing described above, the hydraulic brake unit 920 can detect a faulty system more accurately.

The hydraulic brake unit 920 according to the fourth embodiment can determine the reduction state of the stored fluid appropriately using vehicle vibration and the like, even when the hydraulic medium amount detection unit 111a is incapable of measuring the amount of fluid stored in the reservoir 134 in real time. Hence, the brake ECU 170 (4) can determine the faulty system appropriately and quickly, and therefore subsequent restoration measures can be taken quickly and appropriately.

Figure 13:
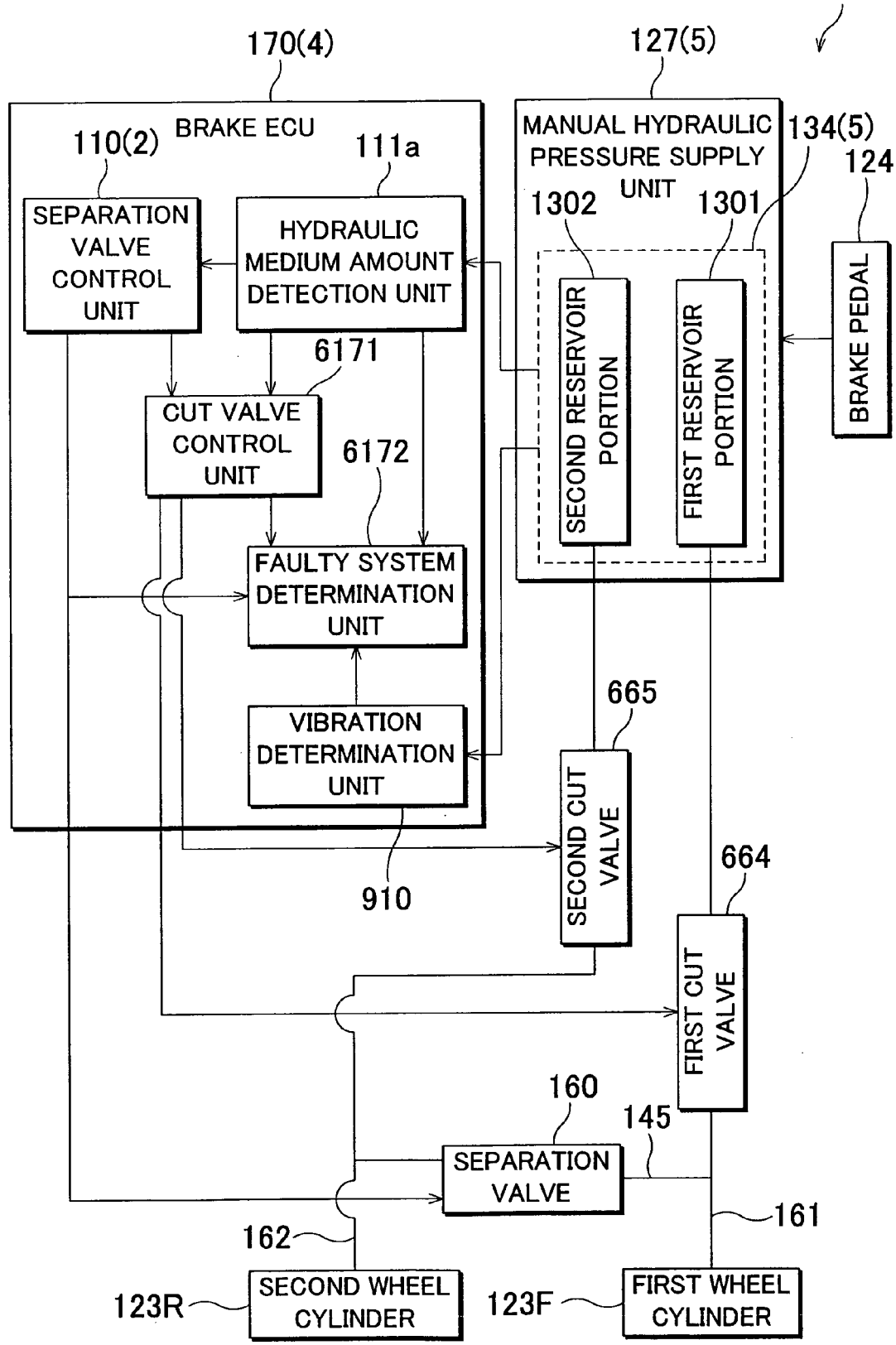
FIG. 13 is a schematic block diagram showing an example of the constitution of a hydraulic brake unit according to a fifth embodiment of the invention.

Next, a case in which the reservoir 134 includes different storage tanks typically provided on the master pipe 37 side and the regulator pipe 38 side will be described using FIG. 13. FIG. 13 is a schematic block diagram showing an example of the constitution of a hydraulic brake unit 920 (5) according to a fifth embodiment. Note that identical reference numerals have been allocated to parts of the hydraulic brake unit 920 (5) which are identical to the hydraulic brake unit 920 described in the fourth embodiment, and to avoid duplication, description thereof has been omitted.

As shown in FIG. 13, a reservoir 134 (5) of a manual hydraulic pressure supply unit 127 (5) includes a first reservoir portion 1301 storing brake fluid to be supplied to the first hydraulic system 161, and a second reservoir portion 1302 storing brake fluid to be supplied to the second hydraulic system 162. The first reservoir portion 1301 and second reservoir portion 1302 preferably store the brake fluid separately.

Since the hydraulic brake unit 920 (5) includes the first reservoir portion 1301 and second reservoir portion 1302, the brake fluid supplied to the first hydraulic system 161 and the first wheel cylinder 123F can be stored and held in the reservoir 134 (5) separately from the brake fluid supplied to the second hydraulic system 162 and the second wheel cylinder 123R.

In other words, even when a fault occurs in one of the hydraulic systems, the fluid is stored independently in the reservoir 134 (5), and therefore a situation in which the fluid stored in both the first reservoir portion 1301 and the second reservoir portion 1302 is depleted can be avoided. In particular, the respective hydraulic systems are maintained through appropriate valve control, and therefore the hydraulic brake unit 920 (5) that executes the operation processing flow shown in FIG. 11 or 12, described in the fourth embodiment, can secure a braking force.

Note that the operation processing of the hydraulic brake unit 920 (5) may be identical to the operation processing of the hydraulic brake unit 920 described above, and hence description thereof has been omitted. Further, FIG. 14A is a schematic diagram showing an example of the structure of the reservoir 134 (5) according to the fifth embodiment.

Figure 14C:
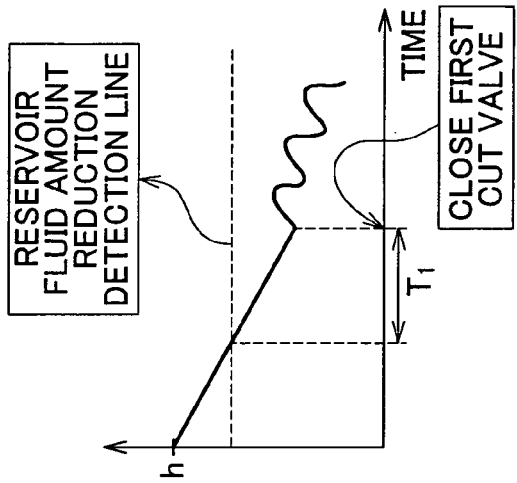
FIG. 14C is a view showing a situation arising when a fault occurs in a second hydraulic system or a second wheel cylinder according to the fifth embodiment of the invention such that the brake fluid leaks.
Figure 14B:
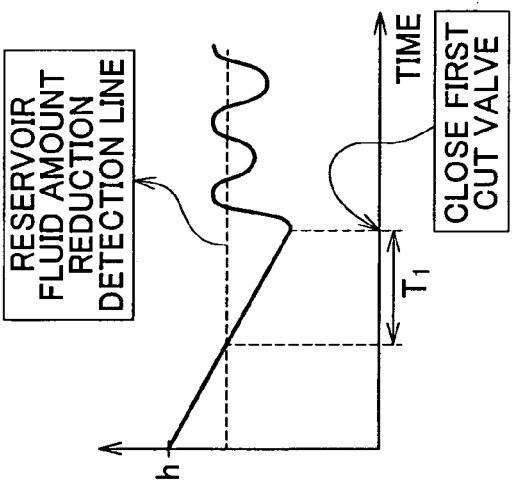
FIG. 14B is a view showing a situation arising when a fault occurs in a first hydraulic system or a first wheel cylinder according to the fifth embodiment of the invention such that brake fluid leaks.
Figure 14A:
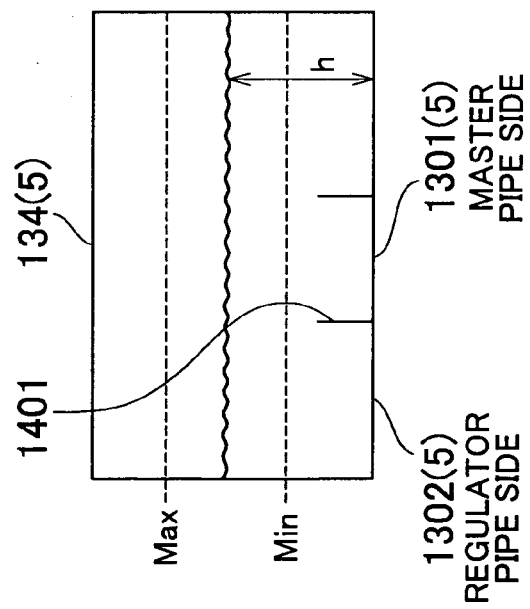
FIG. 14A is a schematic diagram showing an example of the structure of a reservoir according to the fifth embodiment of the invention.

As shown in FIG. 14A, the brake fluid is stored in the reservoir 134 (5) up to a height h between maximum (Max) and minimum (Min). Further, the interior of the reservoir 134 (5) is partially partitioned by a partition 1401. In FIG. 14A, the height of the partition 1401 is set a few centimeters lower than the Min level, but is not limited thereto, and may be designed and adjusted as appropriate.

When the fluid surface becomes lower than the height of the partition 1401, the brake fluid supplied to the second hydraulic system 162, which is normally the brake fluid supplied to the regulator pipe 38, is separated from the brake fluid supplied to the first hydraulic system 161, which is normally the brake fluid supplied to the master pipe 37, by the partition 1401.

Hence, when the amount of brake fluid stored in the reservoir 134 (5) decreases due to a fault, for example, the brake fluid can be stored independently in the first reservoir portion 1301 (5) and the second reservoir portion 1302 (5). Accordingly, by open/close controlling the plurality of valves provided in the hydraulic brake unit 920 (5) appropriately, as shown by the examples in FIGS. 11 and 12, the amount of brake fluid stored in the reservoir 134 (5) can be maintained appropriately so that the braking force can be applied continuously.

FIGS. 14B and 14C are schematic diagrams showing temporal variation in the height h of the surface of the fluid stored in the reservoir 134 (5) shown in FIG. 14A when the operation processing shown in FIG. 11 as the fourth embodiment is executed in the hydraulic brake unit 920 (5) including the reservoir 134 (5).

More specifically, FIG. 14B is a view showing a situation arising when a fault occurs in the first hydraulic system 161 or the first wheel cylinder 123F such that the brake fluid leaks, and FIG. 14C is a view showing a situation arising when a fault occurs in the second hydraulic system 162 or the second wheel cylinder 123R such that the brake fluid leaks.

As shown in FIG. 14B, when the amount of brake fluid stored in the reservoir 134 (5) decreases from the height h due to a fault and a predetermined processing time T1 elapses after the hydraulic medium amount detection unit 111a detects that the brake fluid has fallen below a reservoir fluid reduction detection line, the cut valve control unit 6171 closes the first cut valve 664. Here, the predetermined processing time T1 normally corresponds to a time required for the separation valve control unit 110 (2) to confirm that the duration of detection of a reduction in the amount of stored brake fluid has exceeded the threshold time stored in advance in the predetermined reduction detection time storage unit 112.

When the brake fluid leaks due to a fault in the first hydraulic system 161 or the first wheel cylinder 123F, the separation valve 160 is closed and then the first cut valve 664 is closed, and as a result, the fluid stops decreasing. Hence, when the reservoir 134 (5) vibrates, the fluid surface typically undulates so as to fluctuate about the reservoir fluid reduction detection line, as shown in FIG. 14B. As a result, the detection signal of the hydraulic medium amount detection unit 111a is repeatedly switched ON and OFF.

As shown in FIG. 14C, when the amount of brake fluid stored in the reservoir 134 (5) decreases from the height h due to a fault and the predetermined processing time T1 elapses after the hydraulic medium amount detection unit 111a detects that the brake fluid has fallen below the reservoir fluid reduction detection line, the cut valve control unit 6171 closes the first cut valve 664. Here, the predetermined processing time T1 normally corresponds to a time required for the separation valve control unit 110 (2) to confirm that the duration of detection of a reduction in the amount of stored brake fluid has exceeded the threshold time stored in advance in the predetermined reduction detection time storage unit 112.

When the brake fluid leaks due to a fault in the second hydraulic system 162 or the second wheel cylinder 123R, the amount of stored fluid continues to decrease even if the separation valve 160 is closed and then the first cut valve 664 is closed. Hence, when the reservoir 134 (5) vibrates, the fluid surface does not fluctuate about the reservoir fluid reduction detection line during normal undulation, as shown in FIG. 14C. As a result, the detection signal of the hydraulic medium amount detection unit 111a is not repeatedly switched ON and OFF.

As described above, the fluid reduction phenomenon in the reservoir 134 (5) following predetermined valve control differs according to the system in which the fault has occurred. The hydraulic brake unit 920 (5) is capable of detecting this difference in the fluid surface reduction of the fluid quickly and easily without using complicated detection mechanisms and control mechanisms. In particular, by determining whether or not vibration in the reservoir 134 (5) is within the predetermined range using the output of a yaw sensor or the like provided in the vehicle, the faulty system can be specified accurately, easily, and quickly through detection of the difference in the fluid surface reduction, as shown in FIGS. 14B and 14C.

Next, a faulty system determination unit 6172 (6) that determines a faulty system when the hydraulic medium amount detection unit 111a is switched ON and OFF repeatedly a predetermined number of times within a predetermined fixed period in the fourth embodiment and fifth embodiment will be described. As shown in FIG. 14B, the faulty system determination unit 6172 (6) according to a sixth embodiment determines the faulty system when vehicle vibration causes the fluid surface in the reservoir 134 to fluctuate about the reservoir fluid reduction detection line such that the hydraulic medium amount detection unit 111a repeats detection and non-detection a plurality of times. Hence, in comparison with a detection based on a single ON/OFF repetition, the faulty system can be determined even more reliably and accurately.

FIG. 15 is a schematic block diagram showing an example of the constitution of the faulty system determination unit 6172 (6). In FIG. 15, identical sites to the fifth embodiment and so on have been allocated identical reference numerals. Further, description of these identical sites has been omitted to avoid duplicating the description provided in the fifth embodiment and so on.

As shown in FIG. 15, the faulty system determination unit 6172 (6) includes a reliability confirmation unit 1410 that confirms the reliability of the fluid surface reduction detection signal issued by the hydraulic medium amount detection unit 111a. The faulty system determination unit 6172 (6) also includes a predetermined number of times storage unit 1430 in which a predetermined number of times is stored in advance, and a predetermined period storage unit 1420 in which a predetermined period is stored in advance.

The reliability confirmation unit 1410 determines whether or not the hydraulic medium amount detection unit 111a has repeated detection and non-detection (ON and OFF, for example) the predetermined number of times stored in the predetermined number of times storage unit 1430 within the predetermined fixed period stored in the predetermined period storage unit 1420. For this purpose, the reliability confirmation unit 1410 includes an integration unit 1411 that integrates the number of times the hydraulic medium amount detection unit 111a repeats detection and non-detection (ON and OFF, for example) within the predetermined fixed period stored in the predetermined period storage unit 1420. The reliability confirmation unit 1410 also includes a comparison unit 1412 that compares the number of times integrated by the integration unit 1411 with the predetermined number of times stored in the predetermined number of times storage unit 1430.

When a large vibration occurs temporarily for some reason such that the hydraulic medium amount detection unit 111a detects a single reduction in the fluid surface, the faulty system determination unit 6172 (6) does not execute a corresponding faulty system determination, and therefore the danger of an erroneous faulty system determination can be reduced.

Next, operation processing relating to the faulty system determination unit 6172 (6) will be described using FIG. 16. FIG. 16 is a schematic flowchart illustrating an example of operation processing executed by the faulty system determination unit 6172 (6). Note that in the description of FIG. 16, description of identical processing to the operation processing of the fifth embodiment and so on has been omitted to avoid duplication.

A step S1610 corresponds to step S110, and therefore description thereof has been omitted.

A step S1620 corresponds to step S111, and therefore description thereof has been omitted.

A step S1630 corresponds to step S112, and therefore description thereof has been omitted.

A step S1640 corresponds to step S113, and therefore description thereof has been omitted.

A step S1650 corresponds to step S114, and therefore description thereof has been omitted.

In step S1660, the hydraulic medium amount detection unit 111a outputs information indicating whether or not the signal indicating that the amount of brake fluid stored in the reservoir 134 is smaller than the predetermined amount has been canceled to the faulty system determination unit 6172 (6). In this case, it is assumed that the fluid surface of the brake fluid in the reservoir 134 undulates to a certain extent due to the vibration, causing the detection signal indicating that the brake fluid amount is smaller than the predetermined amount, which is output by the hydraulic medium amount detection unit 111a, to be switched ON and OFF repeatedly, as shown in FIG. 14B.

Hence, when the detection signal of step S1610 is canceled a greater number of times than the predetermined number of times within the predetermined period in step S1660, the routine advances to step S1670 (YES in step S1660). When the detection signal of step S1610 is not canceled a greater number of times than the predetermined number of times within the predetermined period in step S1660, the routine advances to step S1680 (NO in step S1660).

More specifically, the integration unit 1411 integrates the number of times the hydraulic medium amount detection unit 111a repeats detection and non-detection of a fluid reduction within the predetermined period stored in the predetermined period storage unit 1420. Further, the comparison unit 1412 compares the predetermined number of times stored in the predetermined number of times storage unit 1430 with the number of times integrated by the integration unit 1411.

When the comparison performed by the comparison unit 1412 indicates that the number of times integrated by the integration unit 1411 is greater than the predetermined number of times, the routine advances to step S1670. When the comparison performed by the comparison unit 1412 indicates that the number of times integrated by the integration unit 1411 is not greater than the predetermined number of times, the routine advances to step S1680.

Step S1670 corresponds to step S116, and therefore description thereof has been omitted.

Step S1680 corresponds to step S117, and therefore description thereof has been omitted.

The faulty system determination unit 6172 (6) executes the faulty system determination processing more safely and reliably, and therefore backup processing and restoration processing following the determination processing can be executed appropriately and quickly.

Next, a case in which the cut valve control unit 6171 of the brake ECU 170 (3) or the brake ECU 170 (4) according to the third to sixth embodiments executes operation processing to close the cut valve of the faulty system and open the other cut valve in accordance with determination result feedback from the faulty system determination unit 6172 will be described as a seventh embodiment.

Further, the cut valve control unit 6171 of the brake ECU 170 (4) according to the sixth embodiment may execute operation processing to close the cut valve of the faulty system and open the other cut valve in accordance with determination result feedback from the faulty system determination unit 6172 (6).

Figure 17:
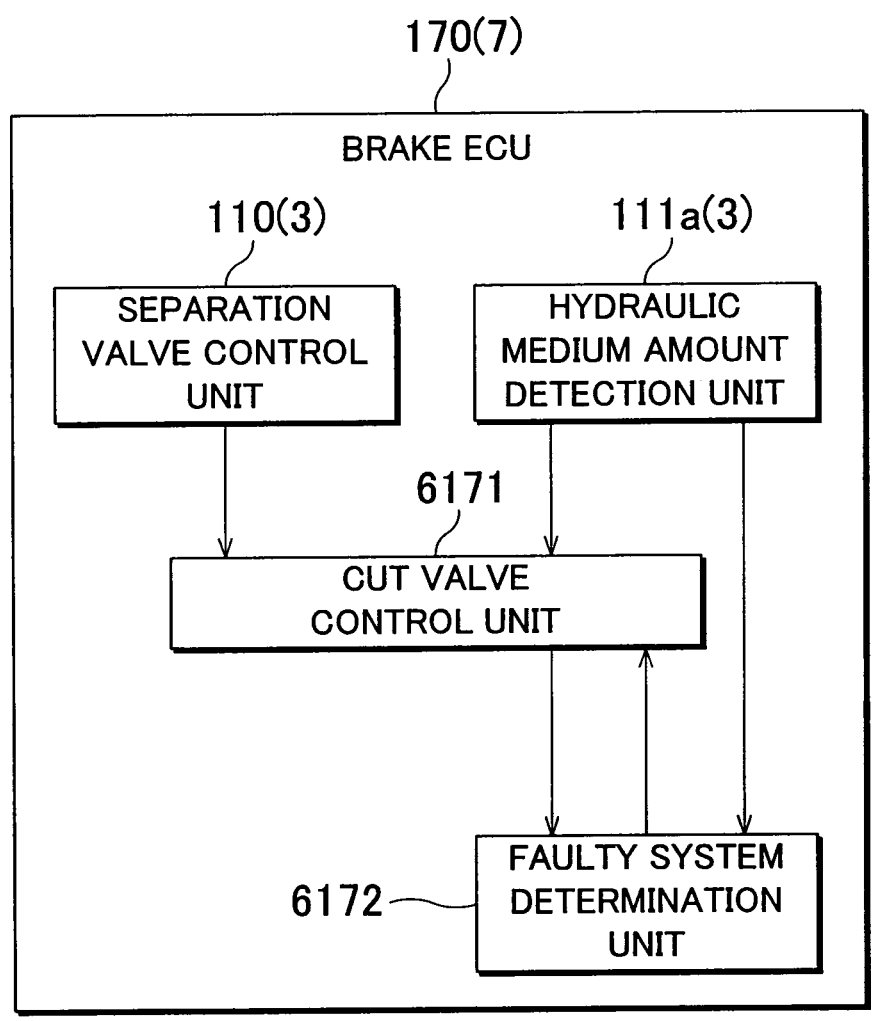
FIG. 17 is a schematic diagram showing an example of the constitution of a brake ECU according to a seventh embodiment of the invention.

Note that in order to avoid duplicate description, only different parts to the third to sixth embodiments are described, and description of other parts has been omitted. Further, in FIG. 17, identical sites to the hydraulic brake unit 620 described in the third embodiment have been allocated identical reference numerals, and description thereof has been omitted. FIG. 17 is a schematic diagram showing an example of the constitution of a brake ECU 170 (7) provided in a hydraulic brake unit, not shown in the drawings, according to the seventh embodiment.

As shown in FIG. 17, in the brake ECU 170 (7), feedback relating to a faulty system determination result is input into the cut valve control unit 6171 from the faulty system determination unit 6172. The cut valve control unit 6171 then closes the cut valve, i.e. either the first cut valve 664 or the second cut valve 665, provided in the system determined by the faulty system determination unit 6172 to be faulty, from the first hydraulic system 161 and the second hydraulic system 162, and opens a cut valve on the non-faulty side from among the first cut valve 664 and the second cut valve 665.

The brake ECU 170 (7) according to this embodiment blocks the flow of brake fluid through the faulty system, and therefore fluid leakage can be stopped following the blockage. Further, the brake ECU 170 (7) secures a flow of brake fluid through the non-faulty system, and therefore a braking force can be applied by supplying hydraulic pressure. Hence, the brake ECU 170 (7) halts brake fluid leakage and secures a braking force quickly, and as a result, a hydraulic brake unit that can perform a brake operation safely and reliably even when a fault occurs can be realized.

Figure 18:
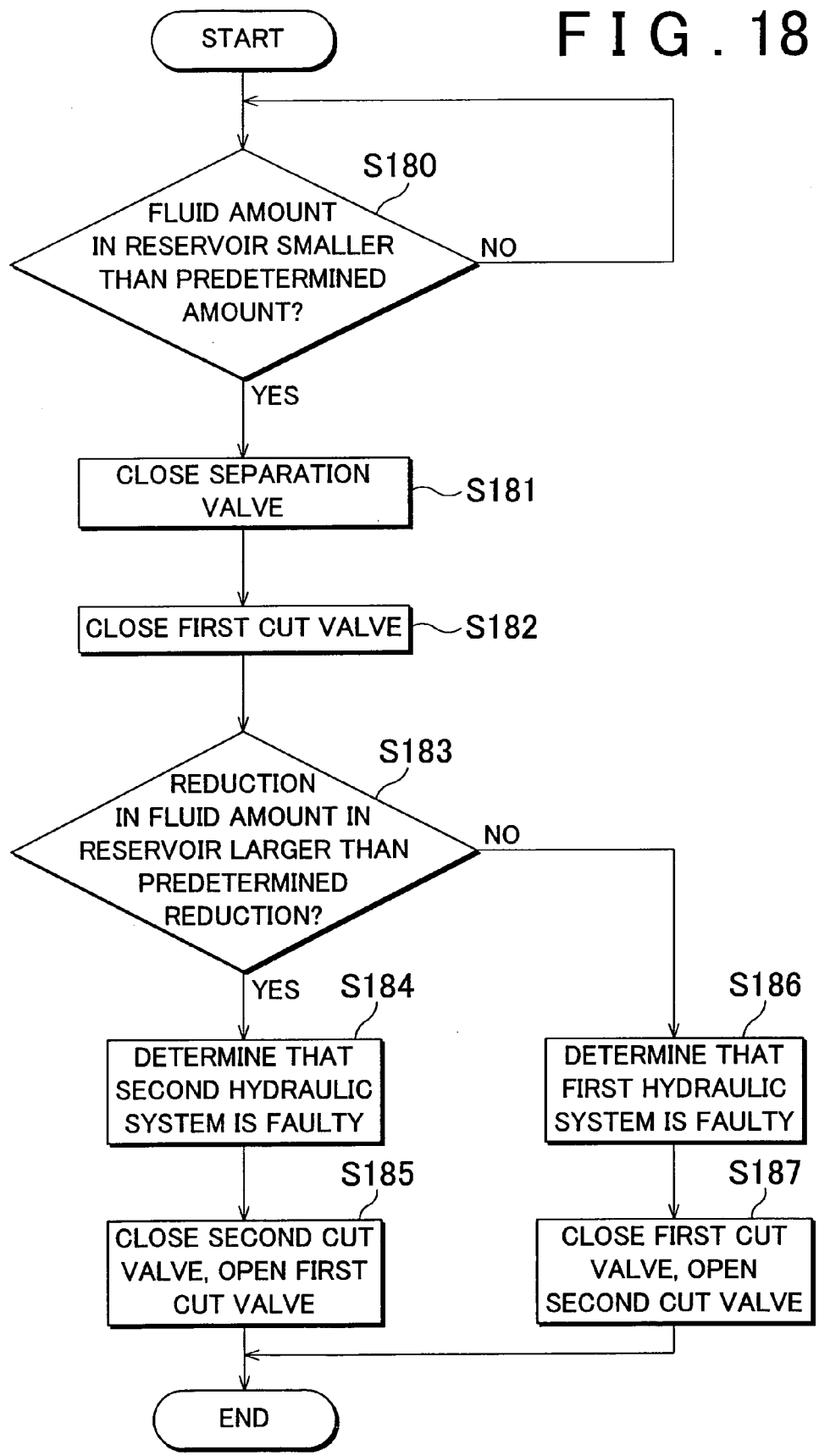
FIG. 18 is a flowchart showing an example of operation processing executed by a hydraulic brake system including the brake ECU according to the seventh embodiment of the invention.

Next, operation processing executed by the hydraulic brake unit, not shown in the drawings, provided with the brake ECU 170 (7) will be described using FIG. 18. FIG. 18 is a flowchart showing an example of the operation processing executed by a hydraulic brake system including the brake ECU 170 (7). Note that the flowchart shown in FIG. 18 shows an operation executed in a case where the hydraulic brake unit 620 according to the third embodiment includes the brake ECU 170 (7). The respective steps shown in FIG. 18 will be described below in sequence.

A step S180 corresponds to step S71, and therefore description thereof has been omitted.

A step S181 corresponds to step S72, and therefore description thereof has been omitted.

A step S182 corresponds to step S73, and therefore description thereof has been omitted.

A step S183 corresponds to step S74, and therefore description thereof has been omitted.

In step S184, the faulty system determination unit 6172 determines that a fault has occurred in the second hydraulic system 162. More specifically, a state in which the amount of fluid stored in the reservoir 134 continues to decrease even through the first cut valve 664 has been closed in step S182 may be determined as fluid leakage caused by a fault in the second hydraulic system 162, and more particularly on the periphery of the second wheel cylinder 123R.

Further, the faulty system determination unit 6172 feeds back fault information indicating that a fault has occurred in the second hydraulic system 162 to the cut valve control unit 6171.

In step S185, the cut valve control unit 6171 closes the second cut valve 665 on the faulty second hydraulic system 162 side and opens the first cut valve 664 on the non-faulty first hydraulic system 161 side on the basis of the fed back fault information.

Through the operation processing of step S185, brake fluid leakage can be stopped quickly, and a vehicle braking force can be secured by suppressing a reduction in the braking force. More specifically, hydraulic pressure can be supplied to the first wheel cylinder 123F using the first hydraulic system 161, and therefore, even if a fault occurs on the rear side, for example, rear side leakage can be stopped and the brake can be activated on the front side.

In step S186, the faulty system determination unit 6172 determines that a fault has occurred in the first hydraulic system 161. More specifically, a state in which the amount of fluid stored in the reservoir 134 stops decreasing when the first cut valve 664 is closed in step S182 may be determined as fluid leakage caused by a fault in the first hydraulic system 161, and more particularly on the periphery of the first wheel cylinder 123F.

Further, the faulty system determination unit 6172 feeds back fault information indicating that a fault has occurred in the first hydraulic system 161 to the cut valve control unit 6171.

In step S187, the cut valve control unit 6171 closes the first cut valve 664 on the faulty first hydraulic system 161 side and opens the second cut valve 665 on the non-faulty second hydraulic system 162 side on the basis of the fed back fault information.

Through the operation processing of step S187, brake fluid leakage can be stopped quickly, and a vehicle braking force can be secured by suppressing a reduction in the braking force. More specifically, hydraulic pressure can be supplied to the second wheel cylinder 123R using the second hydraulic system 162, and therefore, even if a fault occurs on the front side, for example, front side leakage can be stopped and the brake can be activated on the rear side.

The hydraulic brake unit provided with the brake ECU 170 (7) according to the seventh embodiment performs valve control quickly and appropriately after the faulty system has been determined, and therefore the braking force required to stop the vehicle can be secured safely and reliably while suppressing fluid leakage caused by the fault.

Next, a hydraulic brake unit including the stroke simulator 69 in the third to seventh embodiments will be described as an eighth embodiment. This hydraulic brake unit is capable of reducing impediments to a depression operation of the brake pedal 24 by appropriately open/close controlling the simulator cut valve 68 after the faulty system has been determined. The hydraulic brake unit is also capable of suppressing an increase in the speed with which the remaining brake fluid decreases due to consumption by the stroke simulator 69.

Figure 19:
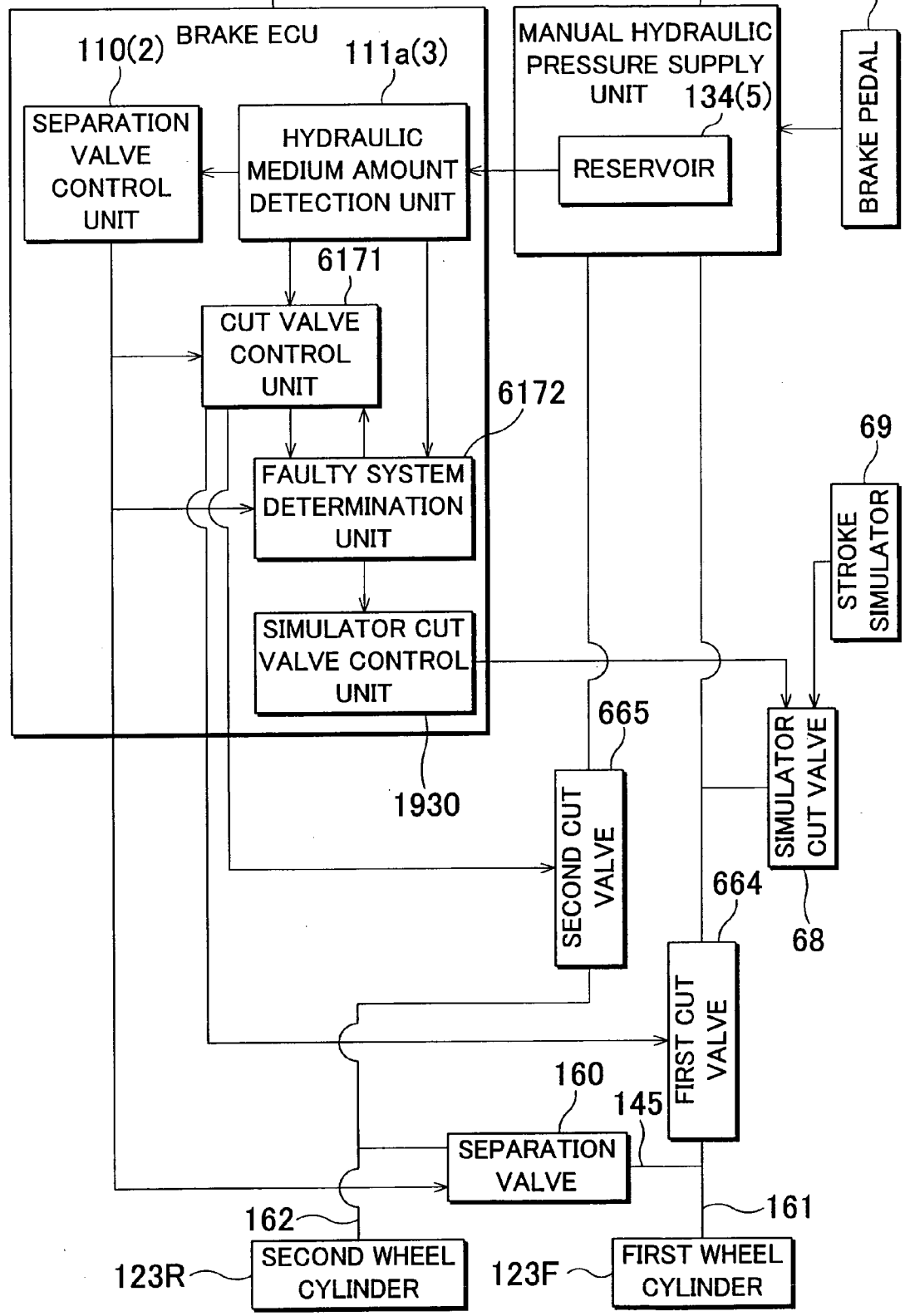
FIG. 19 is a schematic block diagram showing an example of the constitution of a hydraulic brake unit according to an eighth embodiment of the invention.

Note that sites of the hydraulic brake unit that are identical to their counterparts in the hydraulic brake units described above have been allocated identical reference numerals, and description thereof has been omitted. FIG. 19 is a schematic block diagram showing an example of the constitution of a hydraulic brake unit 1920.

In the hydraulic brake unit 1920, the stroke simulator 69 is provided on the manual hydraulic pressure supply unit 127 side of the first cut valve 664 in the first hydraulic system 161 via the simulator cut valve 68.

The simulator cut valve 68 is open/close controlled by a simulator cut valve control unit 1930 provided in a brake ECU 170 (8). The simulator cut valve control unit 1930 obtains the faulty system determination result from the faulty system determination unit 6172, and open/close controls the simulator cut valve 68 in accordance with the determination result.

More specifically, the simulator cut valve control unit 1930 opens the simulator cut valve 68 when the determination result obtained from the faulty system determination unit 6172 indicates that the first hydraulic system 161 is faulty. When the determination result obtained from the faulty system determination unit 6172 indicates that the second hydraulic system 162 is faulty, on the other hand, the simulator cut valve control unit 1930 closes the simulator cut valve 68.

When a fault occurs in the first hydraulic system 161, the cut valve control unit 6171 closes the first cut valve 664. As a result, a brake fluid flow passage formed upon depression of the brake pedal 124 is blocked, leading to an increase in so-called hydraulic rigidity and making pedal depression difficult. To avoid a situation in which pedal depression is difficult, the simulator cut valve control unit 1930 opens the simulator cut valve 68. As a result, the difficulty in depressing the brake pedal 124 is eliminated, and therefore the linear REG assist mode or the like, for example, may be implemented.

Further, when a fault occurs in the second hydraulic system 162, the cut valve control unit 6171 closes the second cut valve 665 such that the braking force must be secured by the remaining brake fluid via the first hydraulic system 161. In this case, however, the brake fluid may flow from the first hydraulic system 161 into the stroke simulator 69 and be consumed thereby. To avoid a reduction in the braking force applied to the first wheel cylinder 123F occurring when the brake fluid is consumed by the stroke simulator 69 in this manner, the simulator cut valve control unit 1930 closes the simulator cut valve 68. As a result, a hydraulic brake unit 1920 that uses the remaining brake fluid effectively without leakage from a fault can be realized.

Figure 20:
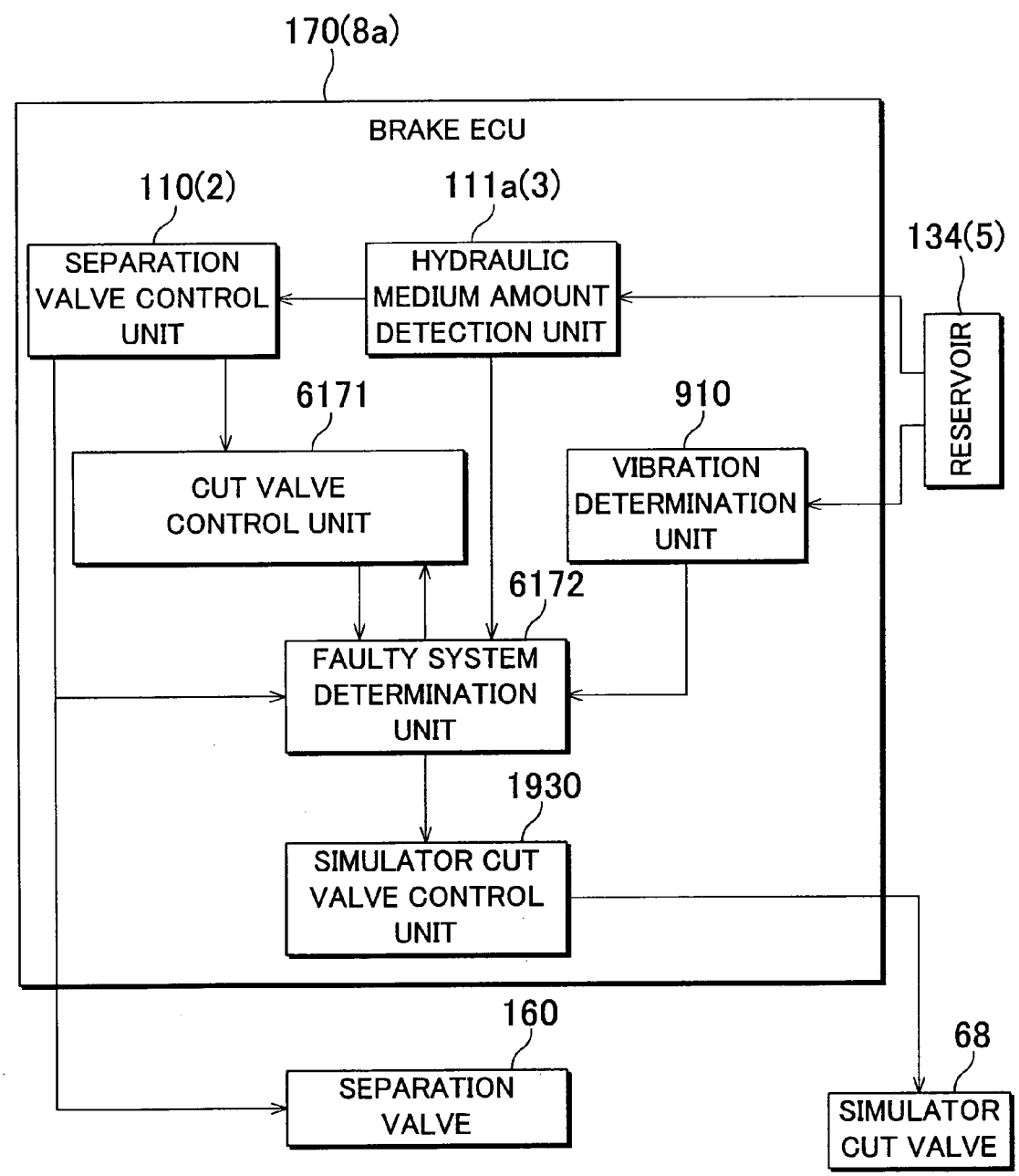
FIG. 20 is a schematic block diagram of a case in which a brake ECU according to the eighth embodiment of the invention includes a vibration determination unit.

FIG. 20 is a schematic block diagram showing a brake ECU 170 (8a) provided in the hydraulic brake unit 1920 shown in FIG. 19 and formed by providing the brake ECU 170 (8) with the vibration determination unit 910. Note that the constitution of the hydraulic brake unit shown in FIG. 20 is identical to that of the embodiment shown in FIG. 19 with the exception of the brake ECU 170 (8a). Hence, identical reference numerals have been allocated and duplicate description has been omitted.

The brake ECU 170 (8a) includes the vibration determination unit 910 such that the faulty system is determined when vibration in the reservoir 134 (5) is within the predetermined vibration range. As a result, the faulty system can be determined even more accurately, and since the simulator cut valve control unit 1930 controls the simulator cut valve 68 appropriately in the manner described above following the faulty system determination, even more favorable effects can be obtained.

Figure 21A:
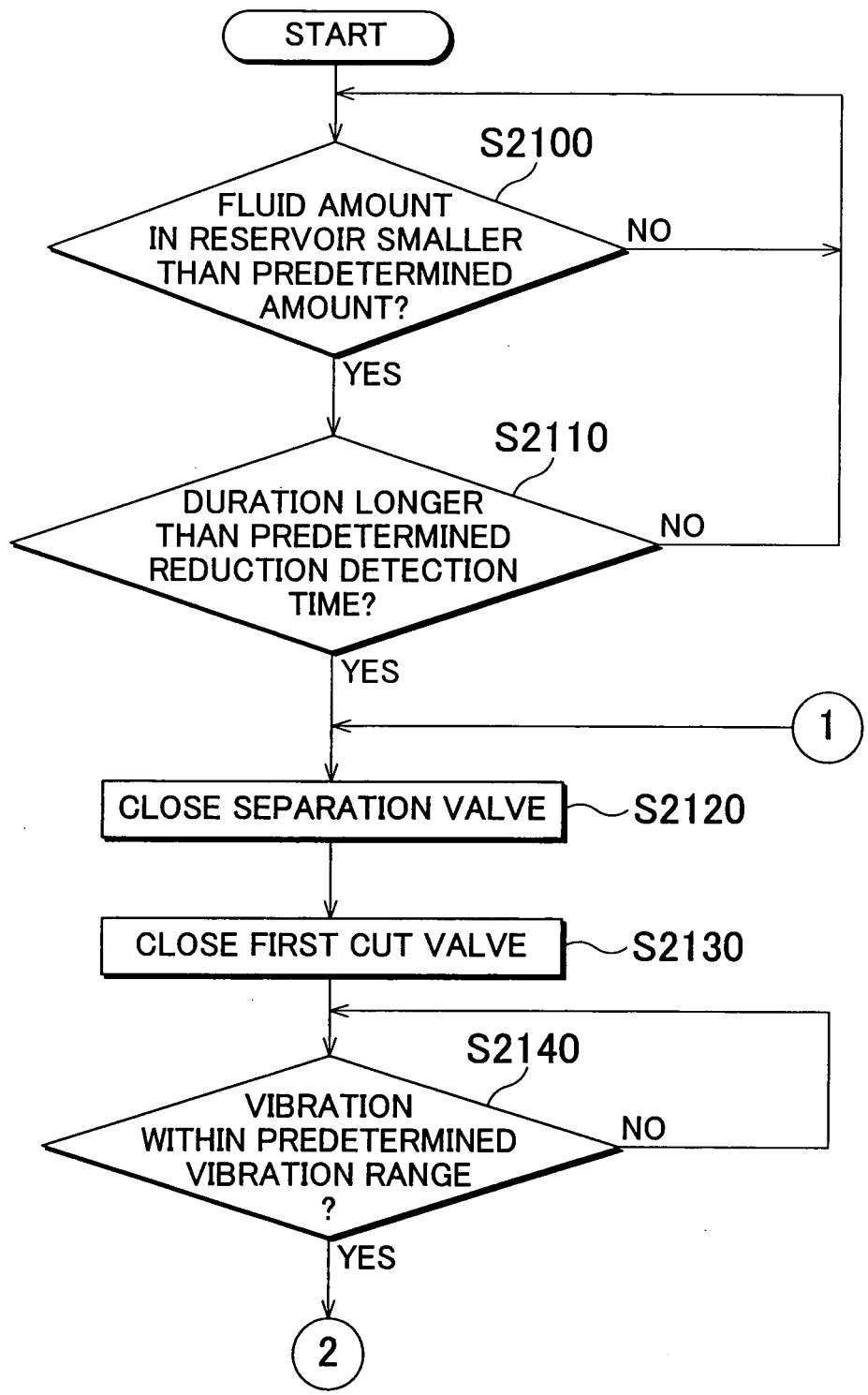
FIG. 21A and FIG. 21B is a flowchart showing a representative example of operation processing executed by the hydraulic brake unit according to the eighth embodiment of the invention.
Figure 21B:
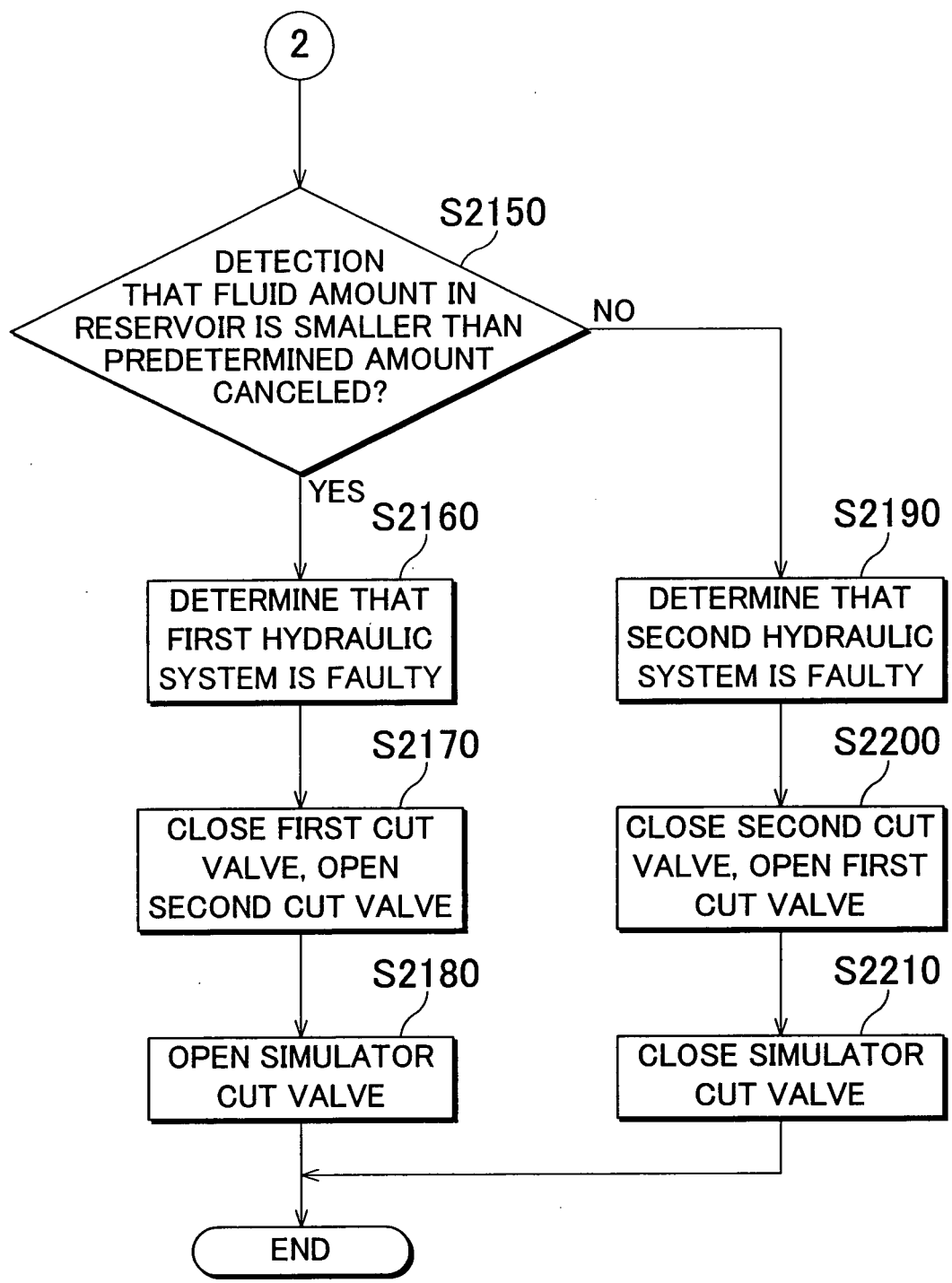

Next, an example of representative operation processing executed by the hydraulic brake unit including the brake ECU 170 (8a) will be described using FIG. 21A and FIG. 21B. FIG. 21A and FIG. 21B is a flowchart showing a representative example of operation processing executed by the hydraulic brake unit according to the eighth embodiment, which includes the brake ECU 170 (8a). Here, operation processing of the hydraulic brake unit 1920 including the brake ECU 170 (8a) will be described in detail in accordance with the respective steps shown in FIG. 21A and FIG. 21B and with reference to FIGS. 19 and 20.

First, in step S2100, the hydraulic medium amount detection unit 111a (3) determines whether or not the amount of brake fluid stored in the reservoir 134 (5) is smaller than the predetermined amount. When the hydraulic medium amount detection unit 111a (3) determines that the amount of brake fluid stored in the reservoir 134 (5) is smaller than the predetermined amount, the routine advances to step S2110 (YES in step S2100). When the hydraulic medium amount detection unit 111a (3) determines that the amount of brake fluid stored in the reservoir 134 (5) is not smaller than the predetermined amount, the routine enters standby in step S2100 (NO in step S2100).

The hydraulic medium amount detection unit 111a (3) of the hydraulic brake unit 1920 may be formed to switch ON when the fluid amount has fallen below the predetermined amount and switch OFF when the fluid amount has not fallen below the predetermined amount, for example. Further, when the hydraulic medium amount detection unit 111a (3) is capable of detecting the amount of brake fluid in the reservoir 134 (5) in real time and linearly, the fluid reduction state can be recognized more accurately.

The hydraulic medium amount detection unit 111a (3) transmits a detection signal (an ON signal, for example) indicating that the amount of brake fluid has fallen below the predetermined amount to the separation valve control unit 110 (2), the cut valve control unit 6171, and the faulty system determination unit 6172.

In step S2110, the separation valve control unit 110 (2) determines whether or not the duration of the brake fluid reduction detection signal transmitted from the hydraulic medium amount detection unit 111a (3) is longer than the predetermined reduction detection time. When the duration of the brake fluid reduction detection signal is longer than the predetermined reduction detection time, the routine advances to step S2120 (YES in step S2110). When the duration of the brake fluid reduction detection signal is not longer than the predetermined reduction detection time, the routine returns to step S2100 (NO in step S2110).

More specifically, the comparison unit 113 of the separation valve control unit 110 (2) compares the predetermined time recorded in the predetermined reduction detection time storage unit 112 to the duration of the detection ON signal transmitted from the hydraulic medium amount detection unit 111a (3), which is integrated by the duration integration unit 114, and determines which is longer. When it is determined as a result of the comparison performed by the comparison unit 113 that the duration of the detection ON signal transmitted from the hydraulic medium amount detection unit 111a (3), which is integrated by the duration integration unit 114, is longer than the predetermined time recorded in the predetermined reduction detection time storage unit 112, the routine advances to step S2120. When it is determined as a result of the comparison performed by the comparison unit 113 that the duration of the detection ON signal transmitted from the hydraulic medium amount detection unit 111a (3), which is integrated by the duration integration unit 114, is not longer than the predetermined time recorded in the predetermined reduction detection time storage unit 112, the routine returns to step S2100.

In step S2120, the separation valve control unit 110 (2) closes the separation valve 160. Through the operation processing of step S2120, the hydraulic brake unit 1920 can block the flow of brake fluid between the first hydraulic system 161 and second hydraulic system 162 via the main flow passage 145.

Hence, a situation in which brake fluid continues to flow out through the main flow passage 145 from the hydraulic system that is not faulty, leading to depletion of the brake fluid stored in the reservoir 134 (5), can be avoided, and the braking force can be secured. Further, time can be earned by reducing the speed at which the brake fluid decreases, and therefore, during this time, safety can be secured and the required operation processing and backup processing can be executed.

The separation valve control unit 110 (2) transmits a confirmation signal indicating that the separation valve 160 is closed to the cut valve control unit 6171, and in accordance with this confirmation signal, the cut valve control unit 6171 acknowledges that the separation valve 160 is closed. The separation valve control unit 110 (2) also transmits the confirmation signal indicating that the separation valve 160 is closed to the faulty system determination unit 6172.

In step S2130, the cut valve control unit 6171 closes the first cut valve 664. Together with the processing of step S2120, the operation processing executed in step S2130 constitutes a preparatory operation for halting brake fluid leakage from the fault, which causes the amount of stored brake fluid to decrease, and/or specifying the fault site, as will be described in the subsequent steps.

The cut valve control unit 6171 transmits a confirmation signal indicating that the first cut valve 664 is closed to the faulty system determination unit 6172.

In step S2140, the vibration determination unit 910 determines whether or not the vehicle vibration is within the predetermined vibration range on the basis of the output of a yaw rate sensor, a G sensor, or the like. When the vibration determination unit 910 determines that the vehicle vibration is within the predetermined vibration range, the routine advances to step S2150 (YES in step S2140). When the vibration determination unit 910 determines that the vehicle vibration is not within the predetermined vibration range, the routine enters standby in step S2140 (NO in step S2140).

Further, the vibration determination unit 910 is preferably capable of determining whether or not vibration of the reservoir 134 (5) is within the predetermined vibration range. For this purpose, a vibration pickup sensor, a vibration detector, or the like, not shown in the drawings, may be attached to the reservoir 134 (5), and an output thereof may be input into the vibration determination unit 910.

More specifically, the vibration comparison unit 1002 of the vibration determination unit 910 compares a detection signal indicating motion or vibration of the reservoir 134 (5), which is input from the reservoir 134 (5), with the predetermined vibration range recorded in advance in the predetermined vibration range storage unit 1001, and determines whether or not the motion or vibration of the reservoir 134 (5) is within the predetermined range.

As described above, the predetermined vibration range recorded in advance in the predetermined vibration range storage unit 1001 is preferably set such that when the fluid surface of the brake fluid in the reservoir 134 (5) falls below the detection line to a certain extent, vibration within the predetermined vibration range causes the fluid surface to fluctuate about the detection line.

When the predetermined vibration range is too large, large vibration causes the fluid surface of the brake fluid in the reservoir 134 (5) to rise above the detection line such that a detection ON/OFF situation arises even if the fluid surface falls greatly below the detection line such that under normal circumstances the brake fluid would be on the verge of depletion, which is undesirable.

When the predetermined vibration range is too small, the fluid surface of the brake fluid in the reservoir 134 (5) does not rise above the detection line even if the fluid surface falls slightly below the detection line, and therefore the detection signal is not switched ON and OFF. As a result, it may be impossible to differentiate between this situation and a case in which the fluid surface falls greatly, which is undesirable.

Hence, the predetermined vibration range is preferably set appropriately in accordance with the shape, size, structure and so on of the reservoir 134 (5), taking into account the relationship between the ON/OFF detection line, the fluid reduction, and the fluid surface motion.

In step S2150, the faulty system determination unit 6172 determines whether or not detection of a reduction in the amount of fluid in the reservoir 134 (5) by the hydraulic medium amount detection unit 111*a* (3) has been canceled. When the faulty system determination unit 6172 determines that detection of a reduction in the amount of fluid in the reservoir 134 (5) by the hydraulic medium amount detection unit 111*a* (3) has been canceled, the routine advances to step S2160 (YES in step S2150). When the faulty system determination unit 6172 determines that detection of a reduction in the amount of fluid in the reservoir 134 (5) by the hydraulic medium amount detection unit 111*a* (3) has not been canceled, the routine advances to step S2190 (NO in step S2150).

Here, the hydraulic medium amount detection unit 111*a* (3) continues to output the detection ON signal continuously while the fluid surface height in the reservoir 134 (5) is lower than the predetermined detection line. The faulty system determination unit 6172 monitors the detection signal from the hydraulic medium amount detection unit 111*a* (3), and when the condition described in step S2140 is satisfied, the faulty system determination unit 6172 determines whether or not the detection ON signal has been canceled (whether or not detection has been switched OFF).

It is assumed in step S2160 that since the detection ON signal was canceled in step S2150, the fluid surface in the reservoir 134 (5) has stopped decreasing at a desired degree from the detection line without becoming depleted or continuing to decrease toward depletion.

The hydraulic brake unit 1920 then closes the separation valve 160 and the first cut valve 664. If brake fluid leakage is stopped when the separation valve 160 and the first cut valve 664 are closed, it may be assumed that a fault has occurred in the first hydraulic system 161.

Therefore, the faulty system determination unit 6172 determines that a fault has occurred in the first hydraulic system 161 and/or the first wheel cylinder 123F. The faulty system determination unit 6172 then outputs the determination result to the cut valve control unit 6171 and the simulator cut valve control unit 1930.

In step S2170, the cut valve control unit 6171 closes the first cut valve 664 and opens the second cut valve 665. In other words, the cut valve control unit 6171 closes the cut valve on the faulty side to prevent further fluid leakage, and opens the cut valve on the non-faulty side to allow hydraulic pressure to be supplied, thereby enabling braking.

In step S2180, the simulator cut valve control unit 1930 opens the simulator cut valve 68. By opening the simulator cut valve 68, the brake ECU 170 (8*a*) prevents hydraulic pressure from becoming sealed in the first hydraulic system 161 and secures an escape destination for the brake fluid. Through the operation processing of step S2180, the vehicle driver becomes able to depress the brake pedal 124, enabling an emergency braking operation during travel, or in other words braking in the REG assist mode or the like, in which braking is executed by applying the regulator pressure to the linear control mode.

It is assumed in step S2190 that since the detection ON signal was not canceled in step S2150, the fluid surface in the reservoir 134 (5) has depleted or is continuing to decrease toward depletion without stopping at the desired degree from the detection line.

Therefore, the hydraulic brake unit 1920 closes the separation valve 160 and the first cut valve 664. If brake fluid leakage continues to leak when the separation valve 160 and the first cut valve 664 are closed, it may be assumed that a fault has occurred in the second hydraulic system 162.

Therefore, the faulty system determination unit 6172 determines that a fault has occurred in the second hydraulic system 162 and/or the second wheel cylinder 123R. The faulty system determination unit 6172 then outputs the determination result to the cut valve control unit 6171 and the simulator cut valve control unit 1930.

In step S2200, the cut valve control unit 6171 closes the second cut valve 665 and opens the first cut valve 664. In other words, the cut valve control unit 6171 closes the cut valve on the faulty side to prevent further fluid leakage, and opens the cut valve on the non-faulty side to allow hydraulic pressure to be supplied, thereby enabling braking.

In step S2210, the simulator cut valve control unit 1930 closes the simulator cut valve 68. By closing the simulator cut valve 68, the brake ECU 170 (8a) prevents the brake fluid from being consumed by the stroke simulator 69 such that the brake fluid is supplied normally to the first wheel cylinder 123F alone. Hence, the remaining brake fluid that does not leak can be used effectively to perform vehicle braking.

As described above, with the hydraulic brake unit according to the eighth embodiment, even when the stroke simulator 69 is provided, fluid leakage due to a fault can be stopped in conjunction with control of the plurality of other valves, and moreover, the faulty site can be specified and a braking force can be secured.

A representative example of processing in which the hydraulic medium amount detection unit 111a, 111a (3), 111a (3b) according to the first to eighth embodiments differentiates between executing by the brake ECU the processing described above in the first to eighth embodiments and shifting to a backup mode depending on the duration of detection that the brake fluid amount is smaller than the predetermined amount will now be described as a ninth embodiment using FIG. 22.

Figure 22:
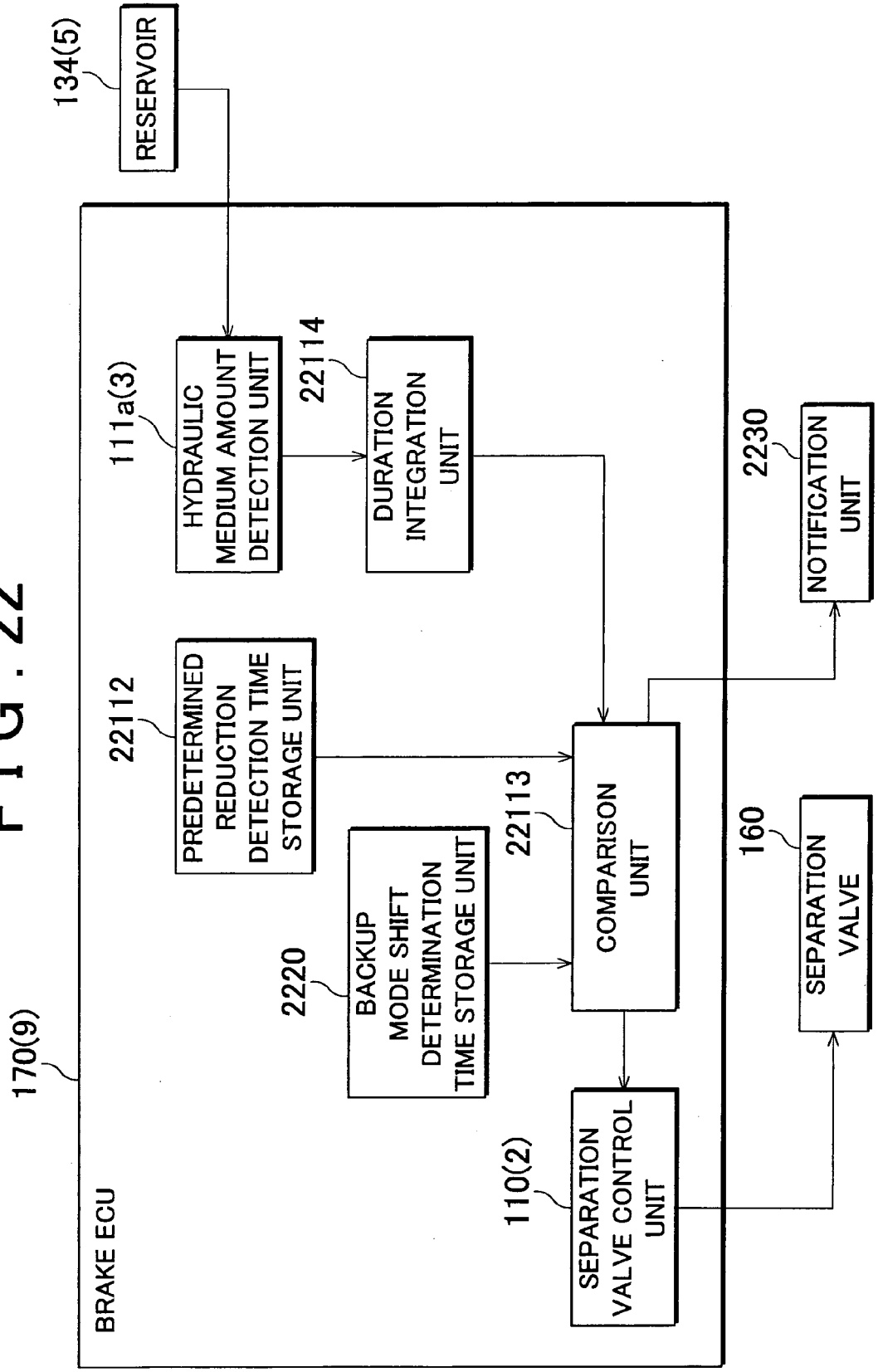
FIG. 22 is a schematic block diagram showing an example of a brake ECU according to a ninth embodiment of the invention.

FIG. 22 is a schematic block diagram showing an example of a brake ECU 170 (9) according to the ninth embodiment. In FIG. 22, the brake ECU 170 (9) includes the constitutions and functions of the respective brake ECUs described above in the first embodiment to the eighth embodiment. To avoid duplicate description, different parts are indicated as the brake ECU 170 (9). Further, identical reference numerals have been allocated to identical sites, and both description thereof and illustration thereof in the drawing have been omitted.

The brake ECU 170 (9) includes a duration integration unit 22114 that integrates the duration of detection, by the hydraulic medium amount detection unit 111a(3), of a reduction in the brake fluid stored in the reservoir 134 (5). The brake ECU 170 (9) also includes a predetermined reduction detection time storage unit 22112 that stores a predetermined reduction detection time (X) serving as a threshold time for determining whether or not the separation valve control unit 110 (2) should close the separation valve 160.

The brake ECU 170 (9) also includes a backup mode shift determination time storage unit 2220 that stores a backup mode shift determination time (Z) serving as a threshold time for determining whether or not to shift the hydraulic brake unit to the backup mode. The brake ECU 170 (9) also includes a comparison unit 22113 that compares the fluid reduction detection duration integrated by the duration integration unit 22114 with the predetermined reduction detection time (X) and the backup mode shift determination time (Z).

When the fluid reduction detection duration integrated by the duration integration unit 22114 is longer than the predetermined reduction detection time (X), the brake ECU 170 (9) executes one of the processing operations described in the first embodiment to the eighth embodiment. Furthermore, at this time, a notification unit 2230 is used to notify the driver of the vehicle that the processing is to be executed through illumination of a small lamp, a simple warning sound, or the like.

Further, when the fluid reduction detection duration integrated by the duration integration unit 22114 is longer than the backup mode shift determination time (Z), the brake ECU 170 (9) shifts to the backup mode, in which electrification control of all valves is abandoned such that the valves are not electrified. Moreover, at this time, the notification unit 2230 notifies the driver of the vehicle that shift processing to the backup mode has been executed, causing variation in the brake feeling, through lamp illumination, a warning sound, or similar. The backup mode is normally an HB mode (hydrobooster mode) in which the pressure of the regulator 33 and the master cylinder 32 is supplied to the wheel cylinder 23.

Figure 23:
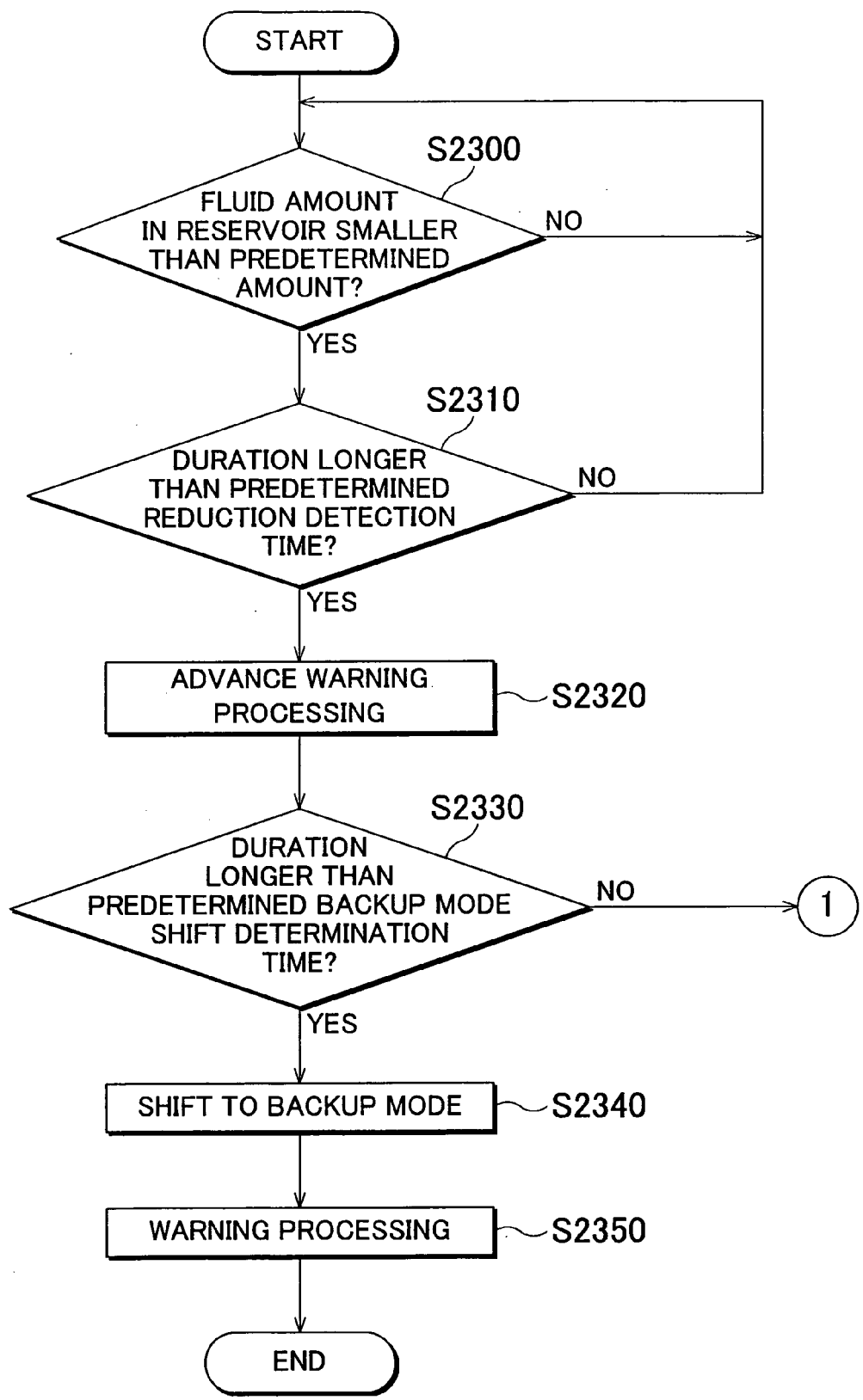
FIG. 23 is a flowchart showing a representative example of operation processing according to the ninth embodiment of the invention.

Next, each step of the processing operation executed by the brake ECU 170 (9) will be described using FIG. 23. FIG. 23 is a flowchart showing a representative example of operation processing according to the ninth embodiment. FIG. 23 also shows an example in which this processing is applied to the operation processing described in the eighth embodiment. Note that in the following description, identical processing to that of steps already described will be omitted while citing the corresponding step number.

A step S2300 corresponds to step S2100, and therefore description thereof has been omitted.

In step S2310, the brake ECU 170 (9) determines whether or not the duration of the brake fluid reduction detection signal transmitted from the hydraulic medium amount detection unit 111a (3) is longer than the predetermined reduction detection time (X). When the duration of the brake fluid reduction detection signal is longer than the predetermined reduction detection time, the routine advances to step S2320 (YES in step S2310). When the duration of the brake fluid reduction detection signal is not longer than the predetermined reduction detection time, the routine returns to step S2300 (NO in step S2310).

More specifically, the comparison unit 22113 compares the predetermined time recorded in the predetermined reduction detection time storage unit 22112 to the duration of the detection ON signal transmitted from the hydraulic medium amount detection unit 111a (3), which is integrated by the duration integration unit 22114, and determines which is longer. When it is determined as a result of the comparison performed by the comparison unit 22113 that the duration of the detection ON signal transmitted from the hydraulic medium amount detection unit 111a (3), which is integrated by the duration integration unit 22114, is longer than the predetermined time recorded in the predetermined reduction detection time storage unit 22112, the routine advances to step S2320. When it is determined as a result of the comparison performed by the comparison unit 22113 that the duration of the detection ON signal transmitted from the hydraulic medium amount detection unit 111a (3), which is integrated by the duration integration unit 22114, is not longer than the predetermined time recorded in the predetermined reduction detection time storage unit 22112, the routine returns to step S2300.

In step S2320, the brake ECU 170 (9) issues an advance warning notification to the driver of the vehicle through the notification unit 2230. For example, the notification unit 2230 notifies the driver by illuminating a lamp a single time or outputting a single warning sound that although a shift to the backup mode has not yet been executed, a fault is suspected.

In step S2330, the brake ECU 170 (9) determines whether or not the duration of the brake fluid reduction detection signal transmitted from the hydraulic medium amount detection unit 111a (3) is longer than the predetermined backup mode shift determination time (Z, where Z>X). When the duration of the brake fluid reduction detection signal is longer than the predetermined backup mode shift determination time, the routine advances to step S2340 (YES in step S2330). When the duration of the brake fluid reduction detection signal is not longer than the predetermined backup mode shift determination time, the routine advances to step S2120 shown in FIG. 21A (NO in step S2330).

More specifically, the comparison unit 22113 compares the predetermined time recorded in the backup mode shift determination time storage unit 2220 to the duration of the detection ON signal transmitted from the hydraulic medium amount detection unit 111a (3), which is integrated by the duration integration unit 22114, and determines which is longer. When it is determined as a result of the comparison performed by the comparison unit 22113 that the duration of the detection ON signal transmitted from the hydraulic medium amount detection unit 111a (3), which is integrated by the duration integration unit 22114, is longer than the predetermined time recorded in the backup mode shift determination time storage unit 2220, the routine advances to step S2340. When it is determined as a result of the comparison performed by the comparison unit 22113 that the duration of the detection ON signal transmitted from the hydraulic medium amount detection unit 111a (3), which is integrated by the duration integration unit 22114, is not longer than the predetermined time recorded in the backup mode shift determination time storage unit 2220, the routine advances to step S2120 shown in FIG. 21A.

Note that even when the flow shown in FIG. 21A and FIG. 21B is underway, if the duration for satisfying the condition of step S2330 is reached, the processing of the FIG. 21 A and FIG. 21B is interrupted and the routine advances to step S2340.

In step S2340, the brake ECU 170 (9) shifts to the backup mode while abandoning valve open/close control of the hydraulic brake unit, i.e. without electrifying the valves. Note that in the backup mode, the first cut valve 664 corresponding to the master cut valve 64 and the second cut valve 665 corresponding to the regulator cut valve 65, which are normally open solenoid control valves, are typically open such that the hydraulic pressure of the manual hydraulic supply unit 127 corresponding to the master cylinder unit 27 is supplied to the wheel cylinders 123R, 123F.

In step 2350, the brake ECU 170 (9) warns the driver of the vehicle that a shift to the backup mode has been executed using the notification unit 2230. Thus, the driver can be informed of variation in the brake feeling accompanying the shift to the backup mode, thereby reducing an unpleasant sensation experienced by the driver. Note that the order of step S2350 and step S2340 may be reversed.

In the operation example described in this embodiment, advance warning processing, processing to detect fluid leakage from a fault and specify the site of the fault, and so on are executed before shifting to the backup mode. Hence, decisions to shift to the backup mode are made more carefully and appropriately, and therefore the brake feeling is not worsened carelessly.

Next, an operation example in which a shift is executed to the linear control mode when a braking instruction is issued by the driver of the vehicle or through automatic braking control during the processing according to the first embodiment to the eighth embodiment (to be referred to hereafter as interim procedures) will be described.

In a tenth embodiment, if a braking instruction (braking ON) is issued when a reduction in the fluid amount caused by a fault has been detected and a specific procedure such as halting fluid leakage or specifying the site of the fault is underway, the braking instruction is activated preferentially so that the vehicle can be stopped or decelerated.

Figure 24:
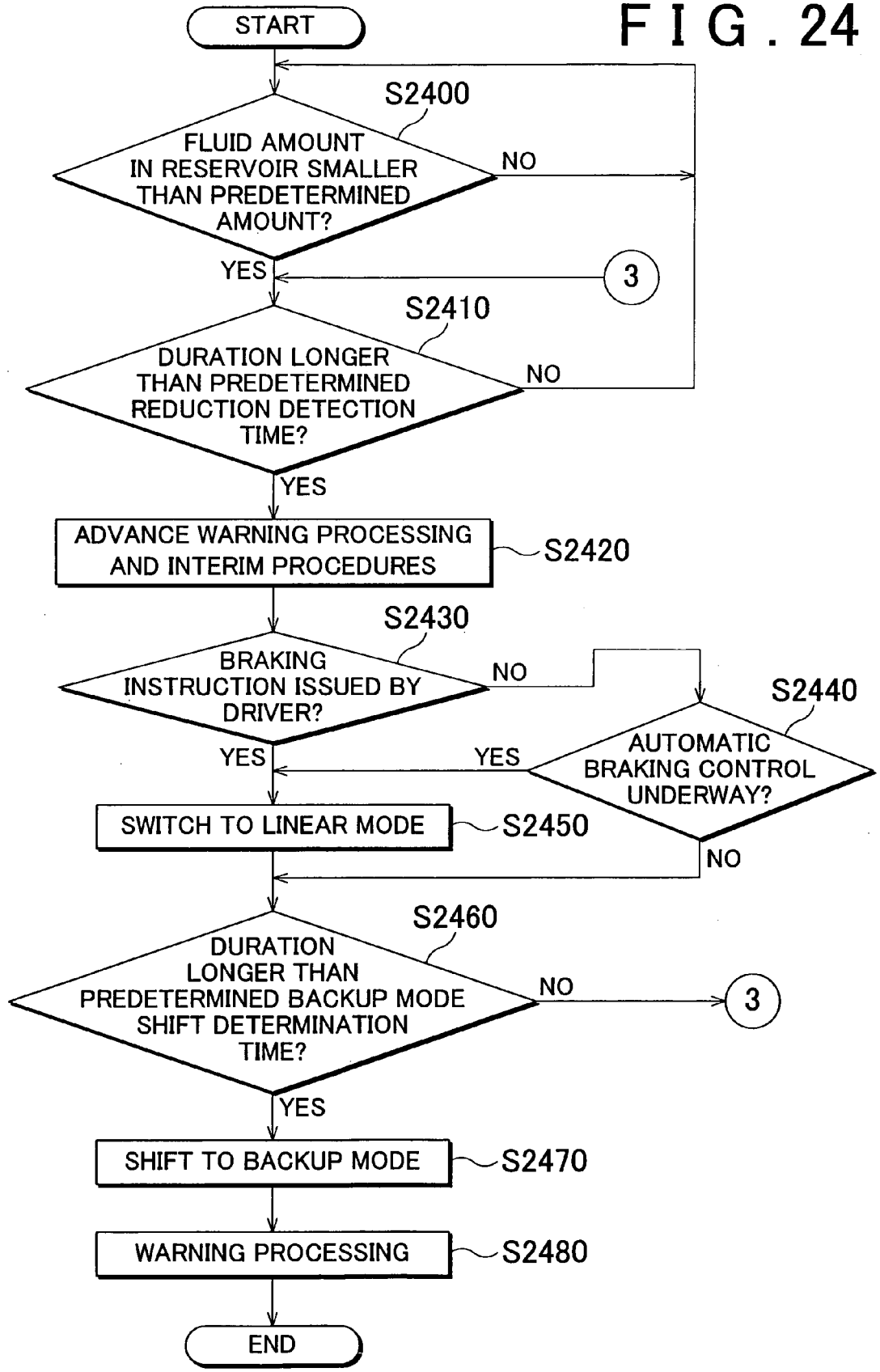
FIG. 24 is a flowchart showing a representative example of operation processing according to a tenth embodiment of the invention.

FIG. 24 is a flowchart showing a representative example of operation processing according to the tenth embodiment.

A step S2400 corresponds to step S2300, and therefore description thereof has been omitted.

A step S2410 corresponds to step S2310, and therefore description thereof has been omitted.

In step S2420, the warning processing of step S2320 is performed. Further, the interim procedures according to the first embodiment to the eighth embodiment, i.e. closing the separation valve 160, stopping fluid leakage, specifying the fault site, securing the braking force, and so on, are executed.

In step S2430, the brake ECU 70 determines whether or not a braking instruction has been issued by the driver of the vehicle through depression of the brake pedal 124. When a braking instruction has been issued, the routine advances to step S2450 (YES in step S2430). When a braking instruction has not been issued, the routine advances to step S2440 (NO in step S2430).

In step S2440, the brake ECU 70 determines whether or not a braking instruction has been issued through automatic braking control. When a braking instruction has been issued, the routine advances to step S2450 (YES in step S2440). When a braking instruction has not been issued, the routine advances to step S2460 (NO in step S2440).

In step S2450, the brake ECU 70 switches to control in the linear control mode. As a result, the hydraulic pressure from the power hydraulic pressure source 30 is supplied to the wheel cylinder 23 so that a braking force can be applied.

Step S2460 corresponds to step S2330, and therefore description thereof has been omitted. When the duration is not longer than the predetermined backup mode shift determination time, the routine returns to step S2410 (NO in step S2460).

A step S2470 corresponds to step S2340, and therefore description thereof has been omitted.

A step S2480 corresponds to step S2350, and therefore description thereof has been omitted.

In the operation processing according to the tenth embodiment, if a braking instruction is issued during the interim procedures performed upon the occurrence of a fault, the possibility of executing a normal braking operation can be maximized, and therefore comfortable braking and processing in response to the fault can be established with a favorable balance.

The invention is not limited to the embodiments described above, the constitution, operations, and processing thereof may be modified within a self-evident scope.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A hydraulic brake unit, comprising:
   a manual hydraulic pressure supply unit that pressurizes a hydraulic medium supplied from a reservoir storing the hydraulic medium and generates a hydraulic pressure corresponding to a brake operation amount generated by a driver;
   a first hydraulic system that includes a first cut valve and in which the manual hydraulic pressure supply unit communicates with a first wheel cylinder so that the hydraulic pressure generated by the manual hydraulic pressure supply unit is transmitted to the first wheel cylinder;
   a second hydraulic system that includes a second cut valve and in which the manual hydraulic pressure supply unit communicates with a second wheel cylinder so that the hydraulic pressure generated by the manual hydraulic pressure supply unit is transmitted to the second wheel cylinder;
   a separation valve that is provided in a main flow passage connecting the first hydraulic system to the second hydraulic system; and
   a brake ECU that includes:
      a separation valve control unit that open/close controls the separation valve,
      a hydraulic medium amount detection unit that detects whether or not the hydraulic medium stored in the reservoir has decreased below a predetermined amount,
      a cut valve control unit that blocks the hydraulic medium by closing either the first cut valve or the second cut valve,
      a faulty system determination unit that determines whether faults occur in the first hydraulic system or the second hydraulic system,
   wherein each of the first cut valve and the second cut valve opens and blocks flow of the hydraulic medium,
   wherein the separation valve control unit closes the separation valve when the hydraulic medium amount detection unit detects that the hydraulic medium has decreased below the predetermined amount,
   wherein the separation valve control unit closes the separation valve when a state in which the hydraulic medium amount detection unit detects that the hydraulic medium has decreased below the predetermined amount continues for a predetermined reduction detection time,
   wherein the cut valve control unit closes the first cut valve or the second cut valve to block the hydraulic medium when the separation valve control unit closes the separation valve,
   wherein the faulty system determination unit determines a fault in the first hydraulic system or the second hydraulic system that corresponds to the first cut valve or the second cut valve that is not closed has occurred when the first cut valve or the second cut valve is closed and a continued reduction in the hydraulic medium is detected by the hydraulic medium amount detection unit, and
   wherein the faulty system determination unit determines a fault in the first hydraulic system or the second hydraulic system that corresponds to the first cut valve or the second cut valve that is closed has occurred when the first cut valve or the second cut valve is closed and the continued reduction is not detected by the hydraulic medium amount detection unit.

2. The hydraulic brake unit according to claim 1, wherein the brake ECU includes:
   a vibration determination unit that determines whether or not vibration of the reservoir is within a predetermined vibration range; and
   the faulty system determination unit determines, when the cut valve control unit closes either the first cut valve or the second cut valve and the vibration determination unit determines that the vibration of the reservoir is within the predetermined vibration range, whether a fault has occurred in the first hydraulic system or the second hydraulic system by determining whether or not the hydraulic medium amount detection unit has detected that the hydraulic medium has decreased below the predetermined amount.

3. The hydraulic brake unit according to claim 2,
   wherein the reservoir includes: a first reservoir portion that stores hydraulic medium to be supplied to the first hydraulic system; and a second reservoir portion that stores hydraulic medium to be supplied to the second hydraulic system and has a greater capacity than the first reservoir portion, and
   wherein the cut valve control unit blocks the hydraulic medium by closing the first cut valve provided in the first hydraulic system when the separation valve is closed.

4. The hydraulic brake unit according to claim 2, wherein the faulty system determination unit includes a reliability confirmation unit that determines whether or not the hydraulic medium amount detection unit has repeated detection and non-detection of the state, in which the hydraulic medium has decreased below the predetermined amount, more than a predetermined number of times within a predetermined period, and
   when the cut valve control unit closes either the first cut valve or the second cut valve, and when the vibration determination unit determines that the vibration of the reservoir is within the predetermined vibration range, and the reliability confirmation unit determines that the hydraulic medium amount detection unit has repeated detection and non-detection of the state, in which the hydraulic medium has decreased below the predetermined amount, more than the predetermined number of times within the predetermined period, a fault is determined to have occurred in whichever of the first hydraulic system and the second hydraulic system is closed.

5. The hydraulic brake unit according to claim 1, wherein, after the faulty system determination unit determines a fault has occurred in either the first hydraulic system or the second hydraulic system, the cut valve control unit controls the first cut valve and the second cut valve so that a system determined by the faulty system determination unit to be faulty is set in a blocked state and a system determined by the faulty system determination unit to be non-faulty is set in a communicating state.

6. The hydraulic brake unit according to claim 1, wherein the first hydraulic system or the second hydraulic system includes a stroke simulator that is provided between the manual hydraulic pressure supply unit and either the first cut valve or the second cut valve provided in the respective systems, and creates a reaction force that corresponds to a brake depression force generated by the driver via a simulator cut valve, the brake ECU includes a simulator cut valve control unit that open/close controls the simulator cut valve, after the faulty system determination unit has determined that a fault has occurred in either the first hydraulic system or the second hydraulic system, the cut valve control unit controls the first cut valve and the second cut valve such that the system, determined by the faulty system determination unit to be faulty, is set in the blocked state and the system, determined by the faulty system determination unit to be non-faulty, is set in the communicating state, and when the system determined by the faulty system determination unit to be faulty includes the simulator cut valve, the simulator cut valve control unit opens the simulator cut valve, and when the system determined by the faulty system determination unit to be non-faulty includes the simulator cut valve, the simulator cut valve control unit closes the simulator cut valve.

7. The hydraulic brake unit according to claim 1, wherein when the state in which the hydraulic medium amount detection unit detects that the hydraulic medium has decreased below the predetermined amount continues for the predetermined reduction detection time, the separation valve control unit closes the separation valve, and when the state in which the hydraulic medium amount detection unit detects that the hydraulic medium has decreased below the predetermined amount continues for a predetermined backup mode shift determination time, which is longer than the predetermined reduction detection time, the brake ECU shifts to a backup mode, in which the hydraulic pressure of the manual hydraulic pressure supply unit is transmitted to the first wheel cylinder and the second wheel cylinder regardless of whether or not the driver has performed a brake operation, and notifies the driver of the vehicle that a fault has occurred.

8. The hydraulic brake unit according to claim 1, further comprising an automatic braking control unit that controls a hydraulic pressure transmitted to at least one of the first wheel cylinder and the second wheel cylinder independently of a brake operation performed by the driver, wherein, when a braking instruction is issued in accordance with a brake operation by the driver or through automatic braking control after the separation valve control unit has closed the separation valve, the separation valve control unit opens the separation valve and the brake ECU switches to a linear control mode in which hydraulic pressure is transmitted to the first wheel cylinder and the second wheel cylinder from a power hydraulic pressure source that pressurizes the hydraulic medium dynamically.

9. The hydraulic brake unit according to claim 1, wherein the first wheel cylinder is a wheel cylinder on a front wheel side of a vehicle, and the second wheel cylinder is a wheel cylinder on a rear wheel side of the vehicle.

10. The hydraulic brake unit according to claim 1, further comprising a motor, wherein the hydraulic medium amount detection unit includes a fluid amount detection unit that detects an amount of the hydraulic medium in the reservoir and a motor driving time unit that detects a driving time of the motor, wherein the separation valve control unit closes the separation valve when the fluid amount detection unit detects the amount of the hydraulic medium in the reservoir is less than the predetermined amount and the motor driving time unit detects the driving time is greater than a predetermined time.

11. A control method for a hydraulic brake unit including:

a manual hydraulic pressure supply unit that pressurizes a hydraulic medium supplied from a reservoir storing the hydraulic medium and generates a hydraulic pressure corresponding to a brake operation amount generated by a driver;

a first hydraulic system that includes a first cut valve and in which the manual hydraulic pressure supply unit communicates with a first wheel cylinder so that the hydraulic pressure generated by the manual hydraulic pressure supply unit is transmitted to the first wheel cylinder;

a second hydraulic system that includes a second cut valve and in which the manual hydraulic pressure supply unit communicates with a second wheel cylinder so that the hydraulic pressure generated by the manual hydraulic pressure supply unit is transmitted to the second wheel cylinder;

a separation valve that is provided in a main flow passage connecting the first hydraulic system to the second hydraulic system; and a brake ECU that includes:
 a separation valve control unit that open/close controls the separation valve,
 a hydraulic medium amount detection unit that detects whether or not the hydraulic medium stored in the reservoir has decreased below a predetermined amount,
 a cut valve control unit that blocks the hydraulic medium by closing either the first cut valve or the second cut valve,
 a faulty system determination unit that determines whether faults occur in the first hydraulic system or the second hydraulic system, the control method by comprising:

a detection process in which the hydraulic medium amount detection unit detects that the hydraulic medium has decreased below the predetermined amount;

a first valve-close process in which the separation valve control unit closes the separation valve when the hydraulic medium is detected to have decreased below the predetermined amount in the detection process;

a time detection process in which the separation valve control unit closes the separation valve when a state in which the hydraulic medium amount detection unit detects that the hydraulic medium has decreased below the predetermined amount continues for a predetermined reduction detection time;

a second valve-close process in which the cut valve control unit closes the first cut valve or the second cut valve to block the hydraulic medium when the separation valve is closed by the separation valve control unit;

a fault determination process in which:
 the faulty system determination unit determines a fault in the first hydraulic system or the second hydraulic system that corresponds to the first cut valve or the second cut valve that is not closed has occurred when the first cut valve or the second cut valve is closed and a continued reduction in the hydraulic medium is detected by the hydraulic medium amount detection unit, and
 the faulty system determination unit determines a fault in the first hydraulic system or the second hydraulic system that corresponds to the first cut valve or the second cut valve that is closed has occurred when the first cut valve or the second cut valve is closed and the continued reduction is not detected by the hydraulic medium amount detection unit.

* * * * *